(12) United States Patent
Bovarnick et al.

(10) Patent No.: US 6,704,015 B1
(45) Date of Patent: Mar. 9, 2004

(54) METHODS AND APPARATUS FOR PROVIDING A QUALITY CONTROL MANAGEMENT SYSTEM

(75) Inventors: Ellen Bovarnick, Raleigh, NC (US); Richard Dale Dobbins, Raleigh, NC (US)

(73) Assignee: GE Mortgage Holdings, LLC, Raleigh, NC (US)

( * ) Notice: Subject to any disclaimer, the term of this patent is extended or adjusted under 35 U.S.C. 154(b) by 0 days.

(21) Appl. No.: 09/564,012

(22) Filed: May 3, 2000

Related U.S. Application Data
(60) Provisional application No. 60/193,546, filed on Mar. 31, 2000.

(51) Int. Cl.$^7$ .............................................. G06T 11/20
(52) U.S. Cl. ................. 345/440.2; 345/734; 345/737; 345/741; 345/743; 345/752; 707/9; 707/514; 705/10
(58) Field of Search .................... 345/619, 689, 345/626, 650, 661, 440–440.2, 468–469, 700, 716, 719–721, 722–723, 733, 734, 735, 736, 737–738, 740, 741, 743, 744, 745–752, 764, 853; 707/1, 3, 9, 10, 102–103, 104, 509, 514; 705/7, 51, 56, 10, 11, 22, 28–29, 36

(56) References Cited

U.S. PATENT DOCUMENTS 5,233,513 A * 8/1993 Doyle ......................... 354/401
5,596,712 A * 1/1997 Tsuyama et al. ............. 364/267
5,864,483 A * 1/1999 Brichta ........................ 702/84
6,078,924 A * 6/2000 Ainsbury et al. ............ 707/101

\* cited by examiner

Primary Examiner—Matthew C. Bella
Assistant Examiner—Wesner Sajous
(74) Attorney, Agent, or Firm—Priest & Goldstein, PLLC

(57) ABSTRACT

A process control management and quality navigation are described which provides an intranet based approach to providing management with run and control charts for more effective tracking and management of quality related processes. The quality navigation system includes intuitive quality navigation. Data which formerly may have been redundantly collected and stored is now centrally stored and made available on a web site. The system automatically links top level indicators to core and sublevel process and quality outcome indicators. To this end, core processes, measures of quality and sources of data are identified. Data is collected and stored in a database. Hierarchical relationships of processes and subprocesses are established. Strengths of relationships of the linkages of processes and subprocesses are identified and stored. Indicators for strengths of relationship are stored and displayed within families of linked charts. Users can readily drill down to lower levels of processes to look at underlying root data. Chart monitoring is automated on a real time basis, and users may be automatically informed of process data exceeding predetermined control limits.

18 Claims, 36 Drawing Sheets

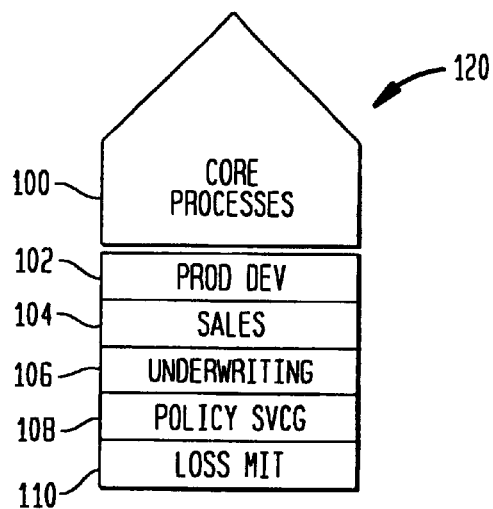
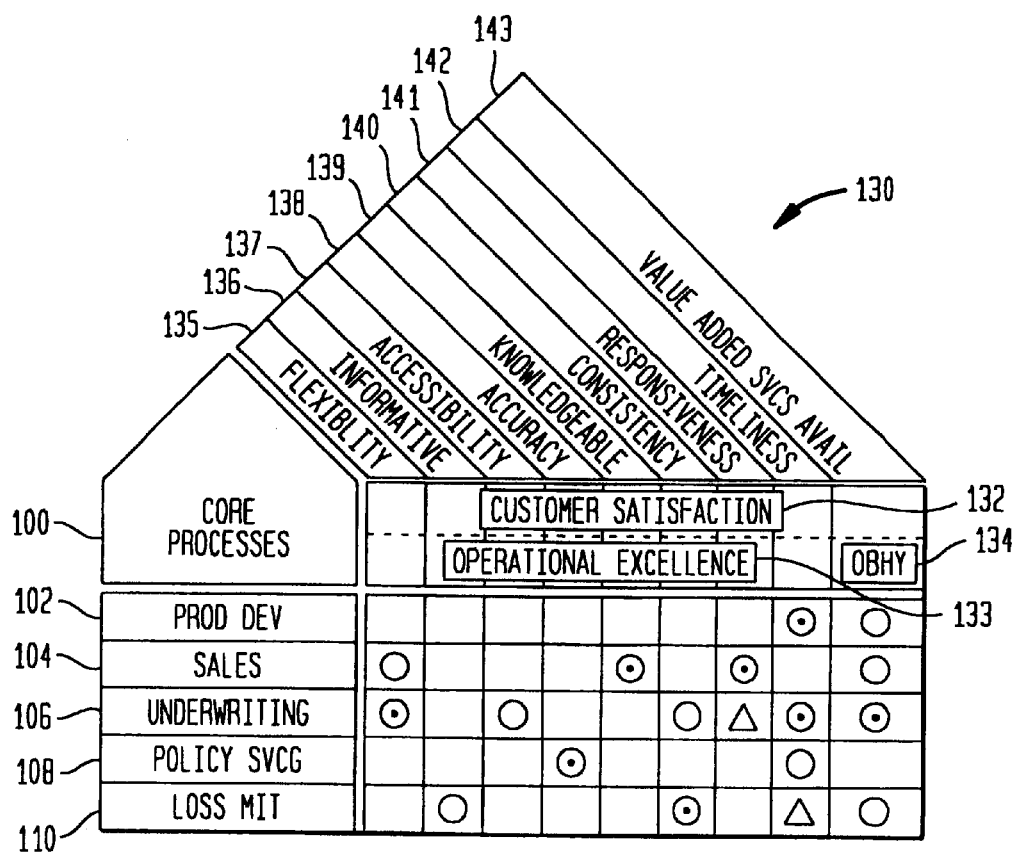

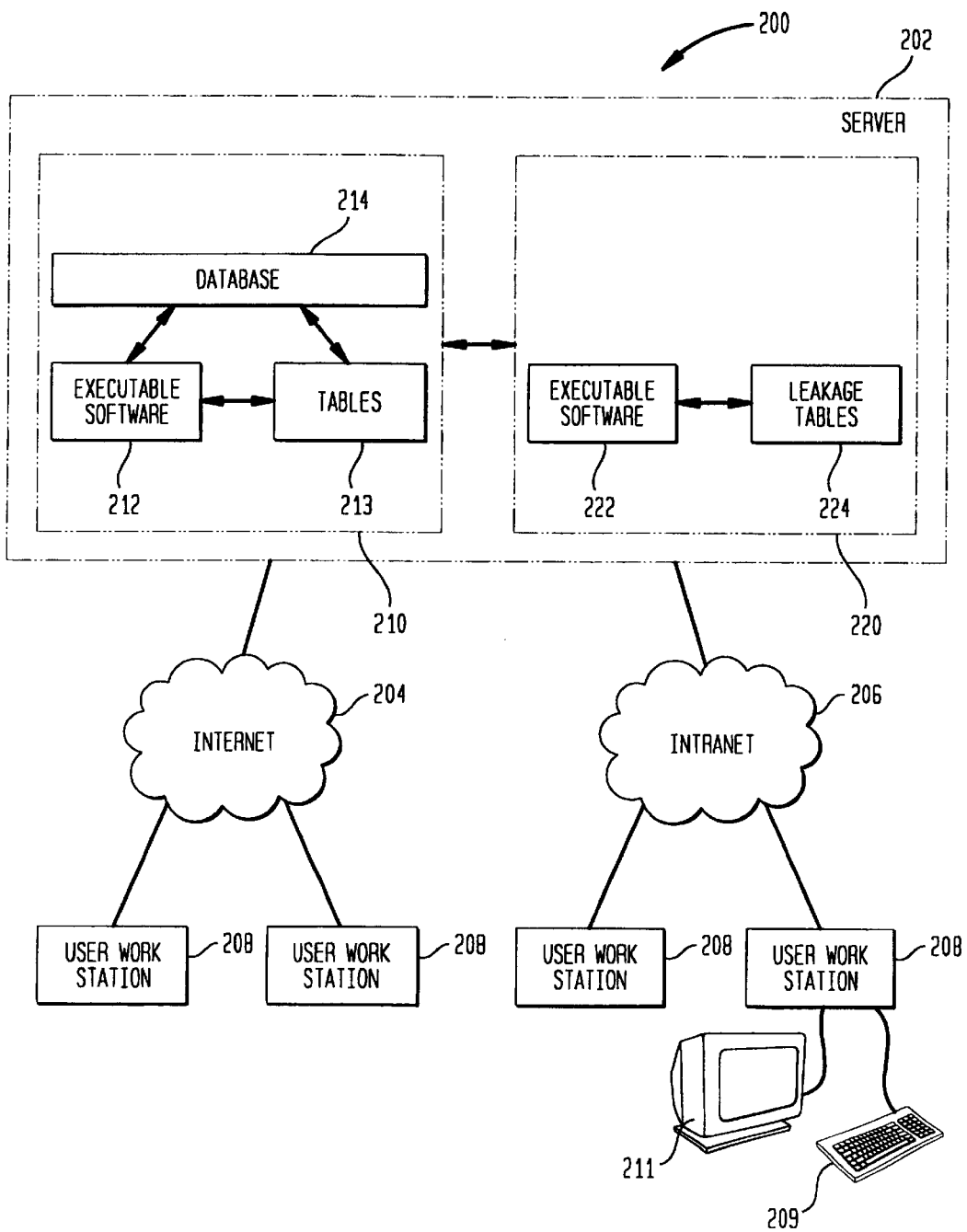

FIG. 3

| PARAMETER | FORMAT/POSITION | POSITION | PURPOSE |
|---|---|---|---|
| MAX STATUS | NUMERIC 4 | 1-4 | ALL STORED PROCEDURE RETURN CODES > MAX STATUS WILL CAUSE STEP RETURN CODE = MAX ROUTINE CODE FROM STORED PROCEDURE. MAX STATUS OF 0000 WILL ALWAYS GIVE 0 RETURN CODE. ALL ERRORS WILL GO TO SYSOUT. RETURN CODE MEANING ARE LISTED BELOW. |
| VERBOSE | CHARACTER 1 | 6 | (Y=YES,N=NO,-ECHOS ALL SELECTED DATA) |
| OUTPUT FILE | CHARACTER 1 | 5 | 'Y'=CREATE OUTPUT FILE AND UPDATE CHARTS. 'N'=NO OUTPUT FILE AND UPDATE CHARTS. 'O'=OUTPUT FILE AND NO UPDATE TO CHARTS |
| SAMPLE FLAG | CHARACTER 4 | 7-10 | ISMP=INTERVAL: PASSES EVERY nTH RECORD. RSMP=RANDOM: USES RANDOM NUMBER GENERATOR TO CHOOSE RECORDS. ' ' (4 BLANKS) OR 'NONE'=OFF |
| SAMPLE SIZE OR INTERVAL | NUMERIC 4 | 11-15 | USED WITH ISMP TELLS TO PROCESS EVERY nTH RECORD. USED WITH RSMP STATES NUMBER OF RECORDS TO PROCESS |
| FILE SIZE MINIMUM | NUMERIC 7 | 16-22 | MINIMUM NUMBER OF RECORDS REQUIRED BEFORE YOU PROCESS THIS FILE. PROVIDE METHOD TO SKIP DAYS OF DATA, POSSIBLY WEEKENDS, WHERE A SMALL AMOUNT OF DATA WOULD NOT BE STATISTICALLY VALID |

FIG. 4

```
TO RANDOM SAMPLE IN GROUPS OF 25:
        PARM OPTIONS: STATUS=0(0000), VERBOSE=NO(N),
                OUTFILE=YES(Y), SAMPLING=RANDOM(RSMP),
                SAMPLE_SIZE=25(0025)
        PARM='0000NYRSMP00250040000'                       } 402
TO LOAD ALL DATA TO THE ENGINE WITH NO SAMPLING:
        PARM OPTIONS: STATUS=0(0000), VERBOSE=NO(N),
                OUTFILE=YES(N), SAMPLING=RANDOM(NONE),
                SAMPLE_SIZE=25(0025)
        PARM='0000NNNONE                                   } 404
```

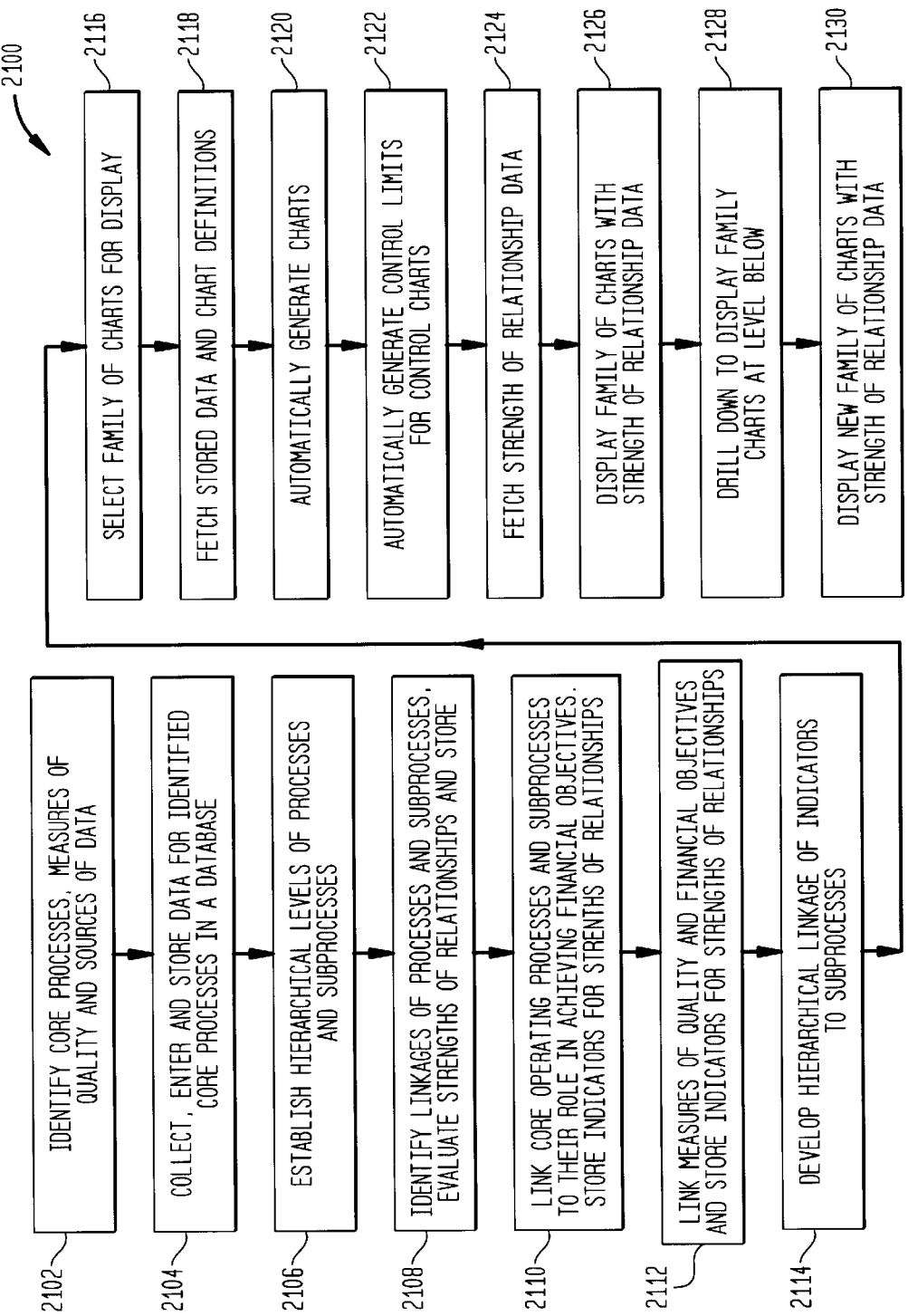

METHODS AND APPARATUS FOR PROVIDING A QUALITY CONTROL MANAGEMENT SYSTEM

The present application claims the benefit of U.S. Provisional Application Ser. No. 60/193,546 filed March 31, 2000 and entitled "Methods and Apparatus for Providing a Quality Control Management System" which is incorporated by reference herein in its entirety.

CROSS REFERENCE TO RELATED APPLICATIONS

The present application is related to U.S. application Ser. No. 09/563,517, filed May 3, 2000 entitled "Methods and Apparatus for Providing a Quality Control Management System" which is incorporated by reference herein in its entirety.

FIELD OF THE INVENTION

The present invention relates generally to improved methods and apparatus for quality focussed management. More specifically, the present invention relates to advantageous methods and apparatus for providing tools for quality control of multiple processes, such as a process control management system and a quality navigator which are highly intuitive to use, which hierarchically link levels of data and which allow a user to display charts in a web based format and to readily travel from level to level and across a level in a rapid and meaningful fashion.

BACKGROUND OF THE INVENTION

With the increasing focus in business on quality control, vast amounts of raw quality control data are being collected in the effort to work toward defect-free process execution and total quality management. Quality management is seen as a strategy for bringing significant improvements in quality of product and customer relationship, market share, profit margins, cost reductions, supplier performance, employee satisfaction and the like. Within this system, the amount of raw data may be overwhelming. In other words, one may not see the forest for the trees. Worse yet, as data is disseminated more and more widely and readily as a result of improvements in computing, communications and the like, that data is subject to being misunderstood or misused by an ever widening group of people within a typical company. Whereas data might previously be collected, evaluated and fed to the top of an organization, now that same data may be nearly simultaneously available to all employees at all levels of a company.

Consequently, the present invention recognizes that it would be highly advantageous to provide tools to appropriately link the raw data as it is relevant to the objectives of the company collecting the data, and to prioritize the data in hierarchical levels so that all employees with access will be focussed upon the items identified as most critical to success. It has further been recognized by the present invention that maintaining links to the underlying data and providing effective mechanisms for displaying that data provide an important crosscheck to the underlying assumptions as to which data is in fact most relevant.

SUMMARY OF THE INVENTION

The present invention advantageously provides methods and apparatus for providing such advantageous features, as well as others. According to one aspect of the present invention, data which formerly may have been redundantly stored at multiple locations now has a central repository and is available on a web site. The system automatically links top level indicators to core and sublevel processes each with quality outcome and process indicators, and automatically generates run and control charts for monitoring the processes on a real time basis. The stored chart definitions result in uniform charts throughout the business. Further, whereas previously charts might be taped up on a large wall in an office or conference room and statically displayed, charts are now dynamically generated to suit the users' needs while maintaining data linkages which have been identified. The system-facilitates multiple users in multiple locations discussing and viewing the data charts during a telephone or videoconference.

In a further aspect of the present invention, a quality navigation system is provided. In one embodiment, this system includes both a process control management system (PCMS) and a quality navigator (QN) which together cooperate to provide an intranet based, web page based linkage of quality data that allows management to view quality control charts for each business process or top level indicator (TLI) and thereby efficiently and effectively evaluate the quality of the output of the process. As a further aspect of the invention, advantageous navigation tools are provided. Other aspects may include the display of indicator linkages by any of various stratifications, such as TLIs, core, process/subprocess, compliance and the like as discussed further below. Further, email, page alerts, or other notifications may be automatically generated to substantially immediately alert a process owner or one responsible for a process of an out of control process or indicator. Finally, the presently preferred system focusses everyone on the customer by providing tools to initiate the analysis-of the root causes of problems and to ensure that once those problems are corrected that they stay fixed.

A more complete understanding of the present invention, as well as further features and advantages of the invention, will be apparent from the following detailed description and the accompanying drawings.

BRIEF DESCRIPTION OF THE DRAWINGS

FIG. 1A shows a first "house" structure for purposes of illustrating core business processes which have been recognized as such in accordance with the present invention;

FIG. 1B shows a second house structure for purposes of illustrating how the core processes of FIG. 1A are linked to items identified as critical to quality from the perspective of customer satisfaction;

FIG. 2 shows an overall system in accordance with the present invention;

FIG. 3 illustrates an exemplary input parameter table;

FIG. 4 illustrates exemplary code to sample data in groups of twenty-five data points and to read data with no sampling, respectively;

FIG. 21 is a flowchart illustrating a QN process in accordance with the present invention.

DETAILED DESCRIPTION

Figure 1C:
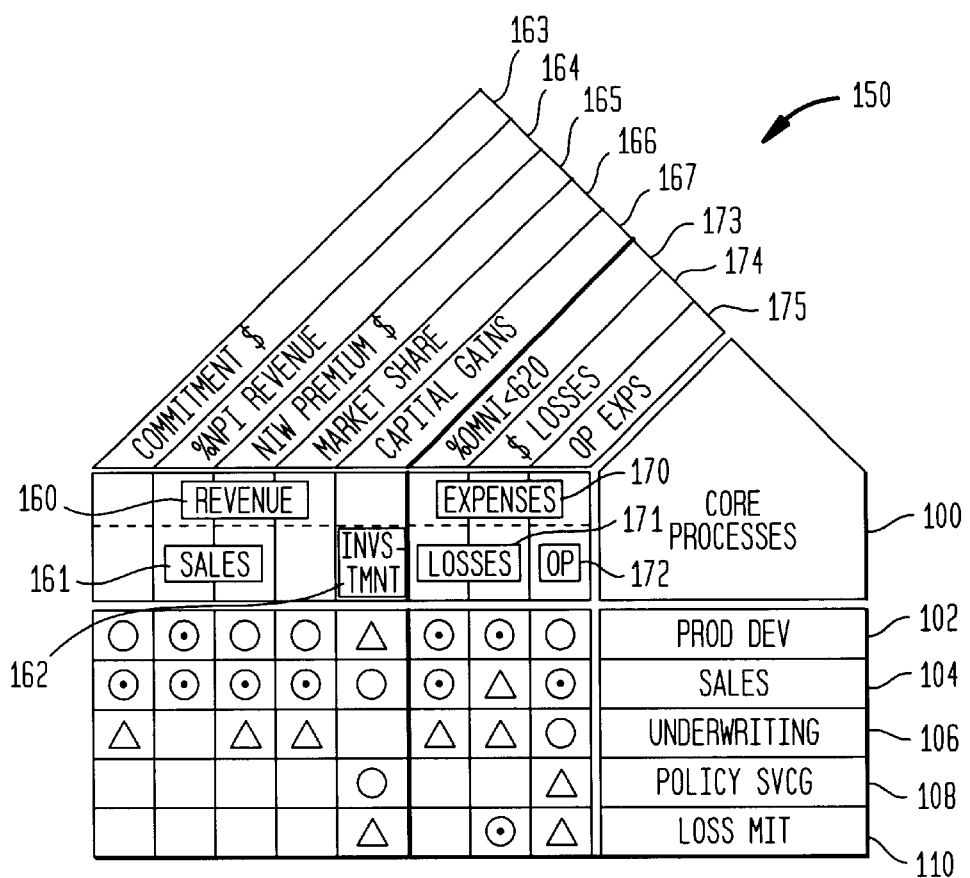
FIG. 1C shows a third house structure for purposes of illustrating how the core processes of FIG. 1A are linked to various financial objectives of the business.

The present invention will now be described more fully with reference to the accompanying drawings, in which aspects of currently preferred embodiments of the invention are shown. It will be recognized, however, that this invention may be embodied in various forms and should not be construed as limited to the exemplary embodiments set forth herein. Rather, the representative embodiments are described in detail so that this disclosure will be thorough and complete, and will fully convey the scope, structure, operation, functionality, and potential of applicability of the invention to those skilled in the art. While the present invention is disclosed utilizing details for an exemplary embodiment relating to the management of mortgage related processes and their linkage to overall customer satisfaction, it will be recognized that the present invention may be readily adapted to a wide variety of business contexts.

As an overview, first core operating processes of a business are identified. For an exemplary mortgage business, core processes 100 might be product development 102, sales 104, underwriting 106, policy servicing 108 and loss mitigation 110, all of which might be illustrated in a "house" structure 120 as shown in FIG. 1A.

Next, the core-processes 100 are linked to an exemplary quality related goal, such as overall customer satisfaction as represented in house structure 130 of FIG. 1B. The house structure 130 illustrates the relationship between the core processes 100 and overall customer satisfaction 132 broken down into the categories of operational excellence 133 and our business is helping your business criteria (OBHY) 134. Under operational excellence, the exemplary items: flexibility 135, informativeness 136, accessibility 137, accuracy 138, knowledgeability 139, consistency 140, responsiveness 141 and timeliness 142 are shown. Under OBHY 134, a single exemplary item, availability of value added services 143, is shown. The impact of the individual items 135–143 identified as contributing to overall customer satisfaction has been ascertained and indicated. For example, the product development process is shown as having a high impact on timeliness 142 and a medium impact on the availability of value added services 143. The high impact is indicated by a circle with a bullet point (⊙) and medium impact is indicated by an empty circle (○). A triangle (Δ) represents low impact and a blank or empty entry represents no impact.

Next, the core processes are linked to their role or roles in achieving financial objectives of the business as illustrated for the exemplary financial objectives of increasing revenue and decreasing expenses in "house" structure 150 of FIG. 1C. In the structure 150, a number of exemplary revenue items are listed in a revenue column 160 and exemplary expense items are listed in an expenses column 170. Revenue is shown broken down into sales and investment related items 161 and 162, respectively. The particular sales related items shown in FIG. 1C are commitment dollars ($) 163, percentage new product introduction (NPI) revenues 164, new insurance written (NIW) premium dollars 165 and market share 166. The sole investment related item shown in FIG. 1C is capital gains 167.

Turning to the expense side of the house, the illustrated expenses 170 are broken into the categories of losses 171 and operating expenses 172. The individual loss items are percentage Omni<620 173 and dollar amount losses 174. The sole item shown under the operating expense category 172 is operating expenses 175. In addition to identifying the core processes 100 and linking those processes to the above described revenue and expense items, the relative impacts of the core processes upon the various items are identified as shown in FIG. 1C. Taking the product development process 102, for example, house structure 150 shows the following relationships: the product development process has a medium impact, represented by an empty circle (○) in FIG. 1C, for commitment dollars 163, NIW premium dollars 165, market share 166 and operating expenses 175; it has a high impact, represented by a circle with a bullet point in its center (⊙), for percentage NPI revenue 164 and both items 173 and 174 under the losses category 171; and it has a low impact, represented by a triangle (Δ), for capital gains 167. Where a block is empty, such as the block at the intersection of underwriting and investment, there is no impact. While four impact levels are shown, it will be recognized that a smaller or larger number of impact levels might be used.

Figure 1D:
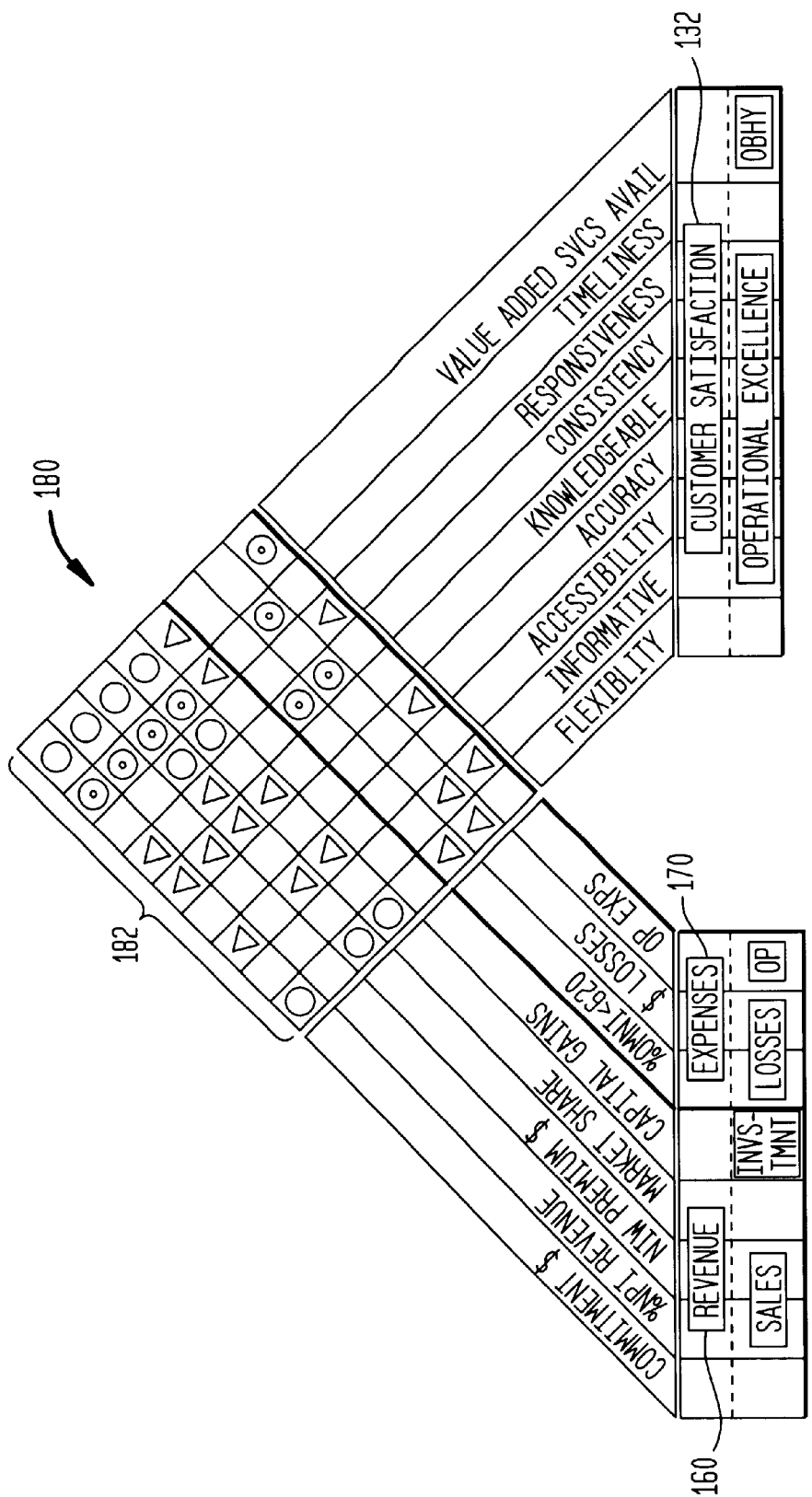
FIGS. 1D and 1E show a fourth house structure linking the core processes of FIG. 1A, the critical quality items of FIG. 1B, and the financial objectives of FIG. 1C.
Figure 1E:
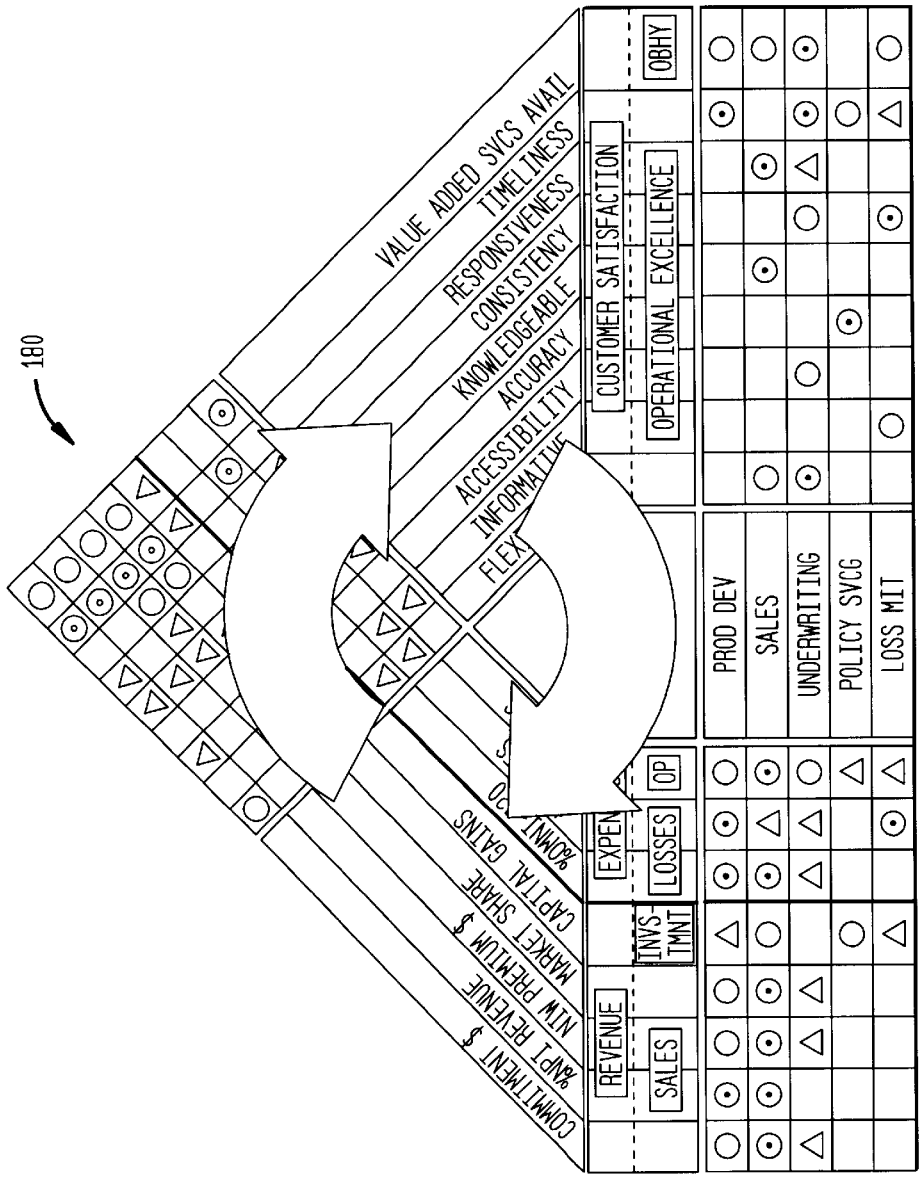

To close the loop and tie items identified as critical to quality (CTQs) from the perspective of customer satisfaction with financial performance, illustrative house structure 180 can be generated as shown in FIGS. 1D and 1E. FIG. 1D omits the core processes 100 and their respective links to emphasize the further links 182 between customer satisfaction 132, on the one hand, and revenue 160 and expenses 170, on the other. In FIG. 1E, the links to core processes are added back in to complete the picture.

To summarize, core operating processes of a business, such as core processes 100, are identified. Next, the core operating processes are linked to a measure of overall quality, or an issue critical to quality (CTQ), such as overall customer satisfaction as illustrated in FIG. 1B. The strength of individual links is evaluated and differentiated by level. The core operating processes are then linked to their roles in achieving the financial objectives of the business, such as increasing operating margin and net income as illustrated in FIG. 1C, for example. Again, the links are evaluated and ranked by the strength of the linkage. In some cases, there may be no link. Finally, a CTQ issue which drives customer satisfaction, is linked to the financial objective, such as increased operating margin or income as shown in FIGS. 1D and 1E.

With this background, we turn to a discussion of systems and methods for implementing the above described approach to process control management and to further details of such systems and methods, as well as advantageous techniques for effectively collecting, navigating through, and utilizing pertinent data thereto.

FIG. 2 shows a quality navigation system 200 in accordance with the present invention. For ease of representation, the present invention will be described in terms of the specific system 200. However, the invention is not so limited, and can be variously embodied with other arrangements of components, other types of computer systems including multiple servers, other software and other types of networks, for example.

The system 200 includes a server 202 connected to user workstations 208 via a corporate internet connection 204, such as the Internet, and an intranet 206. The server 202 contains a process control management system (PCMS) module 210 and a quality navigator (QN) module 220. In general terms, the two modules interact to provide business employees with a linked system of data charts, as well as, the tools to readily navigate through those charts. Process owners glean important insights into how their processes are performing from the customer's perspective, and how to respond appropriately to what the data tells them. The system 200 is preferably available to a plurality of users through user work stations 208 on an intranet web site. Each workstation may typically comprise, a processor, memory, operating software and suitable input and output devices, such as a keyboard 209 and display 211. Other input and output devices, such as a touch screen for input or a printer for output, for example, may of course be utilized.

PCMS module 210 includes executable software 212, tables 213 and database 214. Among its other functions, the executable software 212 supports chart generation, chart maintenance, alerting process owners of out of control processes and the like, as further addressed below. Tables 213 contain various data definitions, such as x bar and the like. Also, as further addressed below, PCMS module 210 preferably automates process control chart monitoring on a real time basis. The system 200 preferably employs a centralized data repository, such as the database 214 which may be utilized to collect business data from many different geographically remote data sources throughout the business. This data may be manually entered or automatically generated and collected. PCMS automates the creation of control and run charts for process control systems (PCS), processes (P) and outcome indicator (Q) charts.

QN module 220 includes executable software 222 and linkage table 224. The executable software 222 fetches data from the database 214 and linkage relationships from linkage table 224 to generate hierarchical linking as addressed further below. As addressed further below, QN module 220 automatically links top level indicators (TLIs) to core and subprocess level process (P) and outcome (Q) indicator charts that impact them. The linked charts are available for viewing by all employees with access to the company web site.

Among the overall system's advantages are real time data with access at all locations. System 200 provides links directly to the process control management system (PCMS) engine 210, and it is also capable of causing the display of indicator linkages by any stratification, such as TLIs, core process, process and subprocesses, compliance and the like. Further, email, page alerts or other notifications may be provided to a process owner where an out of control process is automatically identified. Additionally, and importantly, everyone is focussed on a critical quality issue or issues, such as customer satisfaction. Both the PCMS module 210 and QN module 212 can be accessed by the user workstations 208. The PCMS module 210 and QN module 212 utilize the data of the database 214. The QN module 212 provides a hierarchal web-based linkage that allows users to create and view run and control charts for each business process or top level indicator (TLI) and track quality processes on web pages which are highly intuitive and easy to use, as discussed further below.

TLIs, the top tier of the hierarchal linkage, provide a business wide picture at the highest level from the perspective of customers, shareholders, employees, or the like. TLIs use a vital few measures to assess the current and future health or success of a business. TLIs link to all measures from core processes to sub-processes to micro-processes so individual employees can relate their daily work to the business system.

TLIs are typically based on a process, rather than a function. TLIs give an indication of how well a company is meeting critical requirements and future performance. TLIs make it easier to understand where the business is going, how the business is doing, and through a series of cascading, linked indicators illustrate what a given individual needs to do and how each process contributes to the overall business plan. TLIs assist in setting priorities, identifying problems, and planning for the future. Typical TLIs may suitably include operational measures of business activities which drive revenue, losses, expenses and customer satisfaction.

With an overall organization and system having been addressed, we proceed to discuss the entry of raw data into database 214 to support the operation of the system 200. The following data input mechanisms are presently preferred. As noted above, data may be entered manually or automatically generated and collected.

The system 200 accepts data through stored procedure calls. All chart points are input through a single stored procedure call "insert_stat". This procedure accepts up to four parameters:

| Parameter | data type | description |
| --- | --- | --- |
| Statistic | char (40) | chart name |
| stat1 | char (10) | data point 1 (all charts), a numeric character string |
| stat2 | char (10) | data point 2 (p & u charts), a numeric character string |
| Datestamp | char (20) | date and time of data point (optional). Time defaults to 12:00 AM when omitted. |

The statistic name is required in all cases. The stat1 Value is required in all cases. Stat2 is required on "p" and "u" charts. In these charts, stat1 is the numerator and stat2 is the denominator. The datestamp is optional. If not supplied, the current date and time will be used by the engine.

The store procedure may be called by-way of any Oracle client connection. For example, a Visual Basic application may call the procedure through an ODBC call in the format: "insert_stat2 'chart_name', 'number 1', 'number 2', 'date-time'". A function return code described further below determines the success of the data feed.

| Value | data type | file position | description |
| --- | --- | --- | --- |
| Statistic | char (40) | 1–40 | chart name |
| stat1 | char (10) | 41–50 | data point 1 (all charts), a numeric character string |
| stat2 | char (10) | 51–60 | data point 2 (p & u charts), a numeric character string |
| Datestamp | char (20) | 61–80 | date of data point (optional) |

Numeric strings should contain decimal points for decimal numbers. The stored procedure will perform string to numeric conversion. Numbers should appear in the file as shown in these examples:

120 5 52.750 123.1 1500 1750.25 0.125

Dates should be input in the following formats:

06/01/1997 06/01/97 06-01-1997

For batch input in a multiple virtual storage (MVS) environment, the following job control language (JCL) may be used to invoke a stored procedure:

Exemplary input parameters (PARM) ate the parameters shown in parameter table 300 of FIG. 3.

Exemplary code 400 to randomly sample data in sub-groups of twenty-five data points, code 402 and to load all data to the engine with no sampling, code 404, is shown in FIG. 4.

Next, accessing and utilizing the PCMS system are described. With the PCMS system implemented in a presently preferred web based embodiment, the ability to track quality processes is made available within a business utilizing the company's existing intranet. Alternatively, as discussed in connection with FIG. 2 above, the system can also be Internet based. View control charts and input data points can be electronically reviewed, chart attributes can be electronically maintained, and new charts can be created.

Figure 5A:
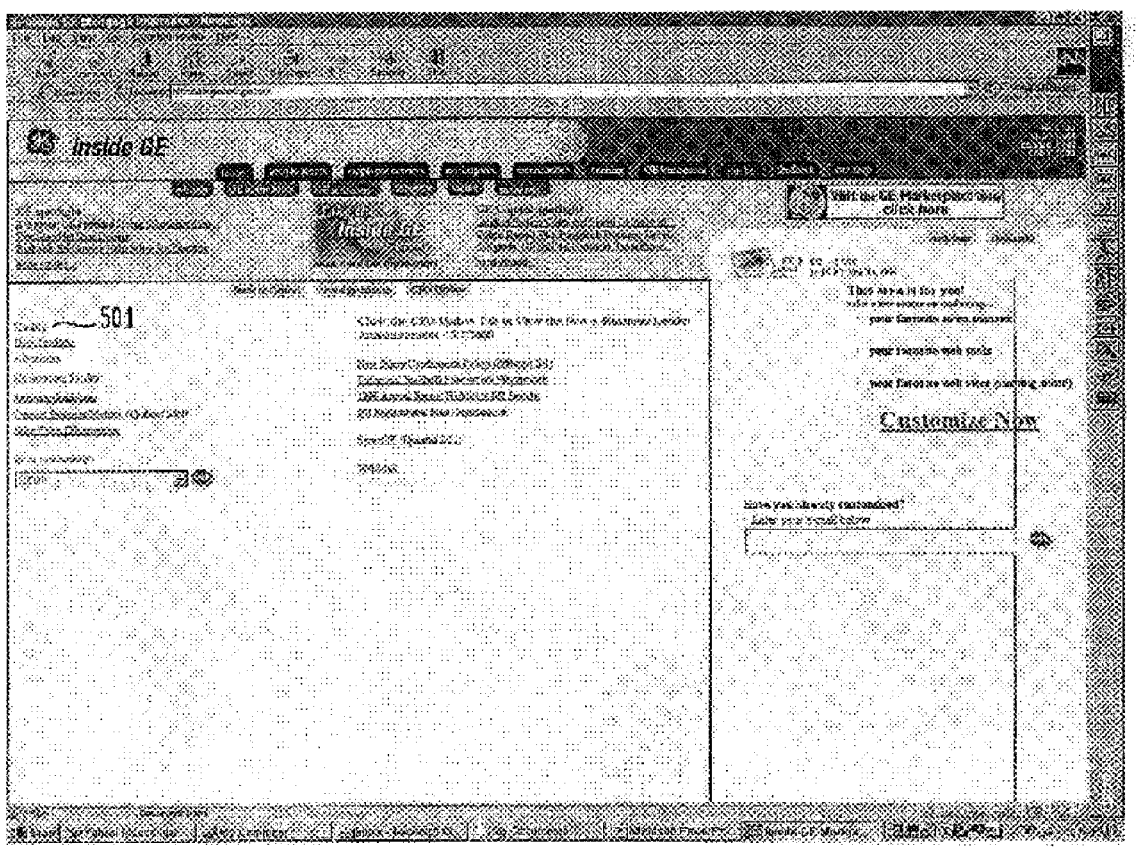
FIGS. 5A–5H illustrate exemplary web pages for accessing and utilizing a process control management system (PCMS) in accordance with a first embodiment of the present invention.

The application is accessed utilizing a uniform resource locator (URL) or location and opened utilizing a web browser or other suitable software, such as Netscape Navigator™ or Internet Explorer™. From a home page such as home page 500 shown in FIG. 5A, the user clicks on a selection entry 501 or an icon, such as "Quality". To access the PCMS application, a user clicks on the words "Process Control Management System" 511 as shown in screen shot or web page 510 of FIG. 5B. To access the QN application, the user clicks on the words "Quality Navigator" 512. PCMS is discussed below in connection with discussions of FIGS. 5–15, and QN is addressed below in connection with FIGS. 16–18. There is discussion of these figures which of course overlaps, for example, the discussion of PCMS and QN maintenance in connection with FIGS. 12A–15B.

If the user selects Process Control Management System 511, a PCMS home page 520 is generated. From the PCMS home page 520 shown in FIG. 5C, a variety of options are available. Since there are many charts in the system, a user may want to narrow down the chart list that follows the user throughout his or her navigation through the application. This list is created using the home page 520.

A user may simply enter a text string common for all of the charts that he or she desires to work with in an "Enter Search Criteria" text box 522. Next, the user informs the application where that test string lies within the chart name by selecting from the "Get List" 524 among the options "Starts With", "Ends With" or "Contains". Starts With indicates that the chart name begins with the text, Ends With indicates the chart name ends with the text, and Contains indicates the chart name has the text anywhere in the name.

Once a user has completed building the search criteria, a database is selected from the "Select Database" drop down box 524. When the "Get List" button is clicked or selected, the chart list appears on the page. If the "Enter Search Criteria" text box is left blank and "Get List" button 526 is selected, the database returns all of the charts to the user's chart list. It is suggested that search criteria be entered to limit the chart list because that list follows the user during navigation from page to page. The list should be made as short as possible to increase the application response time. The chart list can be rebuilt or readjusted as desired, by returning to the home page 520.

After the user is satisfied with the chart list, from the "Select Control Chart" drop down menu 524, the user selects the chart that he or she wants to work with. BRS.Eighth.np is the chart shown in exemplary screen 530 of FIG. 5D. The user then selects an action from "Select Action" drop down menu 532 and clicks "Go" button 534. The action "View Chart-Small" is shown highlighted in FIG. 5D as the action to be selected.

Figure 5B:
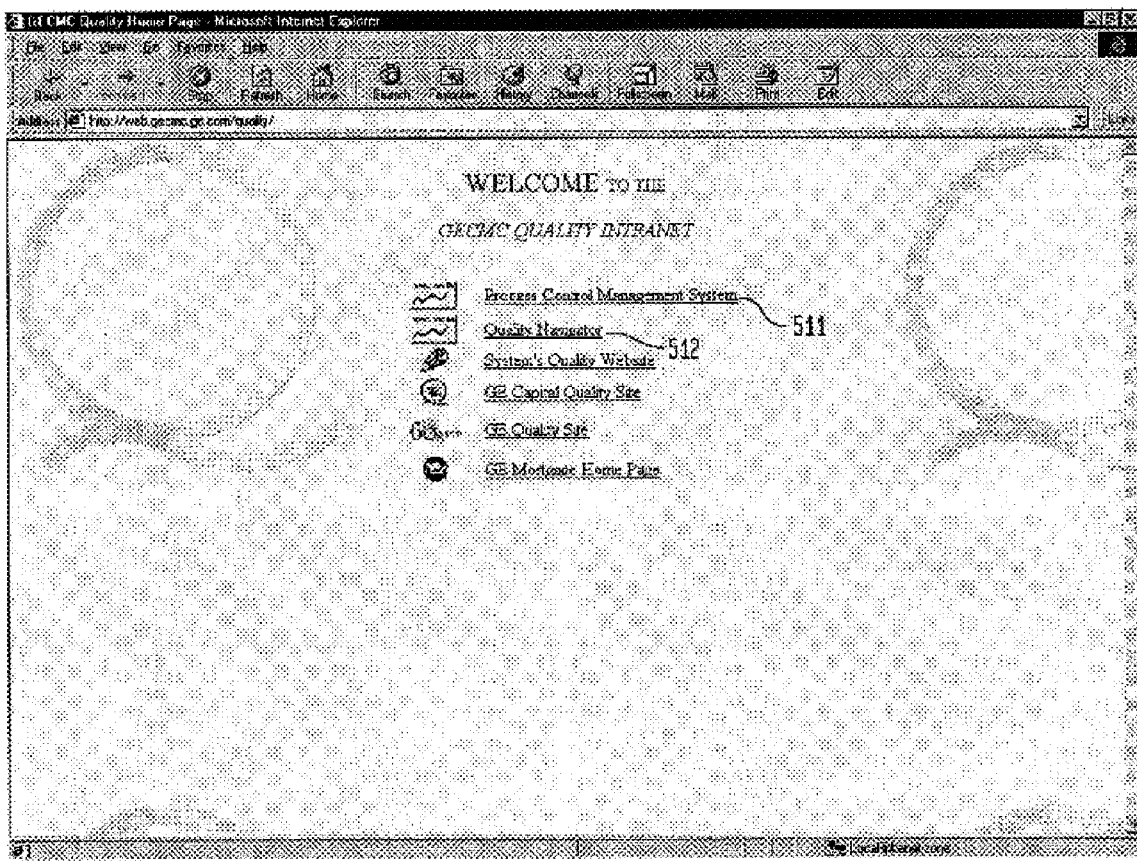
Figure 5C:
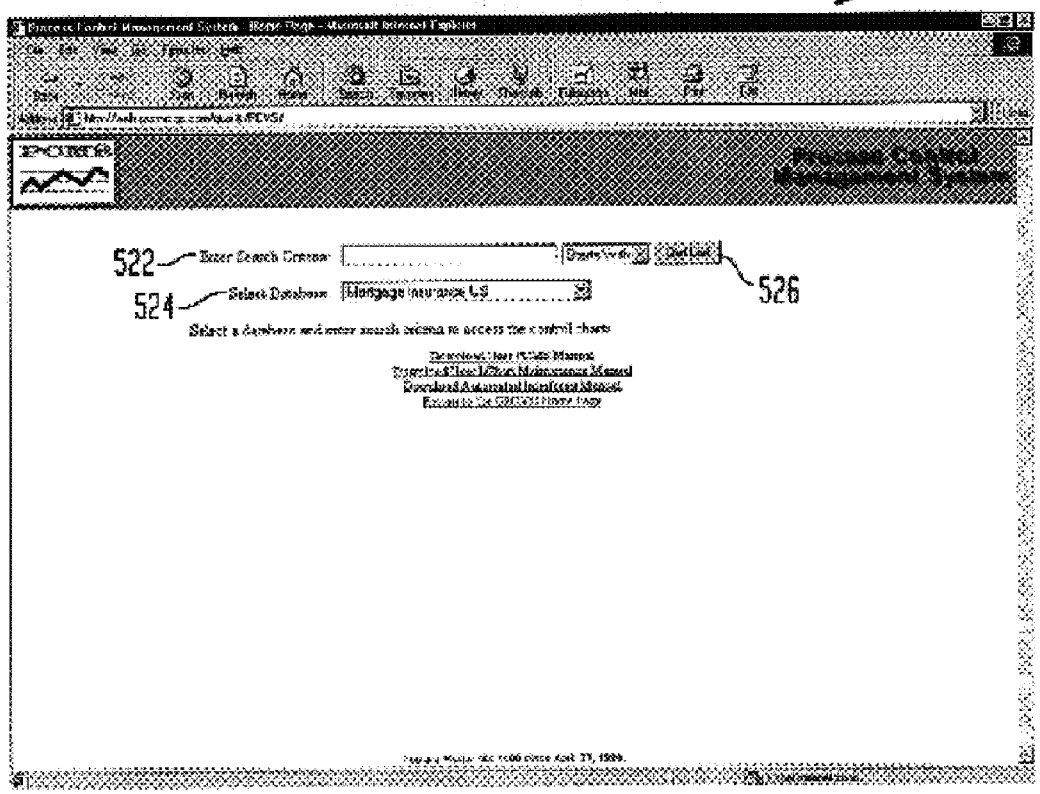
Figure 5D:
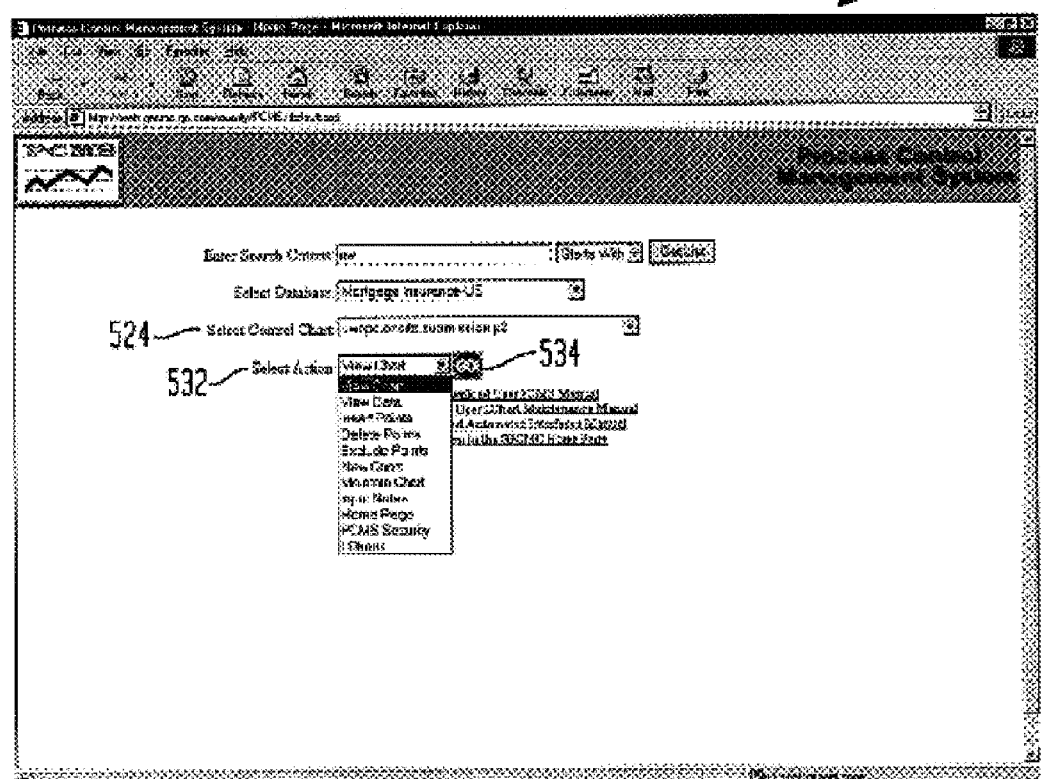
Figure 5E:
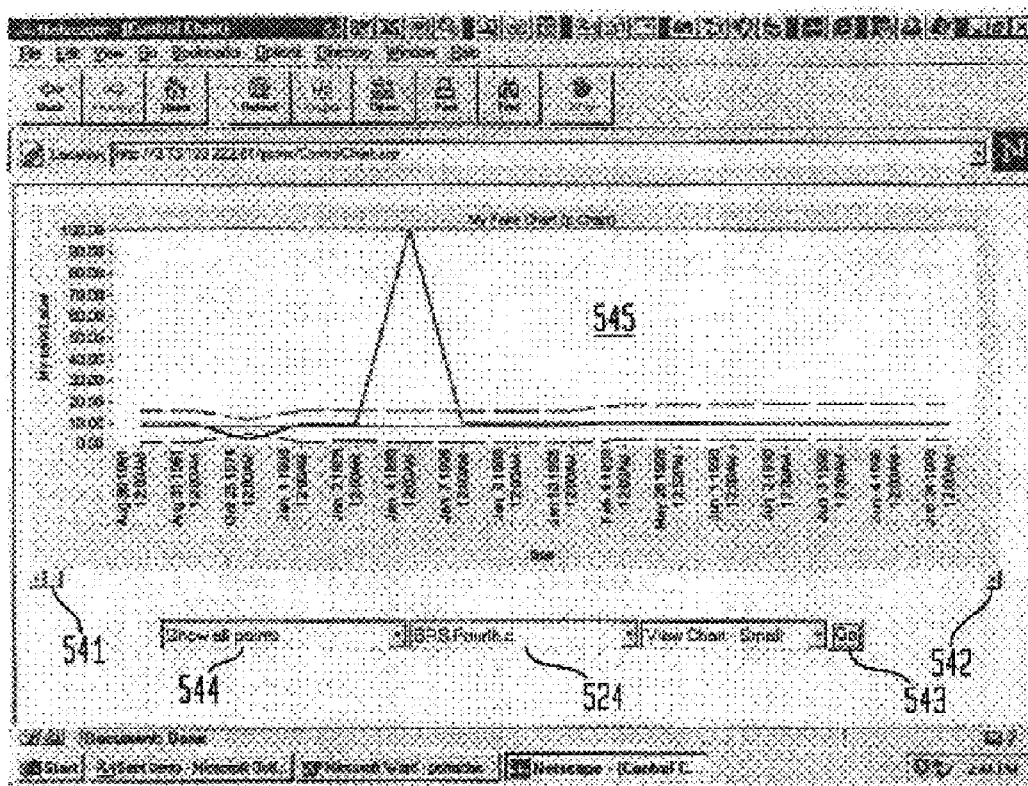

FIG. 5E illustrates an exemplary "View Charts" page 540 which would be displayed in response to the action "View Chart-Small". The View Charts Page format of FIG. 5E is used to display the control charts. The scroll bars 541 and 542 at the bottom of the chart are used to view all of the data points. At the bottom of the page 540, notice that the chart list 524 has followed from the home page 520. If a user wishes to view another chart on the chart list, simply select that chart, and click "Go" button 543.

It may be desirable to see all of the data points on one page rather than scrolling. To see this display, the user adjustably selects the number of most current points from a "Data Points" drop down list 544. As an alternative to "Show All points" the user may select the 25, 50, 100, 250, and 500 most current points for display. After clicking the "Go" button 543, the chart is redrawn without the scroll bar and the selected number of the most current points are displayed. Selecting "Show All Points", redraws the chart with the scroll bar and all of the data points. As will be addressed further below, xbar_r. xbar_s and x_r charts have range charts associated with them. Both charts will be shown on one screen at first. The user can scroll to the bottom of the page and click either "View Chart" or "View Range" to see larger version of the charts.

Figure 5F:
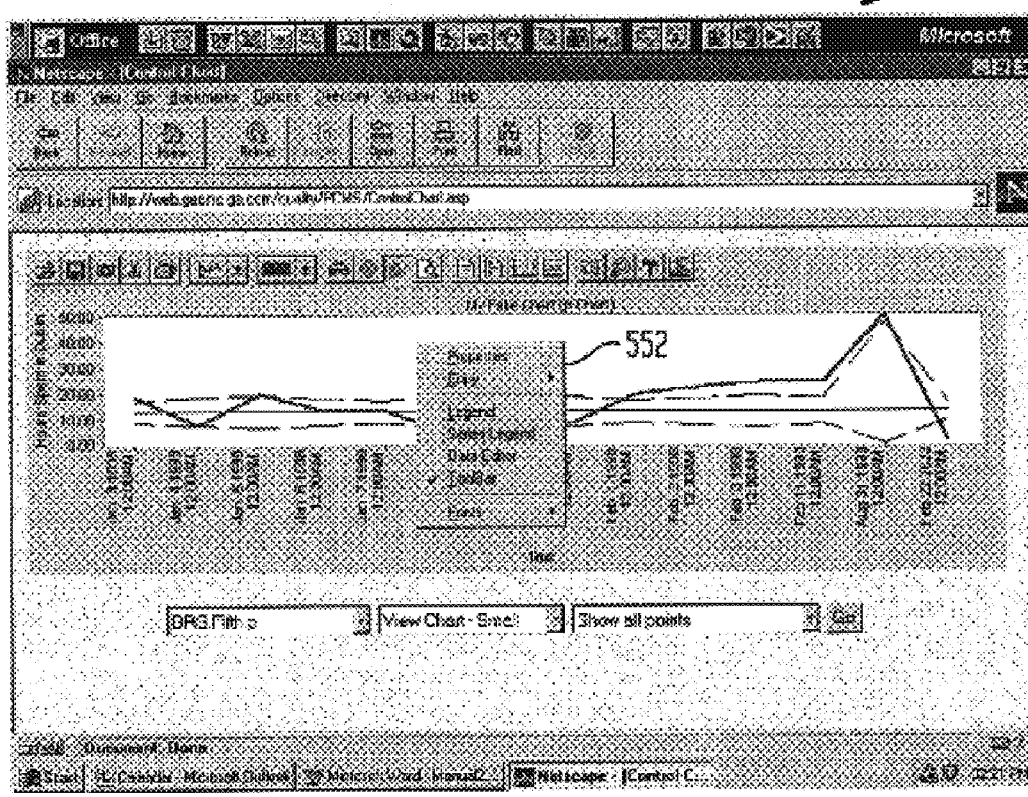

A "right click" on control chart 545 of FIG. 5E results in screen 550 shown in FIG. 5F. A pop up window. 552 is displayed. Table 1 below describes the functionality for each item in the pop up window 552.

TABLE 1

| | |
| --- | --- |
| Properties | Opens the Properties Dialog box |
| Copy Data | Copies the data for the chart to the pasteboard |
| Copy Bitmap | Copies the chart to the pasteboard in bitmap format |
| Copy Metafile | Copies the chart to the pasteboard as a metafile. Paste to Power Point as a Power Point object and you are able to edit each individual title, line, or date. |
| Legend | Shows the dates as the legend for the chart |
| Series Legend | Shows the line legends |
| Data Editor | Displays the data used to draw the chart. The user can edit and change this data but should be aware, this does not change the data in the database. |
| Toolbar | Displays the chart toolbar at the top of the chart. The toolbar has features such as printing, changing colors or fonts, and copying. |
| Fonts | Allows the user to change the fonts for the chart labels, axis, and legends |

A user unchecks the option from the pop up window 552 to return to the original state.

If using Microsoft Internet Explorer™ rather than Netscape Navigator™, the user will be prompted to down-load an Active X control. By responding "yes" and downloading this control, the user will now be able to see the new charts.

The following listed functions are commonly employed:

1. To change the chart being viewed a new chart is selected from the drop down list, then the user selects view chart from the action list, and clicks the "Go" button.

2. Point labels are removed from the chart by clicking the labels button.

3. The number of data points viewed is filtered by inputting the number of points that the user wishes to view in the first text box and clicking the filter icon.

4. The number of data points viewed by date range is filtered by entering the begin date in the first text box and the end date in the second text box, and clicking the filter button.

5. A chart is printed by clicking the print icon. The print preview window will open, and the user proceeds in the normal manner to cause printing to occur.

Figure 5G:
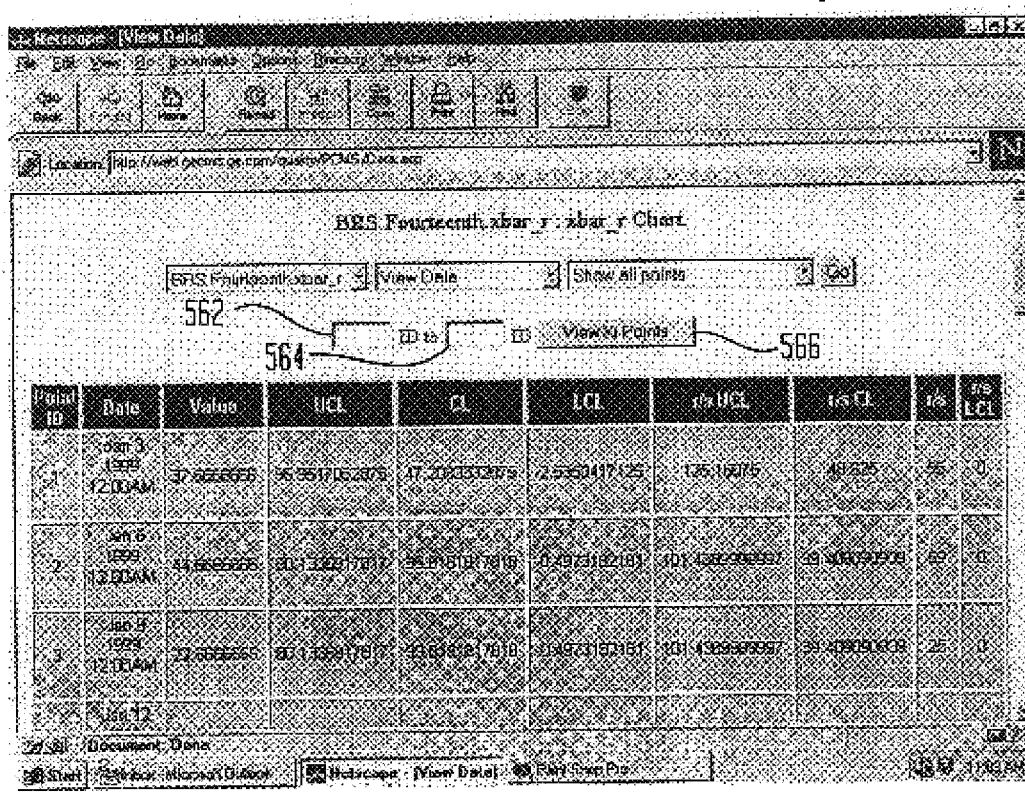

Underlying data in the database 214 is viewed by selecting the "View Data" action and clicking the "Go" button. An exemplary data page 560 is shown in FIG. 5G. The data of data page 560 is not editable. To edit the data points, a user must select the Insert or Delete Data points as addressed elsewhere. Page 560 simply displays the data points. As was the case for the View Charts page 540, a user can limit the data points and view different charts in your chart list by selecting from the list and clicking the "Go" button.

Figure 5H:
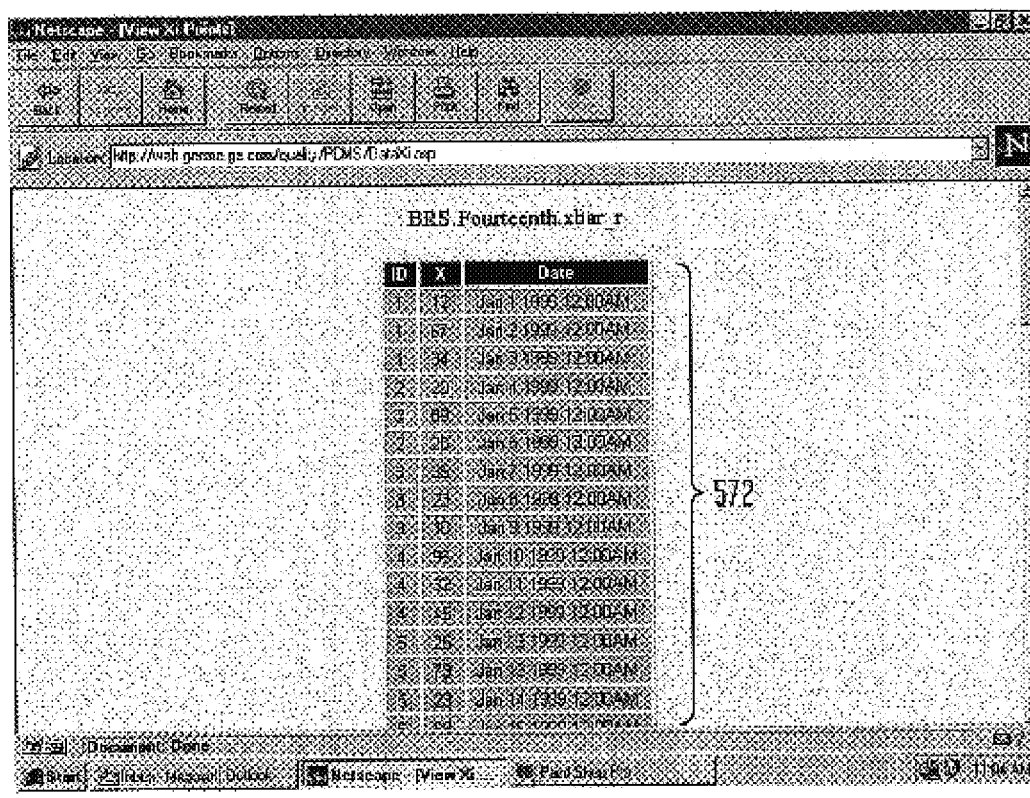

To view the Xi points, on the "View Data" page 560, in first "Point ID" text box 562, enter the Point ID number of the beginning data point. In second "Point ID" text box 564, enter the last Point ID number. Click "View Xi" button 566, and a list appears with all of the points in the subgroup that roll up to the actual charted point. An exemplary view Xi points page 570 is shown in FIG. 5H. The Xi points 572 are only available if you set the xbar_r or xbar_s "Retain Xi" points attribute to "Y".

Figure 6A:
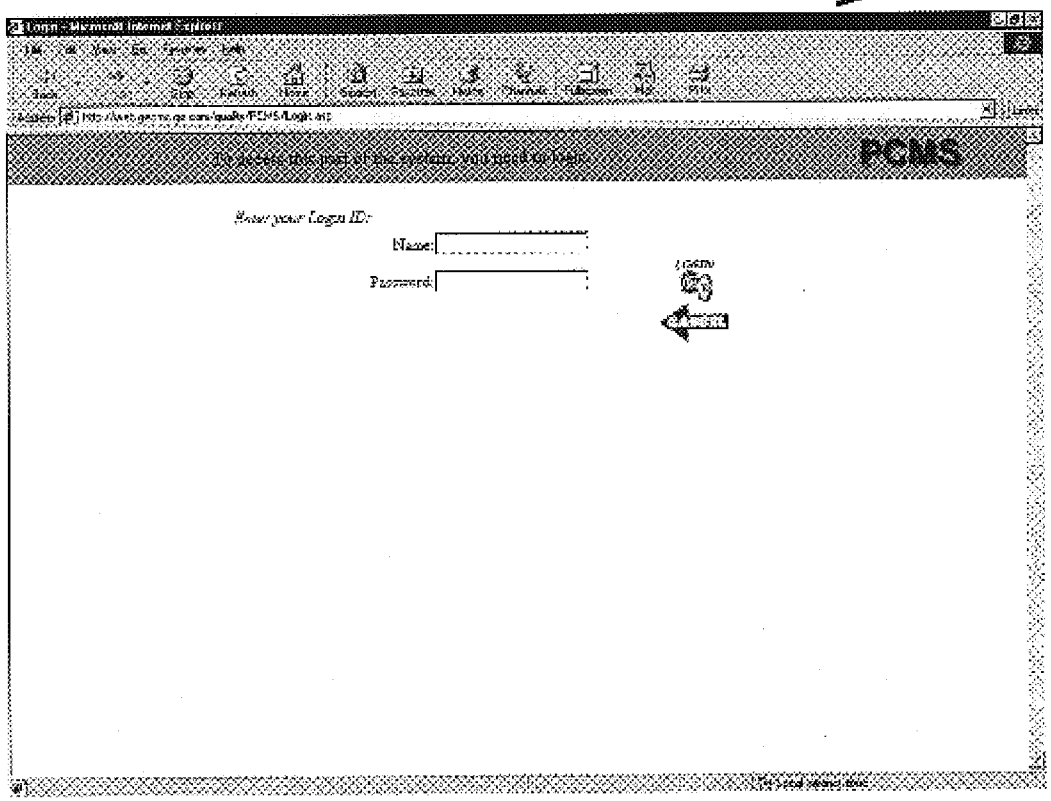
FIGS. 6A–6D illustrate exemplary web pages for inserting and importing data points to the PCMS system.

To access the Insert Data Points, Delete Data Points, Exclude Data Points, Maintain Chart, or Create A New Chart pages, a user needs to login to a database, such as database 214. A login page 610 as shown in FIG. 6A appears the first time a user accesses a database and when the user moves from database to database. Once having logged on, the system keeps your Login ID until you close the application or go to another database. Even though a user has the ability to login to the database, he or she still may not have rights to edit all of the information. The authorized person or personnel for a given project will request and establish login rights for each user at an appropriate level.

Figure 6B:
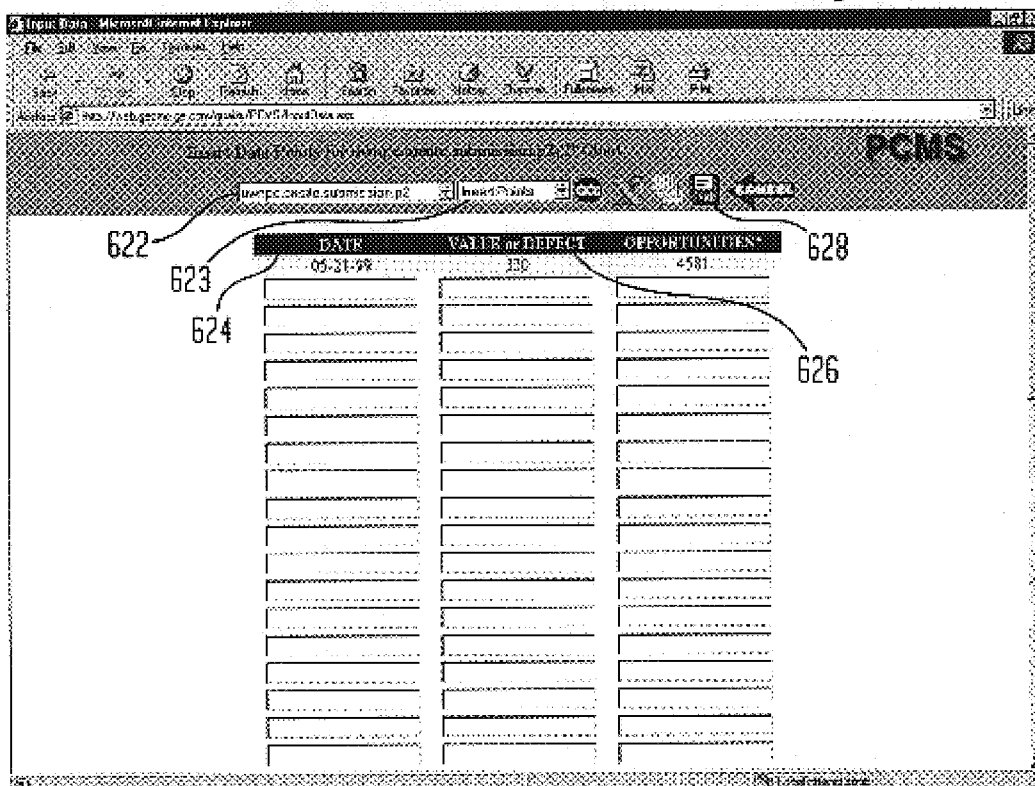
Figure 6C:
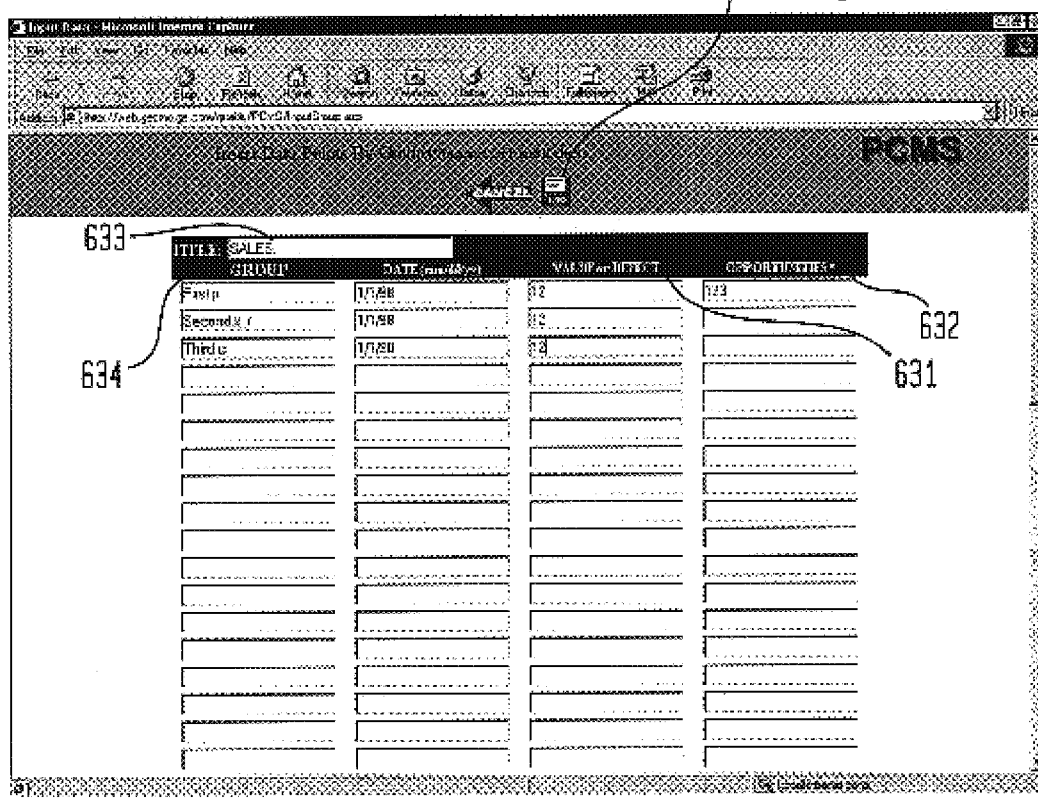

The user having login rights to edit information will select from the chart list, the chart for which it is desired to insert data. An exemplary insert data page 620 is shown in FIG. 6B. Unlike the other pages, drop down list 622 accepts new selections without clicking the "Go" button. The earliest point inserted in the database will be displayed at the top of the table. If applicable, xbar_r and xbar_s, the subgroup numbers will appear along the side of the table.

The date and time for the point are entered in "Date" column 624 in the format MM/DD/YY 00:00. If you leave off the time, it will default to 12:00 AM. Hours after 12 noon are expressed in military time, for example 2:00 PM would be 14:00. For xj_r, xbarj_r, xbar_s, np, and c charts, the value for the data point is entered in a "Value" column, such as column 626 in FIG. 6B or column 632 for exemplary Insert Data Points by Group page 630 of FIG. 6C. For p and u charts, enter the number of defects in first column 631, and in second column 632, enter the total number of opportunities. "Save Data" button 628 is clicked to actually insert the data points into the database. After the data points have been inserted, the results of the insert are displayed. This display informs the user how many data points were successfully inserted and how many errors there were. If you make an error in a chart with subgroups, xbar_or xbar_s, the system will not insert the remaining points because the subgroup numbering will be incorrect. There may be several reasons a data point will not be inserted into the database. For example, the login ID used to login did not have edit rights to that chart, the date entered is already in the database, the data is not in a valid format, the number is not numeric, or in the case of p charts, the number of defects is greater than the number of opportunities.

Another way to insert data is by data groups. For example, for the following exemplary three charts: SALES.First.p, SALES.Second.x_r, and SALES.Third.c, all three charts begin with the same characters, and therefore they belong to the "sales" group. The group functionality is accessed by clicking the "Insert as Groups" button from drop down menu 623 of the "Insert Data Points" page 620. Any data entered on the "Insert Data Points" page 620 will be lost, if not saved first. In this instance, the chart list does not follow because it will not be used.

In "Title" box 633, the group name is entered. In the example shown, it would be SALES. In the "Group" column 634, the remainder of the chart name that makes it distinct in the group, for example, First.p, is entered. The Date and Value(s) are entered in a similar fashion to that described above. In the next row, data points for another chart in the group are entered by entering the remainder of the chart name in the Group column, for example, Second.x_r. Again, the date and data points are input. In a presently preferred embodiment, it does not matter what the chart type is of the previous chart. Each is independent. You can have an x_r chart in one row and a p chart in the next. When the user is done entering all of the data points, "Save Groups" button 635 is clicked to add those data points to the database. A message notifies the user of the success of the insert.

Figure 6D:
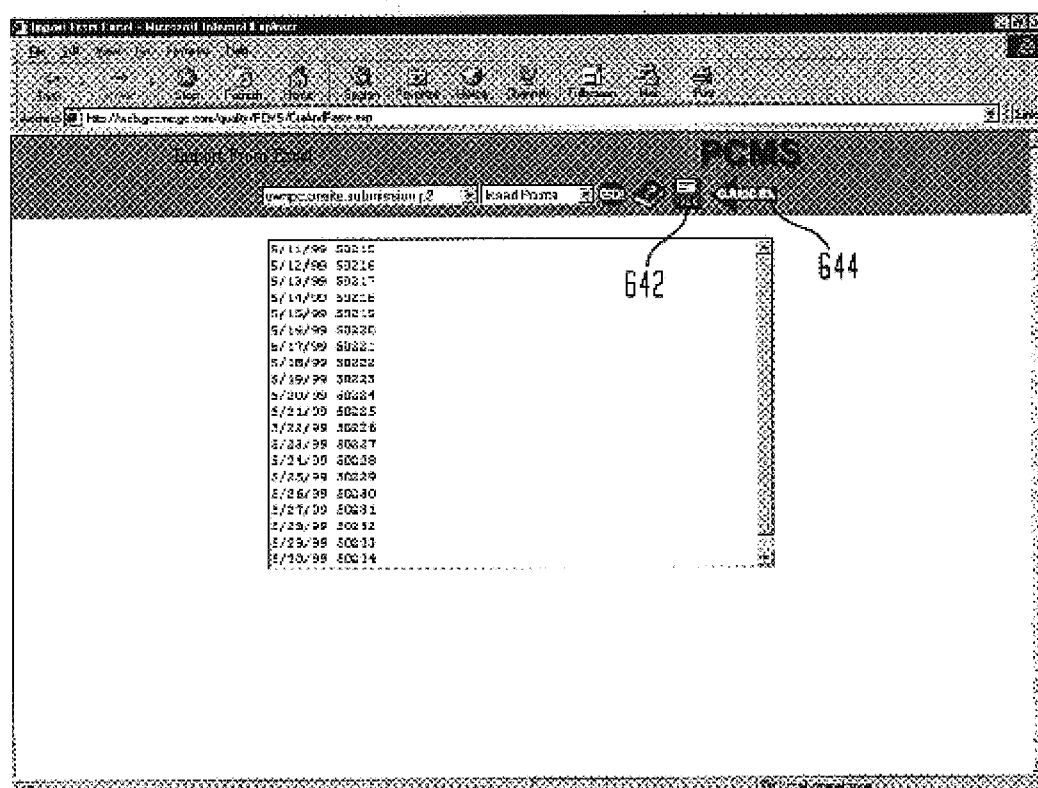

As an alternative to the direct entry of raw data addressed above, a user may wish to import data from another existing source, such as an Excel™ spreadsheet, for example. To this end, an "Import from Excel" page 640, as shown in FIG. 6D, is provided and utilized as described below. It will be recognized that the PCMS system may be readily adapted to import data from other sources.

In order to use the "Import from Excel" page 640, a user first selects the appropriate chart from the chart list. Next, copy (or cut) within Excel the correct number of columns for the selected chart type and then paste them into the text area. For "p" or "u" charts, three columns—date, values or defects, and opportunities—must be pasted into the page. For all other chart types, two columns—date and values or defects—must be pasted into the page. After the columns have been pasted in, click on "Save Data" button 642 to enter these values into the database. Because of the time it takes the database to process the columnar data that has been pasted in, the number of rows that may be inserted in at one time is limited to 50. After the data points have been inserted, the user will get the results of the insert. The results inform the user how many data points were successfully inserted and how many errors there were.

There are several reasons a data point will not be inserted into the database. For example, the login ID used to login the data does not have edit rights to that chart. The date entered is already in the database. The data is not in a valid format, the number is not numeric, or for "p" and "u" charts only, the number of defects is greater than the number of opportunities. To clear the text area, the user clicks on "Cancel" button 644.

In a presently preferred embodiment, there are several issues of which users should be aware when using this importation functionality. A list of guidelines can be accessed by clicking on an "Input Rules" button. The caveats are as follows: (1) make sure that the number of columns pasted in is correct for the given chart type. Only "p" and "u" charts should have three columns (i.e., date, values or defects, and opportunities). All others should only have two. Moreover, the columns of data should be pasted in the following order: date, values or defects, and opportunities, if applicable. (2) Data should only be pasted into the text area and not entered or edited manually. (3) "Select All" from within Excel should not be used when cutting and pasting as this may cause the web page to work incorrectly. Instead, select only those cells that need to be copied and paste them into the web page. (4) Be sure that no blank rows have been pasted into the text area. (5) Only 50 rows may be pasted in at one time.

Figure 7A:
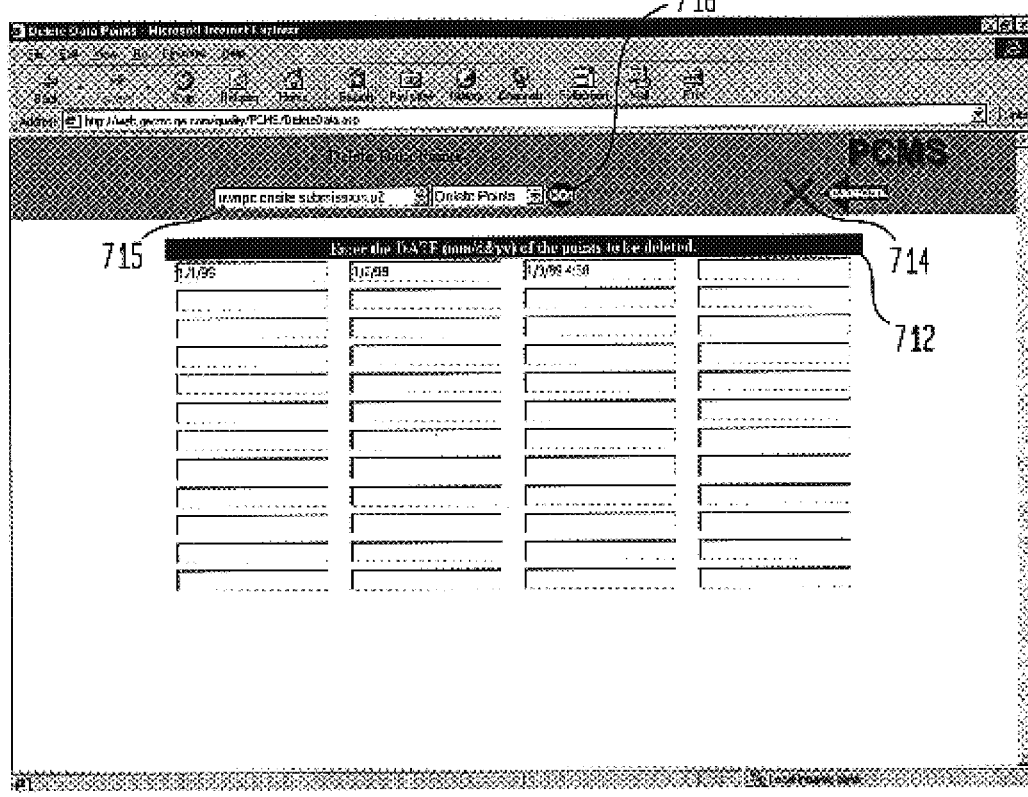
FIGS. 7A and 7B illustrate exemplary web pages for deleting data points and excluding data points, respectively.

Next, deleting data is addressed. To this end a "Delete Data" page 710, as shown in FIG. 7A, is provided. In text boxes 712, the user enters the dates for the points to be deleted. The time must also be entered if it is different from the default time of 12:00. After the dates have entered for all of the points to be deleted, delete points button 714 is clicked. The designated points will not be deleted if the data entered was in an invalid format, the login ID does not have the right to delete points, or the date does not exist in the database. Chart list 715 is used to delete points from other charts or select another action which is executed by, clicking "Go" button 716.

Figure 7B:
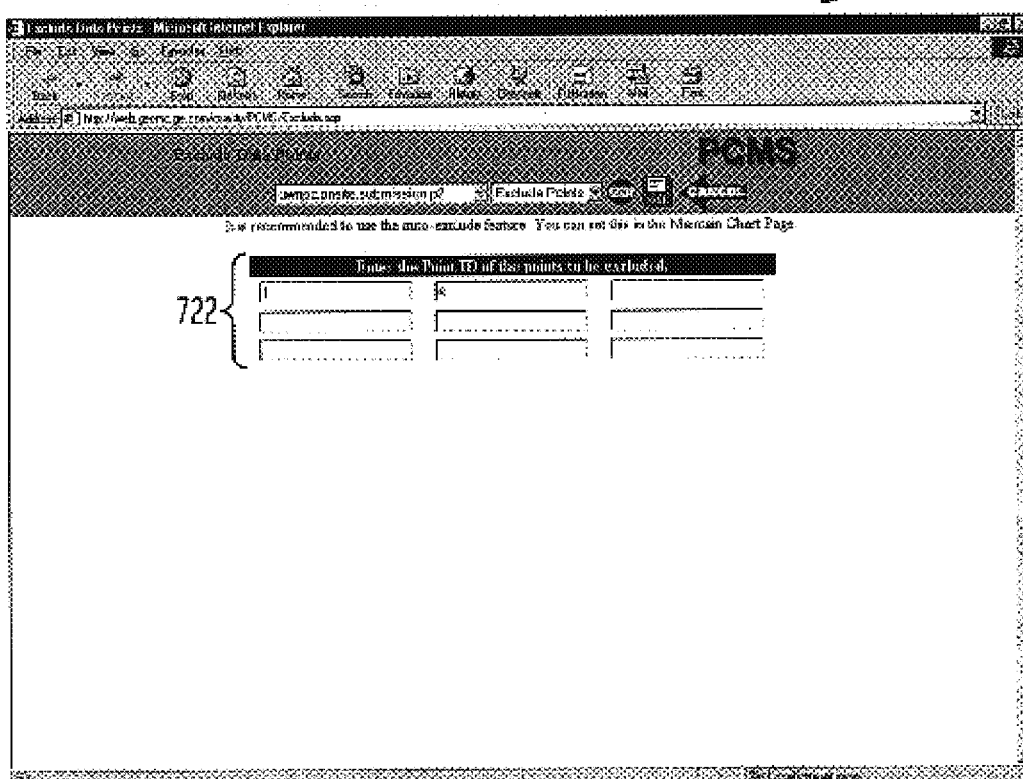
Figure 8A:
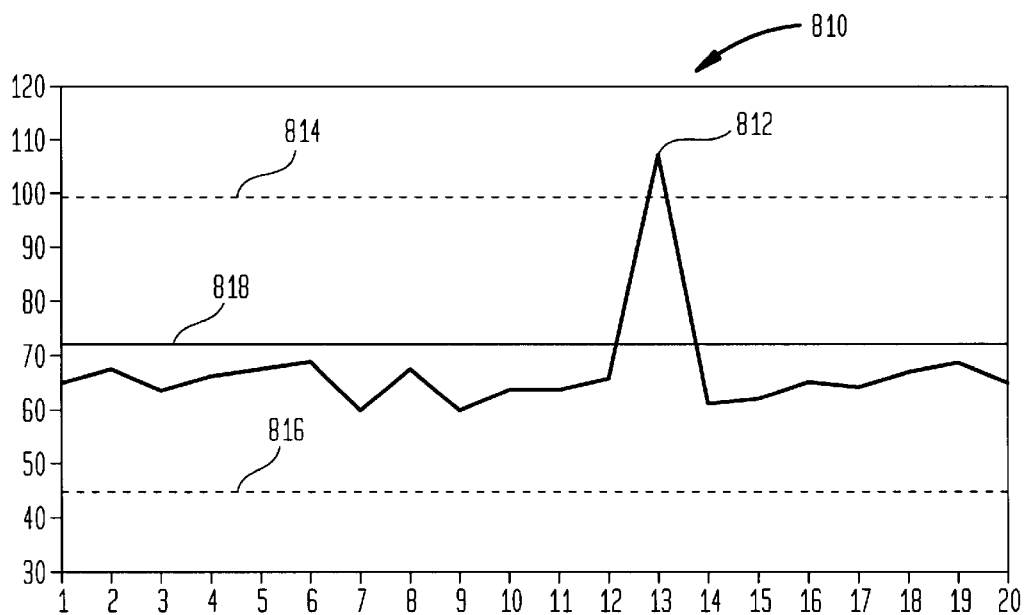
FIGS. 8A and 8B are charts illustrating the advantages of automatically excluding points from the calculation of control limits without removing them from the chart in accordance with the present invention.
Figure 8B:
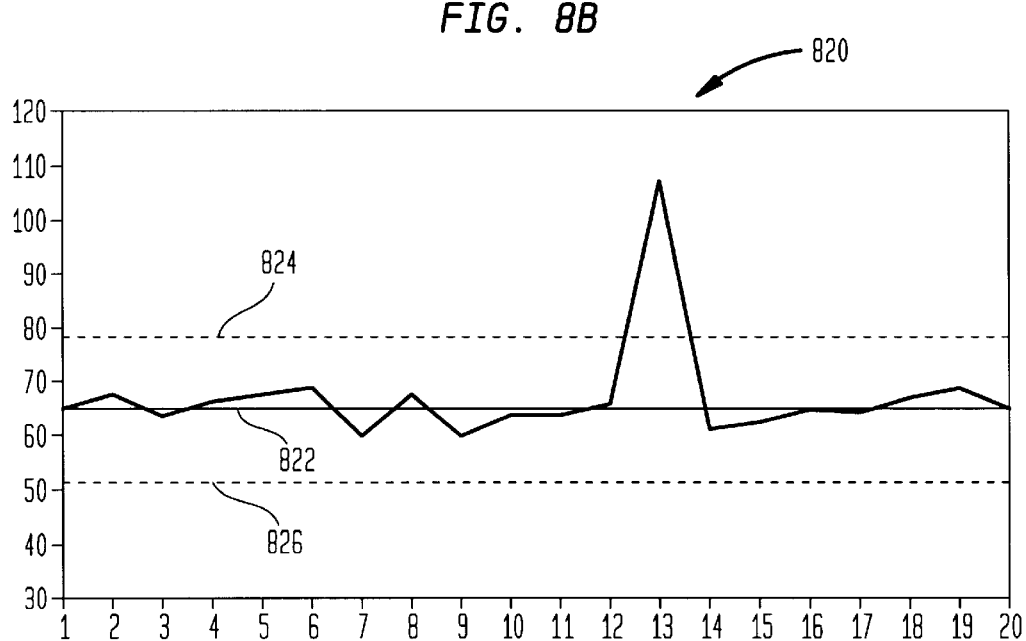

Another aspect of the present invention is the inclusion of the feature of evaluating points for automatic exclusion where those points are recognized as drastically different. To this end, an "Exclude Data" page 720 shown in FIG. 7B is preferably employed. It is presently recommended that most users use an auto exclude feature, which can be set using a "Maintain Charts" page. This feature will automatically exclude any drastically different points from the calibration calculations but still include the points in the chart. Rather than this automatic approach, a user can manually force the point to be excluded by entering the "Point ID" for the points in text boxes 722 provided on page 720. The "View Data" page 560 is used to find the database "Point ID" number for the data point. The user can navigate to other charts using the chart list or perform another action using the action list.

Exclude points are a misunderstood or unknown concept in the engine. The idea of recognizing exclude points is to "exclude" points from the control limit calculation without removing them from the chart. This feature is valuable when an extreme outlier begins to influence the mean, causing a run to occur because the centerline has shifted. The run is typically accompanied by a "widening" of the control limits. Consider chart 810 shown in FIG. 8A. In this chart 810, with the exception of point 13 labeled 812, for ease of reference, the chart would be in control. In other words, the data points 1–20 would be within control limits 814 and 816 represented by dashed lines. The extreme value of point 13, however, has caused the mean 818 to be higher than it would otherwise be and now the remainder of the chart is in a run below the mean. The control limits are also much wider than they should be due to the high average standard deviation caused by point 13. The exclude feature of the engine allows point 13 to be "excluded" from calculations yet remain on the chart so that it can be properly considered by the appropriate person or people. Once point 13 has been excluded, the chart looks like chart 820 of FIG. 8B. The mean 822 now passes nicely through the distribution and the control limits 824 and 826 have narrowed appreciably giving a user a truer appreciation of how a monitored process is truly proceeding.

In a presently preferred embodiment, exclusion can be performed in either of two ways, manually or automatically. The manual technique requires the user to monitor the chart and make decisions on points which should be excluded. When identified, the point id (not the date or data value) must be entered on the insert page, and the exclude button is pressed. The chart must then be calibrated for the effect to be-seen. Note that exclusion only applies during the calibration window. Once a chart has "locked in" limits, exclusion is not required since new limits are not being computed.

Figure 9:
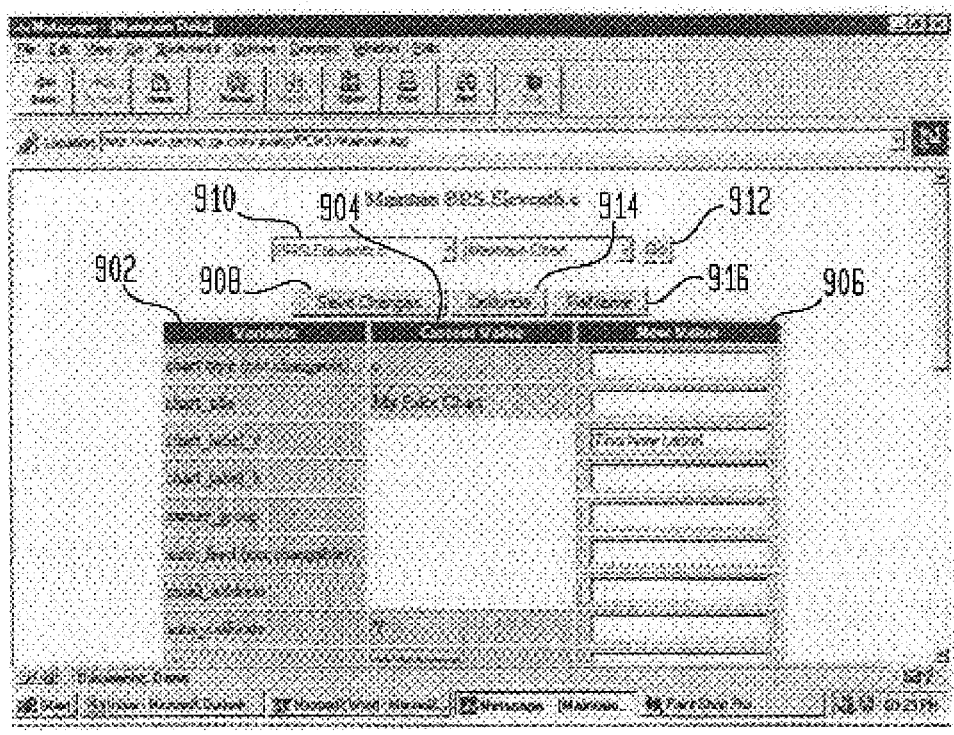
FIG. 9 is an exemplary web page for chart maintenance in accordance with the present invention.

Proper chart maintenance is another important aspect of the present invention. An exemplary "Maintain Charts" page 900 is shown in FIG. 9. Maintenance is discussed briefly immediately below and at greater length in an extended maintenance discussion further below in connection with FIGS. 12A–15B. Briefly, the attributes of a chart are edited on the "Maintain Charts" page 900. A left column 902 in the displayed table indicates the name of the attribute. Table 2 below further describes the available attributes. A center column 904 lists the current value in the database for the attribute. Lastly, a right column 906 includes text boxes where a new value for the attribute is entered by a user. To submit changes to the attributes, "Save Changes" button 908 is clicked. The attributes of another chart are changed by selecting that chart from the chart list 910 and clicking the "Go" button 912. "Calibrate" button 914 forces the database calibration routine to run if it is needed. Finally, "Rename" button 916 allows the renaming of the charts on the chart list 910.

TABLE 2

| | |
|---|---|
| Chart_title | The title displayed on output at the top of the graphical display (Excel spreadsheet). |
| Chart_label_v | The vertical axis display label (Excel spreadsheet). |
| Chart_label_v_alt | The vertical axis display label for p and u charts for the Dashcard. |
| Chart_label_h | The horizontal axis display label. This field supports a "wildcard" string of "&date" which will display the date range of displayed data points (Excel spreadsheet). For example, a label of "weekly plot - &date" might display to the user as: "weekly plot - May 1–Jun. 15" |
| auto_calibrate | This switch turns on and off automatic calibration of control limits. When on, the engine will automatically compute control limits. When off, the analyst must specify control limit values. With no control limits and this switch off, the chart becomes a run chart with no indicator checking. |
| Auto_email | This switch will turn on and off the automatic notification process for special cause indicators. |
| Email_during_calibrate | During the calibration process (usually 10 to 30 points), email notifications will be sent on special cause indicators if this switch is turned on. Deletion of an address requires system intervention. |
| Auto_feed | This switch cannot be modified by users. It is automatically turned on the first time a chart is updated by an automated process. All automated processes will use specific user ids which will be identified as automated "feeds". Once a chart has been updated by an automated process and the switch is turned on, the chart will no longer accept points via manual input. (PCMS programmers may turn the switch off in rare cases where manual updates are required). |
| Owner_group | Online users of the PCMS Engine will be associated with user groups. When a chart "owner group" is set, only users within that group may update the chart. At this time, the owner group field must be set manually. |

TABLE 2-continued

| | |
|---|---|
| Sample_size (XbarS & XbarR) | Sets the sample or sub-group size. For XbarS and XbarR charts, the engine will accumulate individual points and compute subgroup statistics for plotting the charts. The default subgroup size for XbarR and XbarS charts is five and ten, respectively. |
| Retain_x_i_points (XbarS & XbarR) | When on, the engine will keep all sub-group points stored in the database. If off, the engine will delete individual data points once the sub-group statistics have been calculated. |
| Calibrate_from_points | The minimum number of points required for the calibration routine to compute limits. |
| Calibrate_to_points | The maximum number of points the engine will use in computing control limits. |
| Calibration_cutoff_date | The date at which control limit calibration of computation begins. The default is NULL at which point calibration begins at chart point 1. |
| Calibration_cutoff_point | The chart point at which calibration begins. Actually, calibration is determined by point rather than date. When date is specified, the earliest point on that date is selected for the starting point. The point setting allows the analyst to select a specific point within a date. The default is NULL at which point calibration begins at chart point 1. |
| Use_general_p_rule (p charts) | When on ("Y"), causes the engine to apply specific "p" chart control limits. |
| Use_general_u_rule (u charts) | When on ("Y"), causes the engine to apply specific "u" chart control limits. |
| Use_pct_rule (P & U charts) | Causes the engine to apply the 25 percent rule to the chart which flattens the control limits. This may be turned on even when the general rules is being used. It will then apply both sets of rules on the charts. When the general rule is off ("N"), this rule is used regardless of the value of the switch. |
| Pct_rule_pct (P & U charts) | (Default 25) The actual percentage value used in the "25 percent rule". It would be rare to change this default value, however it is changeable. |
| Display_pct_rule (P & U charts) | Display the 25 percent rule control limits (generally a flat line) rather than the variable control limits. |
| Delete_to_point | Sets the maximum number of points to be retained for a chart. When this point is reached, the oldest points will be deleted continually so that this maximum number is maintained. |
| Ucl | Sets the upper control limit value. (auto_calibrate must be "N") |
| Lcl | Sets the lower control limit value. (auto_calibrate must be "N") |
| Mean | Sets the control chart mean value (center line). (auto_calibrate must be "N") |
| Notify_on_outlier | An email will be sent on a single outlier condition. |
| Notify_on_2_of_3 | An email will be sent when 2 of 3 points are outside 2 sigma. |
| Notify_on_runs | An email will be sent when a run is detected above or below the center line. |
| Notify_on_trends | An email will be sent when a trend up or down is detected (7 points in a row, up or down). |
| Notify_on_4_or_5_B | An email will be sent when 4 out of 5 points are detected between 1 and 2 sigma on the same side of the center line. The current default for this is "N" since we do not want to track it at this time. |
| Notify_on_14_alternate | An email will be sent when there are 14 points in a row which alternate up then down. |
| Notify_on_15_inside_1 | An email will be sent when 15 points in a row fall within 1 sigma, "hugging" the center line. |
| Rng_notify_on_outlier (range chart, XbarR & XR) | An email will be sent on a single outlier condition. |
| Rng_notify_on_2_of_3 (range chart, XbarR & XR) | An email will be sent when 2 out of 3 points are outside 2 sigma. |
| Rng_notify_on_runs (range chart, XbarR & XR) | An email will be sent when a run is detected above or below the center line. |
| mg_notify_on_trends (range chart, XbarR & XR) | An email will be sent when a trend up or down is detected (7 points in a row, up or down). |
| Rng_notify_on_4_of_5_B (range chart, XbarR & XR) | An email will be sent when 4 out of 5 points are detected between 1 and 2 sigma on the same side of the center line. The current default for this is "N" since we do not want to track it at this time. |
| mg_notify_on_14_alternate (range chart, XbarR & XR) | An email will be sent when there are 14 points in a row which alternate up then down. |
| Rng_notify_on_15_inside_1 (range chart, XbarR & XR) | An email will be sent when 15 points in a row fall within 1 sigma, "hugging" the center line. |
| Sdev_notify_on_outlier (Std.dev chart, XbarS) | An email will be sent on a single outlier condition. |
| Sdev_notify_on_2_of_3 (Std.dev chart, XbarS) | An email will be sent when 2 out of 3 points are outside 2 sigma. |
| Sdev_notify_on_runs (Std.dev chart, XbarS) | An email will be sent when a run is detected above or below the center line. |
| sdev_notify_on_trends (Std.dev chart, XbarS) | An email will be sent when a trend up or down is detected (7 points in a row, up or down). |
| sdev_notify_on_4_of_5_B (Std.dev chart, XbarS) | An email will be sent when 4 out of 5 points are detected between 1 and 2 sigma on the same side of the center line. The current default for this is "N" since we do not want to track it at this time. |
| sdev_notify_on_14_alternate (Std.dev chart, XbarS) | An email will be sent when there are 14 points in a row which alternate up then down. |
| sdev_notify_on_15_inside_1 (Std.dev chart, XbarS) | An email will be sent when 15 points in a row fall within 1 sigma, "hugging" the center line. |
| high_or_low_only | Values ["H" (highside), "L" (lowside), "N" (no, or not on)] The engine will sense and email on only one side of the center line. For example, if set to "H", only the upper control limit will be tested, only a run on the high side of the center line will be detected, only an upward trend will be detected, only 2 of 3 conditions on the high side of the center line will be detected. |
| auto_exclude_hvp | Automatically excludes high value points. This is defined as any point 4 sigma from the center line. This may seem risky but it will only tighten the control limits. |
| zero_lcl_on_nonzero | Sets the lower control limit to zero when all points are below zero. This will prevent the lower control limit from going negative on charts which should always be positive. |
| Date Format | Select from the drop down the format of the date to be display on the chart. |
| Number of Decimals displayed | Enter a number here to indicate when to truncate the data point on the display of the chart. This entry does not alter the data in the database. |
| Source | This is a description field that is displayed on the chart. It informs the reader where the data in the chart came from. |

Figure 10:
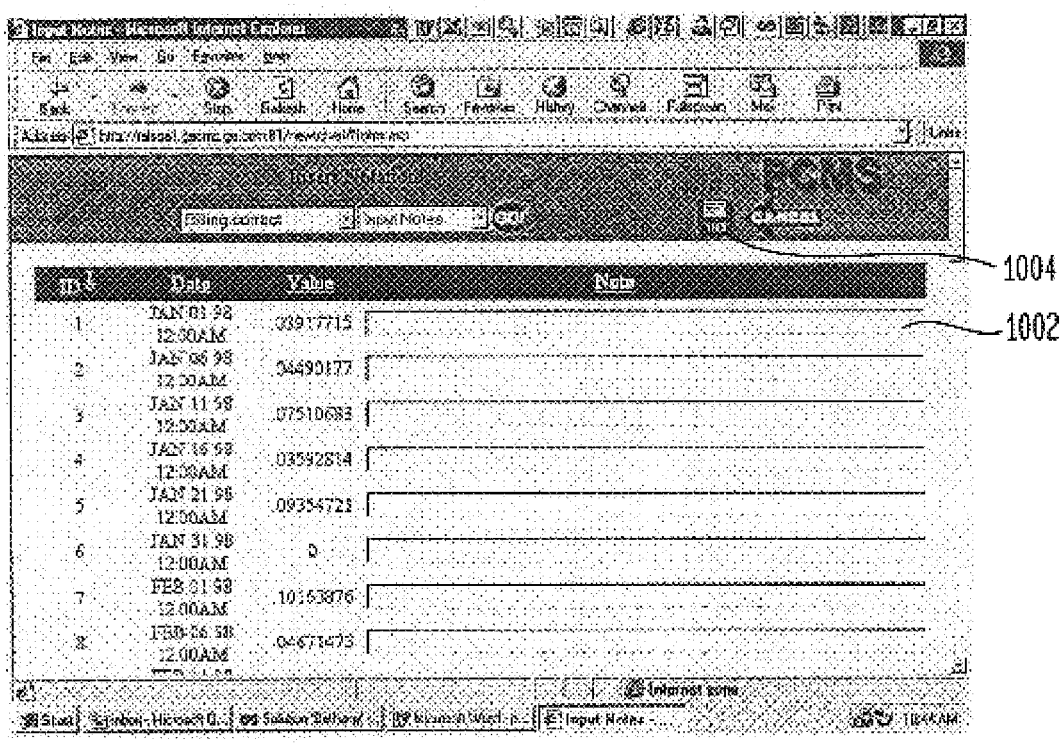
FIG. 10 illustrates an exemplary input note web page for annotating comments for data points.

Input notes may be provided as discussed below utilizing an "Input Notes" page 1000 shown in FIG. 10. A user may readily annotate comments for data points using the page 1000. A comment is entered in a blank text box, such as box 1002, next to a data point and a "Save" icon 1004 is clicked. Then, when viewing the chart in MS IE, the point will be displayed with a character next to it in blue. At the bottom of the chart, the annotation for that point will be displayed. Annotations should be carefully made, as the more annotation, the less room available on a page to actually display the chart.

Figure 11:
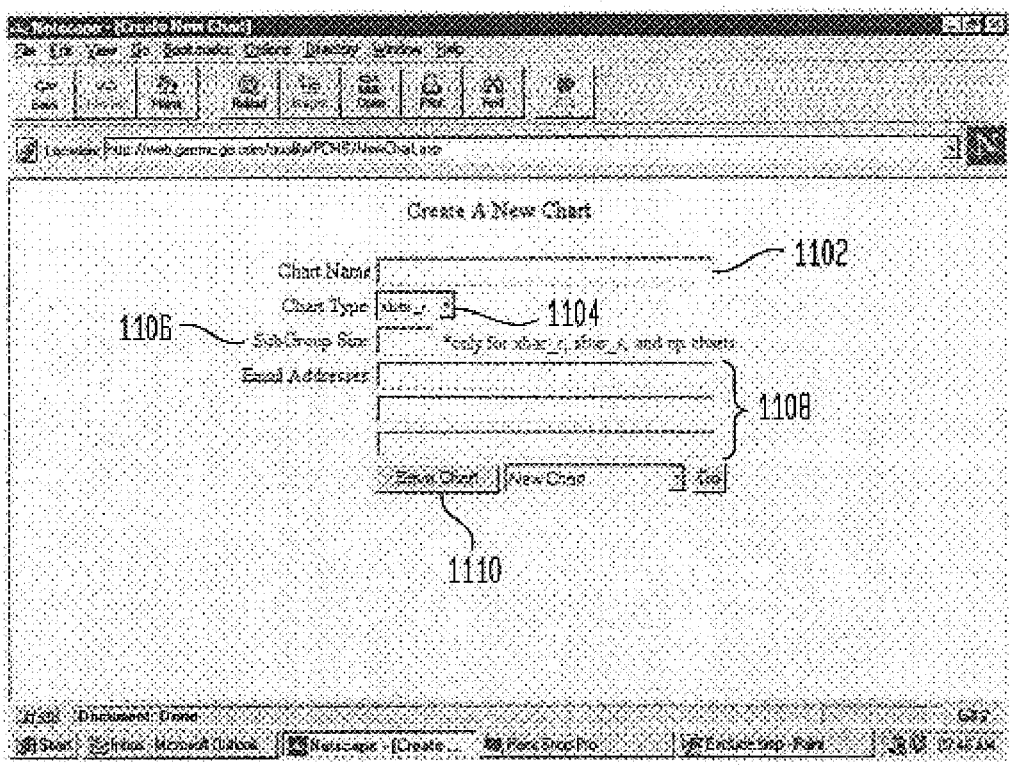
FIG. 11 illustrates an exemplary create a new chart web page.

Briefly, a new chart may be created using a "New Chart" page 1100 as shown in FIG. 11. Further details of creating new charts will be provided below in an extended discussion of chart maintenance. Utilizing "New Chart" page 1100, a user can create a new chart in the database as follows. The name of the chart is entered in "Chart Name" box 1102. The database only accepts the first forty characters entered and the chart name must be unique from all of the other charts in the database. The type of chart is selected from a "Chart Type" drop down list 1104. Xbar_r and xbar_s charts need subgroup numbers in box 1106, if a number is not entered, the default is 5. Lastly, the email addresses of users designated to get email regarding the chart are entered in boxes 1108. This feature advantageously allows the automatic notification of process owners when a process is automatically recognized as outside of control limits. A user may choose not to enter any addresses or can choose to put in up to three. Once the chart is created, "Save Chart" button 1110 is clicked to create the chart in the database. The user can now edit more of the chart's features as discussed above.

Before proceeding to a detailed discussion of various aspects of PCMS maintenance and further details of chart linkages, a variety of topics, such as presently preferred naming conventions, label variables, calibration, control variables, default value charts, manual charts, aliases and automatic chart creation are briefly addressed.

The name of each chart is a forty character name which may consist of any forty character string. The database is case insensitive meaning that it treats a lower case character the same as its upper case character, i.e., "a" and "A" are equal. While any name may be given to a chart, as the number of charts grows, it will be important to use naming conventions to group charts together. An individual copy of the PCMS engine will likely contain dozens, hundreds, and perhaps thousands of charts. Grouping a large list of charts with a naming convention will be highly desirable.

The chart name should contain a portion which clearly describes the chart data. If the chart is for a particular group such as a branch office, it should contain an identifier for the branch. If the chart is part of a larger system of charts, its name should also contain a system identifier. The chart naming convention is as follows: corename.level1name.level2name.level3name.level4name.indicator#.identifier. Consider the examples of Table 3 below:

TABLE 3

| Name | Description |
| --- | --- |
| uw.branch.data.p1.albany | underwriting core process, branch uw level 1, data entry accuracy indicator = p1, for albany branch (note, for understanding a name is also associated with the number) |
| ps.cash.kms.p2 | policy servicing core process, cash processing level 1, KMS processing level 2, cycle time indicator = p2 (since only one policy servicing group, no extra identifier needed) |
| pd.sl1 .q1 | product development core process, only one sublevel 1 process, cycle time indicator = q1 |

The above names are divided into "nodes" or parts of the names. Each node or part describes a portion of the overall name of the statistic. Abbreviations are useful in shortening the overall name while including as much information into the name as possible. Each level needs a place holder—whether it is a fullname, abbreviation, or a number (e.g., SL1). The indicator may be given some kind of short name but it is not required. The indicator should be given a number (q1, p1, etc.). An additional identifier should be used only if there are multiple instances of a given indicator. For example, where there are 23 branches, 13 investment managers, or 21 salespeople.

One of the most useful functions of a naming convention will be in "mass" selection or mass updating of charts. The PCMS home page 520 allows retrieval of a group of charts based on the name. A sound naming convention simplifies selection of groups of charts, like, selecting all charts where the name starts with "UWAccess" or contains ".Denver". These criteria select all underwriter access charts or all charts for Denver, respectively.

Further, there will be many switches which may be set to modify the function of charts. PCMS programmers will have the capability to perform group updates of charts to easily turn on and off many switches. Good naming conventions will be important to allow programmers to make these mass updates on behalf of the analyst saving much time.

Label variables provide the user a way to customize the display of the chart. The Chart_title is a label which will be presented at the top of the chart on display. The chart_label_v produces the vertical axis label and the chart_label_h produces the horizontal axis label. A feature which the user should be aware of is the "wild card" date value which may be added to the chart_label_h field. There are two available "wild cards" —"&date and &datetime".

The user may include a value of &date or &datetime as a whole or partial label for-the horizontal axis. When found at display time, these strings are replaced with formatted date strings representing the date range for displayed data. The &date value returns a month and day string while the &datetime value returns month, day and time of day. As an example, suppose the user has assigned a value "Displayed dates: &date" in the chart_label_h field. On display of the chart, the horizontal axis will be labeled "Displayed dates: Jun 15–Aug 20" if the oldest and newest datapoints selected are dated June 15 and August 20, respectively. This range and the display dates will vary the number of points displayed. When using &datetime, the time expressed in hours and minutes is included with the dates.

The "calibrate_from_points" and "calibrate_to_points" variables determine the number, range, and specific points used in computing control limits. The values of these two variables may be thought of like pointers on a number line. For an example in which the default values for the variables are 10 for calibrate_from_points and 30 for calibrate_to_points, the range 10 to 30 now represents the range of points during which the engine will constantly update control limits ("calibrate from point 10 to point 30"). The idea is that until you have at least 10 points, control limits are probably not significant. Once 30 points are available, the control limits are deemed statistically significant and "locked in". Once the number of points specified by calibrate_to_points (30) has been used in computing control limits, the engine stops computing control limits for the chart. Control limits will not change until the chart is recalibrated. The effect is the creation of a calibration "window". This default range (10 to 30) may be adjusted by changing the values of these two variables. If it is desired to not "lock in" limits, the calibrate_to_points value should be set at a very high value.

A chart is "recalibrated" by setting the calibration_cutoff_point. The calibration_cutoff_date is actually redundant but allows the user to enter by date rather than by point id. Anytime the value of either of these variables is modified, the engine sets the other to an appropriate value. The primary reason for carrying the calibration_cutoff_point field is to allow pinpointing a specific point on a chart which may be a multiple point-per-day chart. Again, one way to think about recalibration is to return to the number line example. In the first example, we saw how the calibrate "from" and "to" points works. That example began with a new chart where the beginning point was point 1. The value of the calibration_cutoff_point resets the beginning point for control limit calculation.

Consider the example where the calibration_cutoff_point has been set to 51. Setting this value means that new control limits will be calculated beginning at point 51. The calibrate "from" and "to" values are actually relative values, relative to the cutoff point which begins at I for a new chart. Suppose at the time the cutoff point is set to 51, there were only 55 points on the chart. The engine would not compute new control limits yet because there are actually only 5 points to be used in the calculation and the calibrate "from" value is 10. Until the $60^{th}$ point is added to the chart, the old limits will remain. Once the $60^{th}$ point is added new control limits are computed and will continue to adjust until the $80^{th}$ point is added to the chart. At that time, the limits will again be "locked in".

Recalibration then is simply the adjustment of the calibration "cutoff" point, the point at which control limit calculations begin. Each time a chart is recalibrated, the "old" control limits are retained and associated with data points less than (older) than the "cutoff" point (back to the next oldest cutoff point). The calibration routine is executed any time the user presses the calibrate button from the user interface. The routine is also executed each night whereby the engine examines every chart in the database looking for charts which require calibration. When a chart requiring calibration is found, new control limits are computed using available data points and the control variable settings. The engine will always keep a chart current even when a user does not press the "calibrate" button.

In an Oracle based version of the engine, a new control variable associated with calibration called the recalibration_interval will be employed. This variable allows the specification of an automatic recalibration of a chart based on a time interval. The time interval will be specified as the number of data points at which-to recalibrate the chart. For example, if the recalibration_interval was set at 100, initial control limits would be calculated starting at point 1. Once the chart reached 100 data points, the engine would automatically set a new cutoff point at 100 causing new limits to be computed. This adjustment would again occur when the chart reached 200 data points.

The delete_to_points variable is an automated "purge" mechanism. The feature is not used on many business charts as historical data is being retained for a long period of time. At some time, however, charts may age to the point that data should be purged. This variable allows this purging to occur automatically. This variable indicates to the engine the number of points which should be retained during a database purge. Such operation may be thought of as saving the last "n" data points. This feature is primarily used on automated charts with high frequency of data insertion. For example, network response time charts receive data points once every 5 minutes around the clock. Only the most recent points are deemed as valuable so the engine automatically "purges" the oldest points every night. The purge routine runs every night in the engine. It examines all the charts in the database looking for those with the delete_to_points variable set to a non-zero value. When found, the chart has the oldest points deleted leaving the number of points specified by the delete-to-points value.

The high-or_low_only variable is a specialty switch which will cause the engine to monitor only one "side" of the control chart, the high side or the low side. Three valid values for the variable are "N", "H", and "L". The default is "N" at which point the control chart is monitored as usual. When either "H" or "L" is specified, however, the engine only monitors the indicated "side" of the chart. For example, suppose the variable was set to "H". In this case, the engine would notify you of an upward trend, an outlier above the upper control limit, and a run above the mean. It would ignore a run below the mean, a downward trend, or an outlier below the lower control limit.

Each time the calibration routine executes, it examines the chart for extreme values. An algorithm has been devised to sense points which are candidates for exclusion. Accordingly, points are examined as a distribution. The variance is computed for each point. The two highest variance points are dropped from the sample and a new mean is computed. The standard deviation for the remaining distribution is computed. If any point is more than 4 standard deviations from the new mean, it is flagged for possible exclusion. A minimum of 20 points are used by this algorithm. When potential points are identified as candidates for exclusion, the engine may mark the point for exclusion automatically. It does so when an "auto_exclude_hvp" variable is set to "Y" or "yes". In this variable, hvp stands for "high value points". When a point is auto-excluded, the engine sends an email message to the user indicating the exclusion and referencing the point id excluded. When the switch is not on, the engine does not perform the auto-exclusion, however, an email is sent to the user indicating that an extreme point was identified.

A further useful variable is the zero_lcl_on_non_negative variable. This variable when set on will force the lower control limit to zero if computed as negative and all data values are non negative. Like other control variables impacting calibration, this variable only will impact a change during the calibration "window".

An important feature of the engine is the default values which may be specified in the database. There are many control variables. At chart creation, values must be assigned to them. To simplify the "create" process, the user need only specify very few. The remaining values may be supplied by "default_values" charts. The default_values charts are charts which exist in the database and may be found by searching for charts which begin with "default_values". One of these charts exists for each chart type. For example, there is a "default_values_p" chart and a "default_values_xbar r" chart. No data points are actually stored on these charts, but the control variable settings found on these charts are used each time a new chart is created to "fill in the blanks", or templates provided by these default charts. It is important that these charts are reviewed to ensure that the desired values are specified at chart "create" time, thus saving valuable time doing maintenance.

By default, the engine treats all charts as control charts, computing control limits and notifying users on out of control conditions. The vast array of user control variables allow users to create variations of control charts by altering the values of key control variables. The engine nonnally computes control limits based on the data and the algorithm for the chart "type" in use. This function may be overridden by setting the "auto_calibrate" variable to "N" or no. When set to "N", control limits are never calibrated. The result is a "Run Chart". The engine will simply plot and display the data points. The best choice for a run chart is an x_r the individual's chart.

To turn the Run Chart into a "Trend Chart", control limits may be specified manually. Using an x_r chart, set the upper control limit (ucl) to the target value. Plot data points. The resulting graph will be a fixed line as the target and the plot of the actual data values. For a trend chart, it would also be a good idea to turn all notification variables to "N". If not, the engine will use the values provided and perform the out of control tests using the manually input target value as a control limit.

The category of "programming assists" is a group of features built into the engine which may be described as specialty features that a programmer should be consulted to make use of. These include: aliases, automatic chart creation, automated "roll-ups", chart "splitting", sampling routines, and mass SQL variable updates, for example.

Aliases are utilized primarily to ease programming efforts in chart automation. The PCMS engine supports chart name aliases which are simply an alternate name which may be used to reference a chart. For various reasons, names generated as part of a naming convention may not be as "user friendly" as one would like, and names should be as meaningful to users as possible. Aliases may be used to bridge this gap allowing systems to employ easy to generate names to reference charts during loading, while more user friendly names may be ultimately seen by chart users.

Consider the following example. Branch offices may be identified within systems by a numeric identifier. However, in the field, users tend to think of branches in terms of their location, such as their city. An easy program name might contain the branch number, but users must then know the branch numbers to identify charts by branch. The following chart name and alias convention could resolve this problem. A suggested chart name might be: UWKNOWL.cautapprov-.ALBANY. The corresponding alias might be defined as: UWKNOWL.cautapprov.0074. Users would see the chart name containing Albany, yet programs loading the data could reference "0074", the number identifier for Albany. The PCMS engine performs the name translation. In cases where more than one branch may exist in a city, a suffix could be added to differentiate the two locations.

A sound naming convention is also important for system generated charts so that the "auto add" feature of the engine may be utilized where appropriate. For example, charts will be automated out of systems for branch offices or customers. As the business changes and systems change, new entities may come about for which a chart will be required. If a new branch comes into the system, then the programming staff will make changes in the applications which will begin reporting the new branch in systems feeding the PCMS engine. The new data points will not load, however, because a chart for the new branch does not exist. To address this situation, the PCMS engine has an "auto add" feature whereby a PCMS programmer can predefine an auto add "mask" to the database. If a new data point comes into the engine but a chart is not found, the auto add mask table is checked to see if the new chart name matches an auto add mask. If so, the PCMS engine will automatically create the new chart using the chart type specified in the auto add mask table. Default values for control variables will be used for the chart, and users associated with the auto add mask will be notified via email as to the creation of the new chart.

For example, consider the chart "UWKNOWL.cautapprov.00??"which exists for presently existing branches where the "??" represent the branch number. An auto add mask has been defined "UWKNOWL.cautapprov.0%" as a type "p" chart and a user to receive notification. If a new branch comes into the system so that there is no chart setup for the new branch number, the PCMS engine will create the new chart "on the fly". If the chart mask was setup to automatically add a new chart which may fall into a group of charts which use aliases, an indicator flag on the mask table can be set to create an alias at chart creation time. In this case, the chart name and alias name would be made the same. The user would have to intervene and perform a rename on the chart to an appropriate name. The alias would, however, remain and become active. In such a case, the auto add email notification would remind the user that a rename should occur.

Because of the implications of creating this "auto add" mask, this is presently a PCMS programmer function only. As new charts are created in the system, thought should be given to creating the mask as new automated charts are defined. Analysts should work with the PCMS programming support personnel to implement this feature. This feature is only available for automated charts. The "auto add" feature is useful when automating a large number of charts. Rather than manually create each chart individually, a single entry may be entered in the database by a programmer to define a name "mask". The type of chart to be created is also specified, for example, x_r, p, xbar_r. When data begins to flow into the engine and the engine does not find a chart, the chart name is compared to the mask table. If matched, the engine will automatically create a chart of the type specified and email a default user notifying the user of the chart creation. "Splitting" refers to a feature whereby a single input data point may actually be added to multiple charts at once. A special table is maintained containing the input chart name and any additional charts to which the points may be added.

Sampling routines may be provided for a batch load program for a mainframe, or an Oracle load program for personal computer (PC) and Unix environments can provide automatic sampling routines. The mainframe program now supports interval sampling where a sampling interval (n) is specified and the file is sampled on an every nth basis. The starting point is a random number generated from zero to n. A random sampling feature is also provided where the sample or sub-group size may be specified and the file is examined computing the sampling interval which will produce the specified sample size. The starting point is then generated with a random number between zero and the interval. Within a single run, the program can produce same size samples for multiple charts.

Mass SQL updates may also be performed by support programmers saving maintenance time. Suppose there were 100 charts for which it was desired to set the auto_exclude_ hvp stitch to "Y". A programmer could perform this task easily if qualifying criteria, such as a name mask were provided.

PCMS and QN Maintenance

Figure 12A:
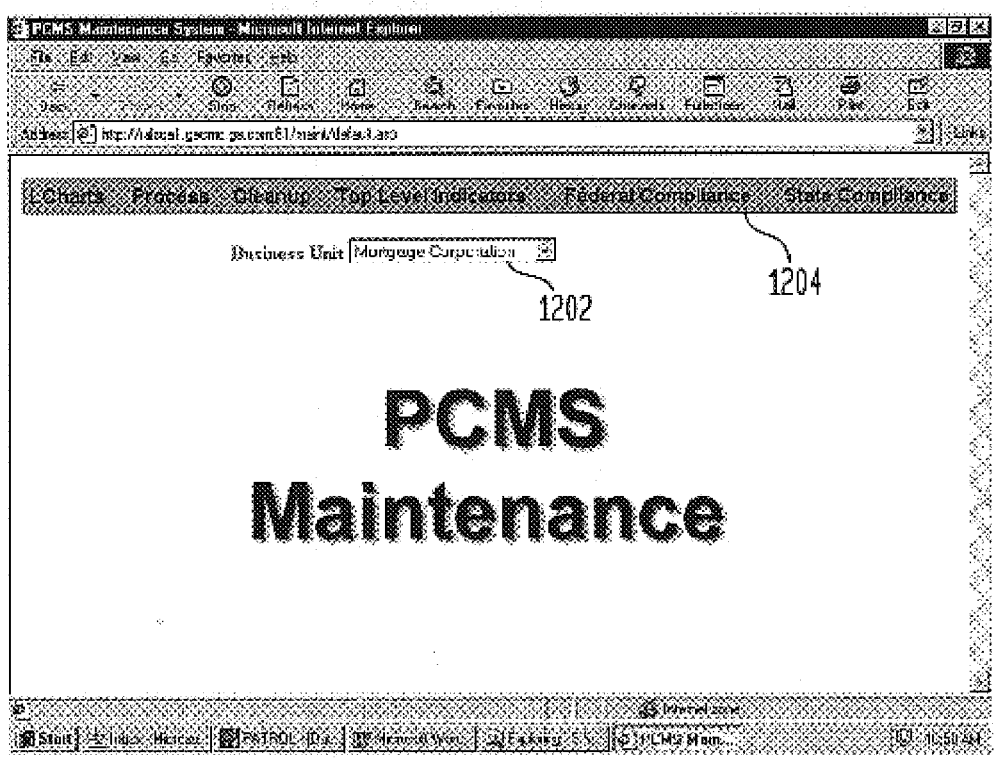
FIGS. 12A–12J illustrate a series of exemplary web pages for illustrating details of PCMS and quality navigator (QN) maintenance in accordance with the first embodiment of the present invention.

As discussed in depth below, for performing PCMS and QN maintenance tasks, a process maintenance home page 1200, as shown in FIG. 12A, is preferably provided. The process maintenance home page 1200 allows authorized personnel to accomplish six tasks:

1. Processes can be added, modified, or deleted;
2. Top level indicators (TLI) can be added, modified, or deleted;
3. Processes and TLIs can be linked via L charts;
4. Indicators that have been defined but have not been associated with any process can be cleaned up;
5. Those processes that must be monitored under federal compliance guidelines can be added, modified, or deleted; and 6. Those processes that must be monitored under state compliance guidelines can be added, modified, or deleted.

Figure 12B:
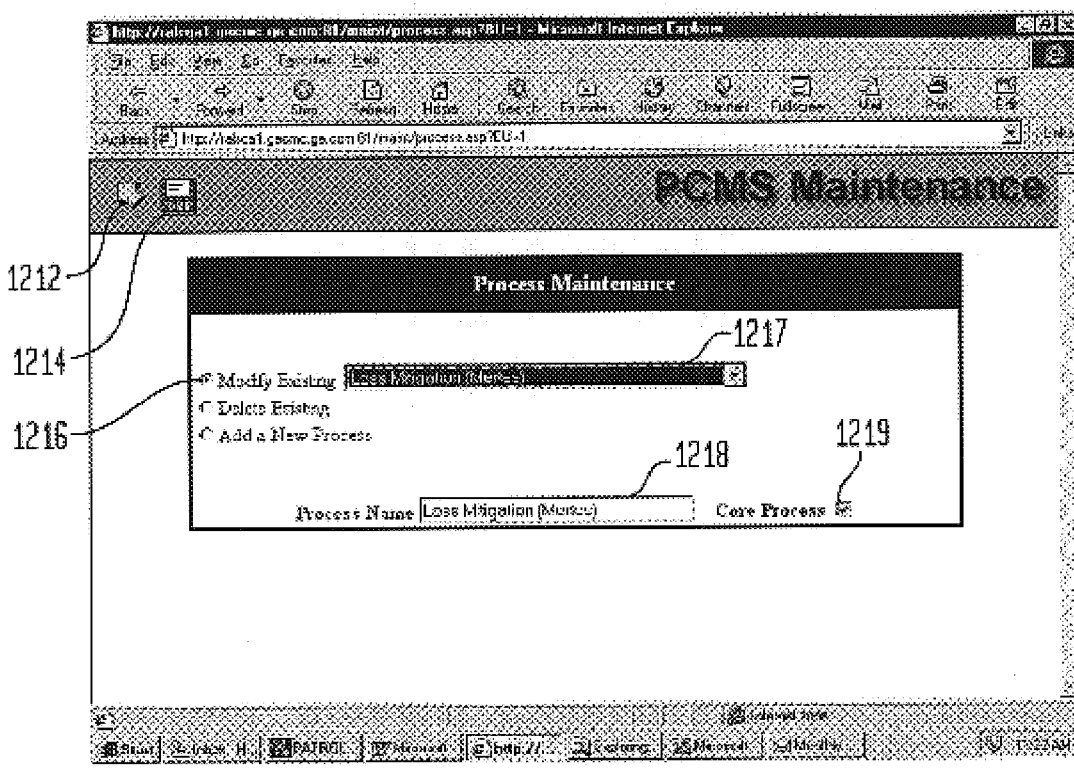

Task 1 above relates to PCMS maintenance and tasks 2–6 relate to QN maintenance. The user enters the process maintenance site by first selecting the appropriate business unit from a drop down list 1202 and then clicking on one of the above six tasks from the list in menu bar 1204 at the top of the PCMS maintenance home page 1200. Upon clicking on "Process", an exemplary process maintenance page 1210, as shown in FIG. 12B, is displayed. The icons on the top left of the web page 1210 control navigation. An upward left pointing arrow 1212 returns a user to the process maintenance home page 1200. A floppy disk or store icon 1214 allows the user to save the modifications, updates or deletions that have been made.

To modify an existing process, the user selects radio button 1216 next to "Modify Existing." Next, the user selects the process to be modified from drop down box 1217. This selection will copy the name of the process to be modified from the drop down box to text box 1218 beside "Process Name." The user then enters changes to the name of the process in the textbox. All process names must be unique and cannot exceed 80 characters in length. If the existing process is not currently a core process but should be, the user selects checkbox 1219 next to "Core Process." Alternatively, if the existing process is currently a core process but should not be, the user deselects the checkbox next to "Core Process." To save the modifications that have been made to the existing process, the disk icon 1214 at the top left of the web page is clicked. It is important to note that users will not be allowed to modify an existing process from being a core process to not being one if the process has data that is linked to top level indicators (TLI). In this case, the user must first "unlink" the process from all TLIs before changing its status as a core process.

To delete an existing process, the user selects the radio button next to "Delete Existing." Next, the process to be deleted is selected from the drop down box 1217. This selection will copy the name of the process to be deleted from the drop down box to the text box 1218. To delete this process, click on the disk icon 1214 in the top left of the web page. Again, users will not be allowed to delete existing processes that have "children" records associated with them. In order to delete these processes, the association with each "child" record must be deleted first.

Finally, to add a new process, select the radio button next to "Add a New Process" and type the name for the new process in the text box 1218. All process names must be unique and cannot exceed 80 characters in length. If the new process will be a core process, select the checkbox 1219 next to "Core Process." To save the new process, click on the disk icon 1214.

Figure 12C:
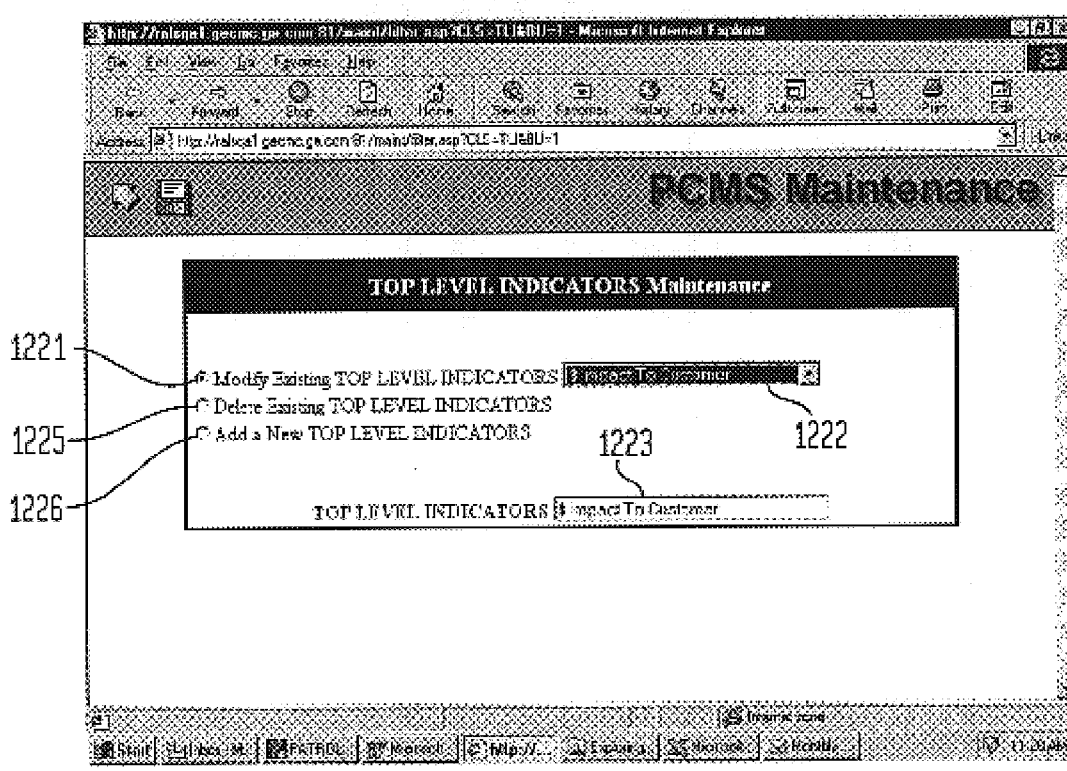

If "Top Level Indicators" were selected rather than "Process" from menu bar 1204 of page 1200, then an exemplary TLI maintenance page 1220, as shown in FIG. 12C, is displayed. To modify an existing Top Level Indicator (TLI), select radio button 1221 beside "Modify Existing Top Level Indicators." Next, select the TLI to be modified from drop down box 1222. This selection will copy the name of the TLI to be modified from the drop down box to text box 1223 beside "Top Level Indicator." As shown in FIG. 12C, both boxes 1222 and 1223 show the selection "$ Impact to Customer". The user then changes the name of the TLI in the textbox 1223. All TLI names must be unique and cannot exceed 80 characters in length. To save the modifications that have been made to the existing TLI, click on disk icon 1224.

To delete an existing Top Level Indicator (TLI), select radio button 1225 beside "Delete Existing Top Level Indicators." Next, select the TLI to be deleted from the drop down box 1222. This selection will copy the name of the TLI to be deleted from the drop down box to the text box 1223. To delete this TLI, click on the disk icon 1224.

To add a new TLI, select radio button 1226 next to "Add a New Top Level Indicator" and type the name for the new TLI in the text box 1222. All TLI names must be unique and cannot exceed 80 characters in length. To save the new TLI, click on the disk icon 1224.

Figure 12D:
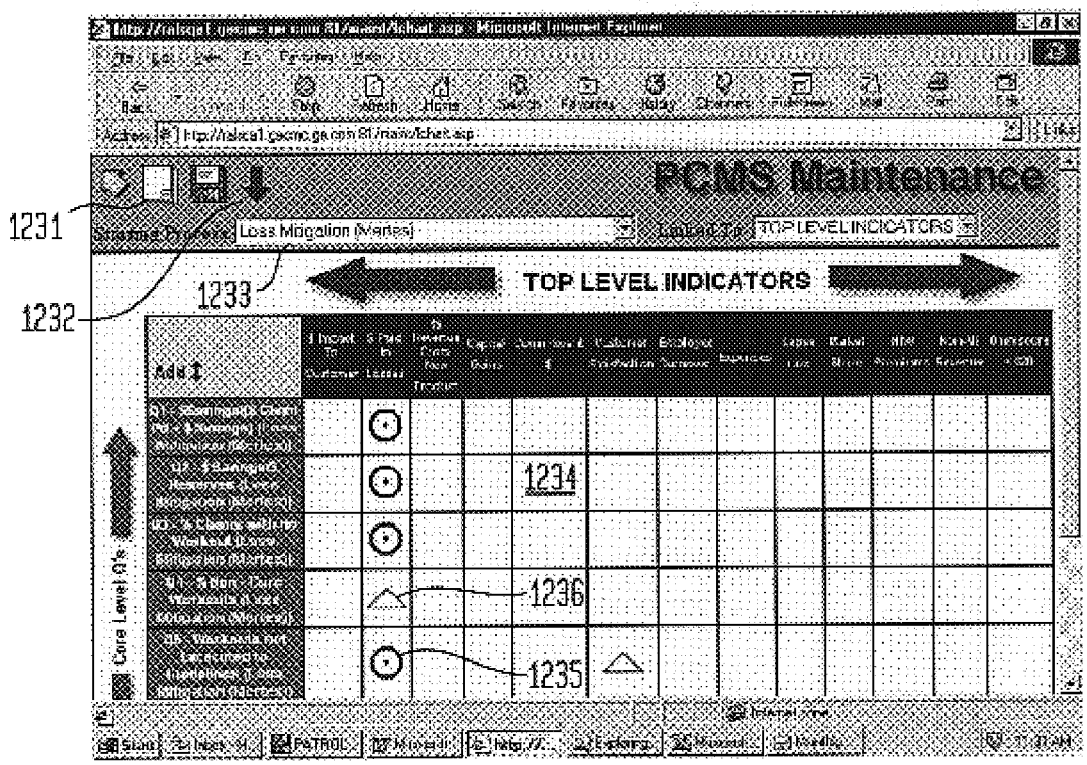
Figure 12E:
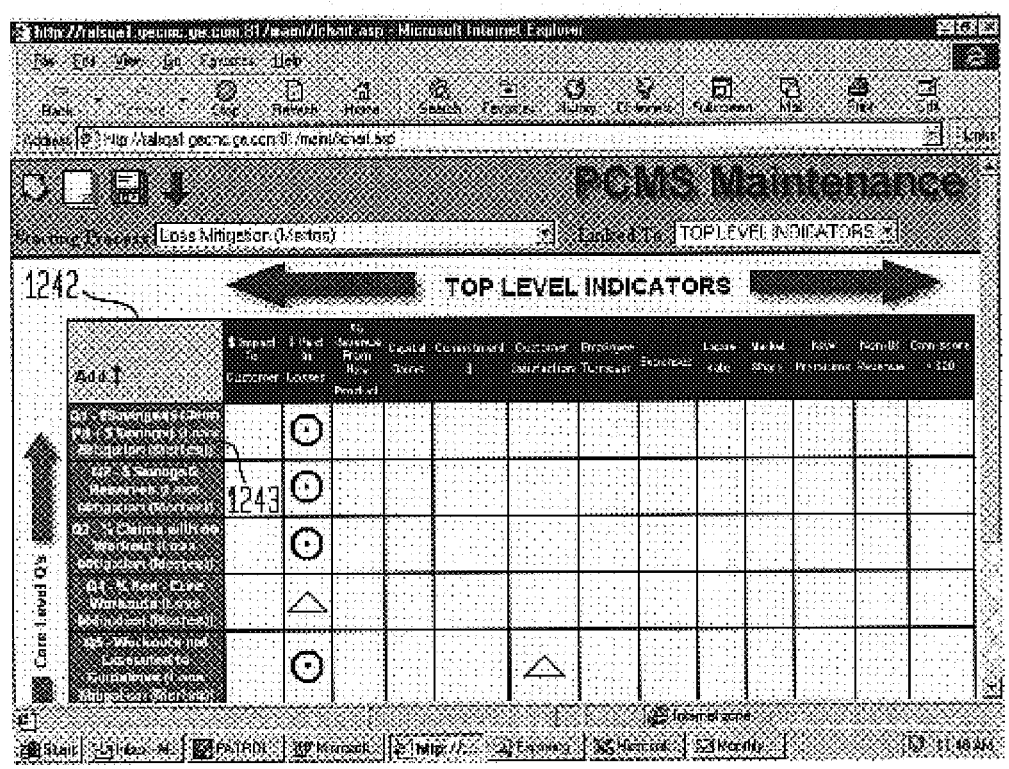

If "L Charts" was selected from menu bar 1204 of page 1200, then an exemplary L charts page 1230, as shown in FIG. 12D, is displayed. In the presently preferred embodiment, three additional icons are relevant to the L charts page 1230. A print icon 1231 allows the user to print the L chart without the navigational icons and drop down boxes appearing. Clicking on this icon 1231 opens a new copy of the user's web browser with the selected L chart displayed. No modifications may be made on this copy of the chart. It can be used for printing purposes only. A downward arrow or "drill down" icon 1232 takes the user to the processes or Ps which are one level down within the same process as addressed further below. Once a user has "drilled down" one level, an upward arrow icon, such as arrow 1262, replaces the downward arrow 1232, as seen in FIG. 12G. This icon allows the user to return to the first level of the starting process. A drop down box 1233 next to "Starting Process" lists all processes that have been defined within the PCMS. The indicators for the selected process are displayed along the vertical axis. Similarly, drop down box 1234 next to "Linked to" lists all processes, compliance indicators, and top level indicators (TLI) to which the starting process has been linked. The individual indicators associated with these processes or TLIs are listed along the horizontal axis. If the starting process is a core process, it can be linked to TLIs. "Federal Compliance" and "State Compliance" appear in the "Linked to" drop-down box for all processes. By choosing one of these options, the user is able to identify a process as one that must be monitored under federal or state compliance guidelines.

If a relationship to another process has not been established for the starting process, the user must begin by establishing linkages between the core process to which the starting process links and the TLIs. This requirement means that to initially establish a link between one process and another requires that the core processes to which each of the processes of interest are linked must themselves first be linked to the TLIs. Once these "highest level" relationships have been created the user can "drill down" one level on the starting process and establish linkages between the indicators for the starting process and indicators for other processes. If further sub-levels of relationships are needed, they can only be established after the relationship level above it has been created. This hierarchical approach is the only manner in which a process can be linked to other processes. Once these relationships have been defined, the names of the associated processes will appear in the "Linked To" drop down box 1234. This method of establishing linkages is explained further below in connection with the exemplary process of creating linkages via the L Chart Page for a loss mitigation process within mortgage insurance. It will be recognized, however, that the process is generally applicable. As discussed above, one must first link a core process—in this case Loss Mitigation—to the TLIs. The finished linkage is seen in page 1240 illustrated in FIG. 12E. The indicators associated with Loss Mitigation are listed along the vertical axis and the individual indicators that collectively constitute the TLIs are listed along the horizontal axis. In order to begin establishing linkages between the core process and the TLIs, the user must click on "Add" icon 1242.

Figure 12F:
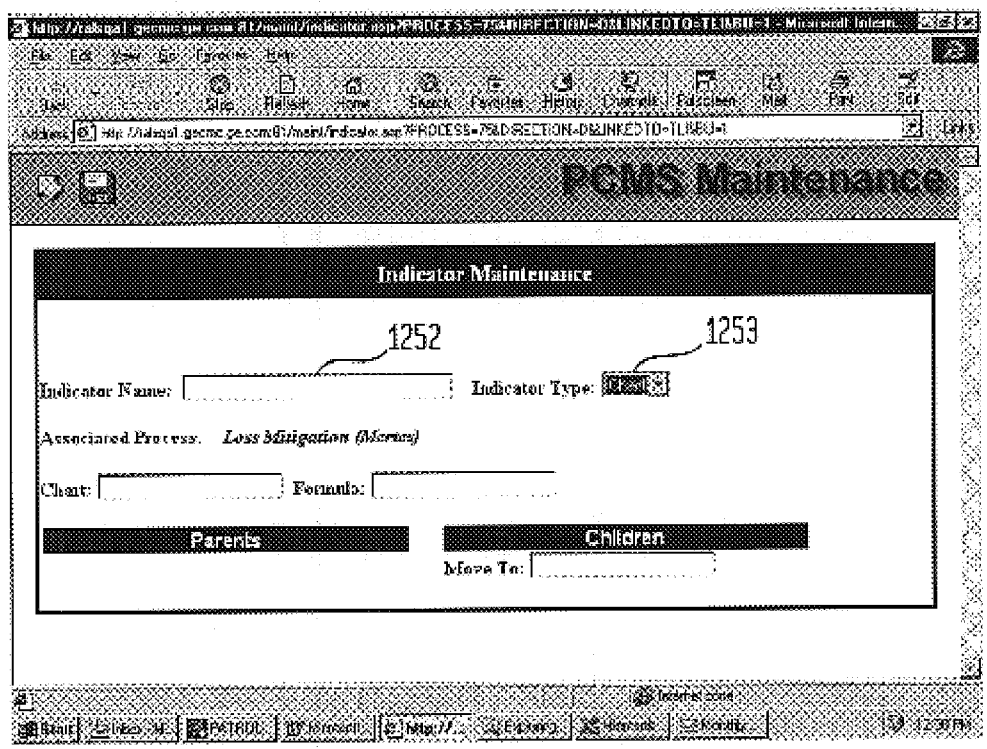
Figure 12G:
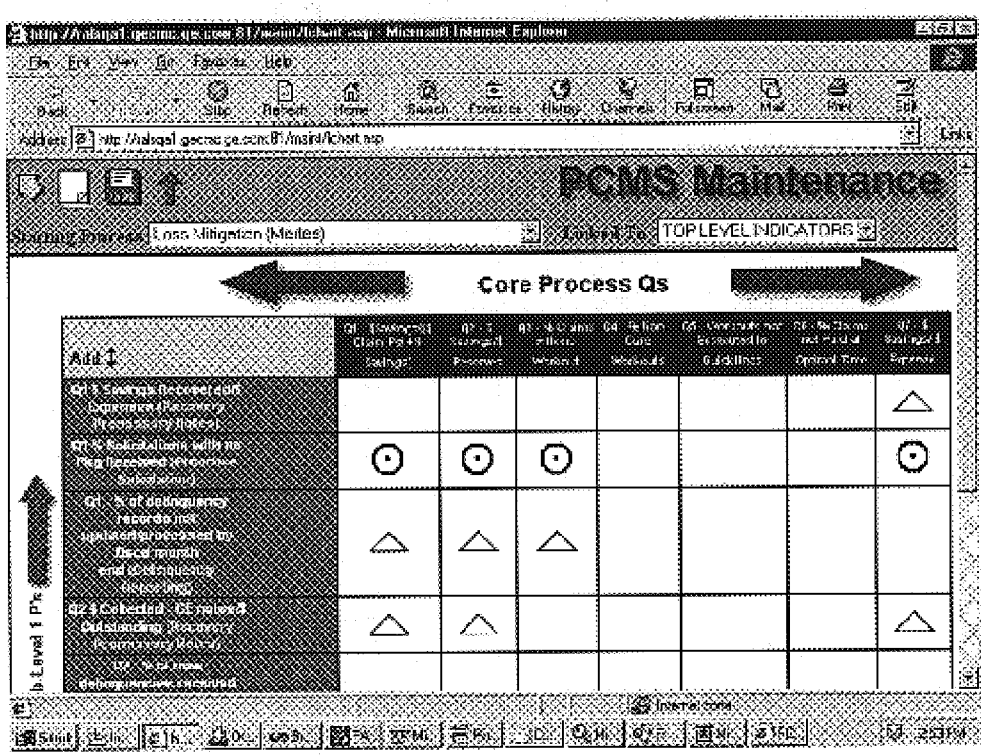
Figure 12H:
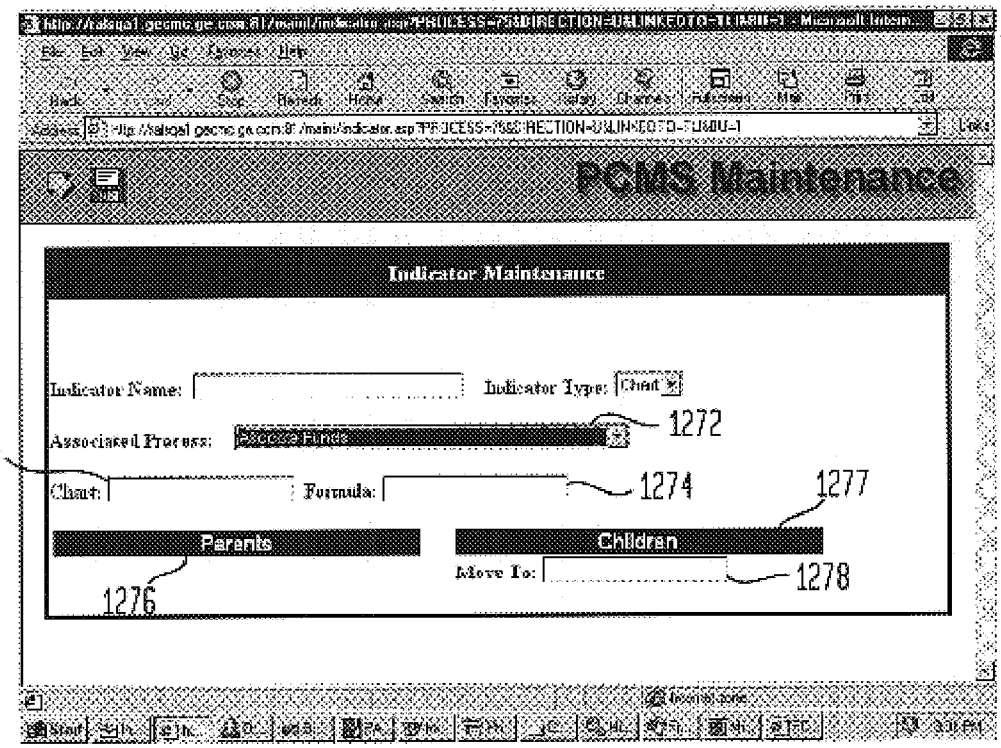

Clicking on this icon 1242 opens an Indicator Maintenance page 1250 illustrated in FIG. 12F. On this page 1250, the user supplies the name of the indicator in text box 1252 next to "Indicator Name". Presently, the only type of indicator is a chart, so this is the only option in drop down box 1253 next to "Indicator Type." It will be recognized of course that other types of indicators may be added as desired. At the level of linking core processes to TLIs, the "Associated Process" is not changeable and will always be the name of the starting process, in this case the core process, the user initially selected as the "Starting Process" on the L Charts page. In the text box next to "Chart" the user can supply the name of the chart within the PCMS Engine that monitors the indicator currently being added. If one enters a chart name, it must exist in the PCMS engine. The text box next to "Formula" requires the user to supply the formula for that chart. Once these data have been supplied, the user should click on the disk icon to save the name of the indicator, the PCMS chart that monitors the indicator and the formula for that chart. The remaining sections of this page: "Parents", "Children", and "Move To" will be discussed below as they are relevant to indicators after they have been created. After saving this information, the user is returned to the L Charts page.

After returning to the L Charts page 1230, the user must select a newly added indicator from a drop down box (not shown) at the bottom of the vertical column that lists the indicators associated with the core process. The grid 1234 shows the degree of relationship between indicators. A circle with a dot, such as symbol 1235 represents a high linkage between the two indicators for the intersecting row and column. A circle without a dot (not shown) represents a medium linkage. A triangle, such as symbol 1236 represents a low linkage between the two indicators. A blank box represents no linkage between the two indicators. One highly advantageous aspect of defining the degree of relationship between indicators is that charts can then be readily sorted and displayed by degree of importance. By way of example, assuming there were twelve charts with four high, four medium and four low degree levels of importance, and that a maximum of four charts can be displayed on a single screen, the charts can be sorted and displayed so that the four most important charts will be displayed on the first screen, the four next in importance charts will be displayed on a second screen, and the four least important charts on a third page facilitating the, user's immediate focus on first things first.

A user can change the degree of relationship between indicators by clicking on a box within the grid and toggling among the relationship indicators. Once the new relationship has been defined, the user must click on the disk icon to save the change within the system. When any of these icons are black, this indicates that the relationship has been saved in the database. However, when the icons are red, this indicates that the user must click the disk icon to save changes to the linkage relationship.

Once a core process has been linked to the TLIs, other processes may be linked to the core process. In order to establish-these links, the user must "drill down" one level by clicking on a downward icon. As illustrated in page 1260 of FIG. 12G, this drilling down will transfer the core process indicators from the vertical to the horizontal axis. In addition, indicators that have been linked to the core process will be listed along the vertical axis. The name of the process each indicator is associated with is listed in parentheses next to the name of the indicator in blue. As will be discussed in further detail below, one can quickly view the relationship between this process and the core process by clicking on the name of the process in parentheses. Just as was the case for adding a new indicator when linking a core process to the TLIs, one adds an indicator when linking a process to a core process by clicking on add icon 1262. Clicking on this icon 1262 opens an Indicator maintenance page, 1270 shown in FIG. 12H.

This page 1270 is identical with one important difference to the Indicator Maintenance page 1250 that was opened when adding new indicators to linkages between core processes and TLIs. The difference is that now the user is able to choose the process that the new indicator is associated with by selecting the appropriate process name from drop down box 1272 next to "Associated Process." This action establishes a link between the indicator that is being added and the core process. In text box 1273 next to "Chart", the user can supply the name of the chart with the PCMS engine that monitors the indicator currently being added. If a chart name is entered, it must exist in the PCMS engine. Text box 1274 next to "Formula" requires the user to supply the formula for that chart. Once these data have been supplied, the user should click on disk icon 1275 to save the name of the indicator, the PCMS chart that monitors the indicator and the formula for that chart. The remaining sections of this page: "Parents" 1276, "Children" 1277, and "Move To" 1278 will be discussed below as they are relevant to indicators after they have been created. After saving this information, the user is returned to the L charts page 1230.

After returning to the L charts page 1230, the user should find the name of the indicator just added in the drop down box at the bottom of the vertical column that lists the indicators associated with the starting process. The grid shows the degree of relationship between indicators as discussed above. Also, a user can change the degree of relationship and save the new relationship once it has been defined as addressed above.

Utilizing the drill down icon, such as icon 1232 of FIG. 12D, a user can "drill down" one level from any starting point. As has been illustrated above with Loss Mitigation, the indicators associated with this core process can be linked to the TLIs. Then, by "drilling down," various subprocess indicators can be linked to the indicators of that core process. One way for a user to add an additional level of subprocesses is to select the original subprocess as the new starting process. If a user selects "Recovery Promissory Notes" as the new starting process in drop down box 1233 of FIG. 12D, this process can be linked to Loss Mitigation. The resulting L chart is a subset of the one created when Loss Mitigation was linked to the TLIs and then the user "drilled down" one level. That is, this newly created L chart shows only the linkages between one process, such as Recovery Promissory Notes and Loss Mitigation whereas the former L chart showed linkages between all subprocesses, including but not limited to Recovery Promissory Notes and Loss Mitigation. While the L charts convey the same information with respect to the new starting process, the key distinction is that by starting with a new process, one is able to "drill down" one level from this process and thus add a second level of subprocesses below the core process.

Alternatively, the user may click on the words describing the related subprocess. For example, on the screen of FIG.

12E, the user may click the words "Loss Mitigation (Mertes)" 1243 in parentheses following the outcome indicator Q1 to continue to drill down. In either this case or the previous case, FIG. 12I is displayed and can be further drilled down utilizing the drill down icon 1282 to display screen 1290 of FIG. 12J.

Figure 12I:
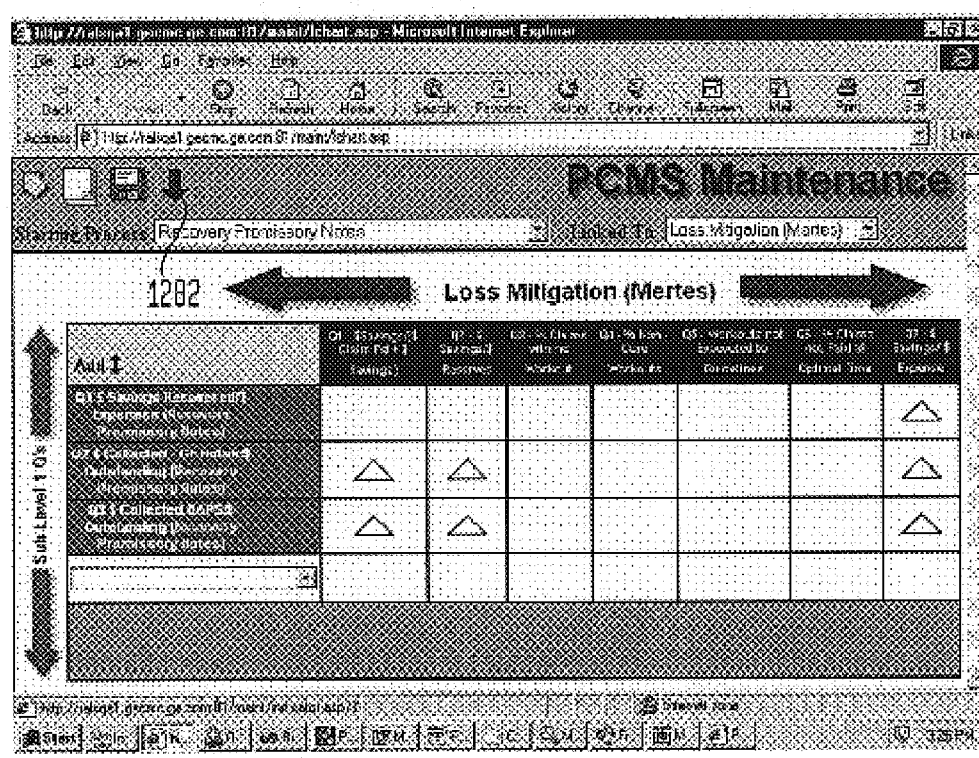
Figure 12J:
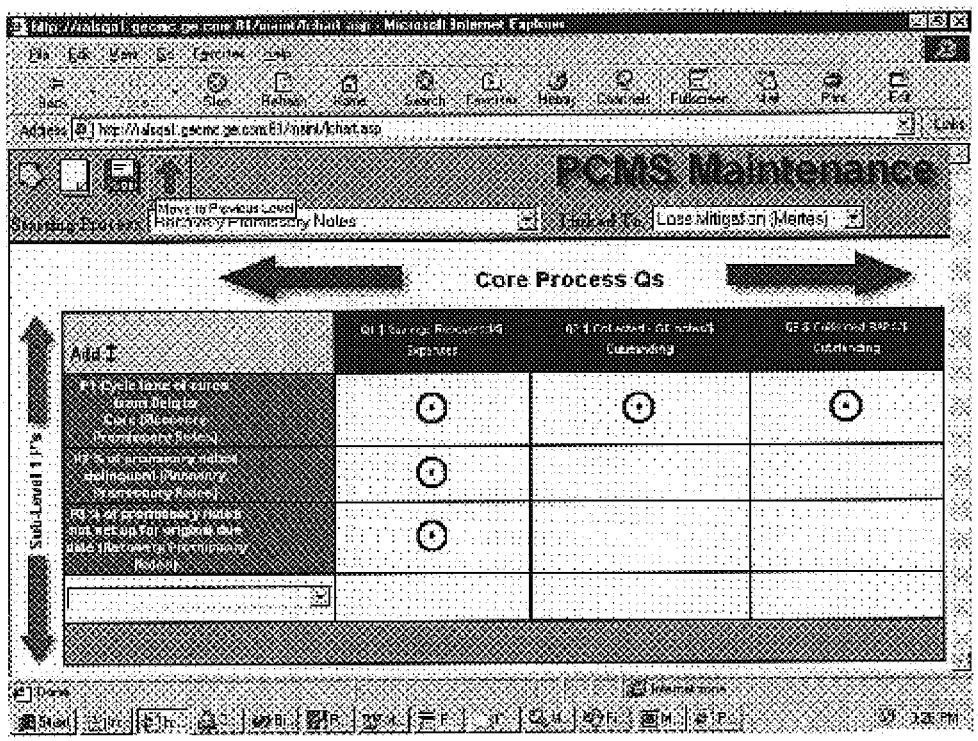
Figure 13:
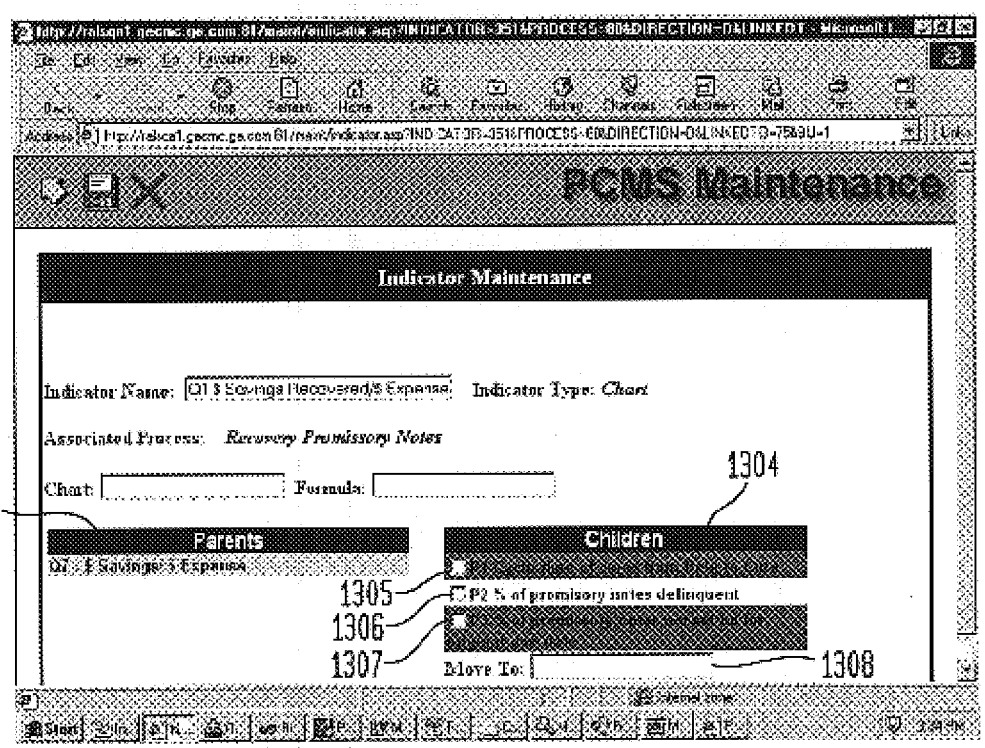
FIG. 13 illustrates an exemplary indicator maintenance web page.

Screen pages 1280 and 1290 of FIGS. 12I and 12J, respectively, illustrate further exemplary aspects of the drill down process. The first screen page 1280 shows the indicators from the first level subprocess Recovery Promissory Notes that are linked to Loss Mitigation. The second screen page 1290 shows this linkage "drilled down" one level so that there are indicators linked to the first level of indicators within Recovery Promissory Notes thus forming a second level of subprocesses below the core process level. Adding subprocesses at this level is the same as adding subprocesses at either of the two levels discussed above. It is important to note, however, that the "Associated Process" one selects from drop down box 1272 on the Indicator Maintenance page 1270 will be the same for the new indicator being added as it is for the process to which the new indicator is being linked.

The Indicator Maintenance page was discussed above in connection with adding new indicators. However, the page also provides additional information and allows the user to accomplish other tasks in relation to a specific indicator. For a page 1300 shown in FIG. 13, unlike the case when a new indicator is being added, row values have been filled in for the tables labeled "Parents" 1302 and "Children" 1304. In terms of "Parents"—those indicators closer to the core process to which the indicator in question is linked—the given indicator has only one. As for "Children", the indicator has three—that is three other indicators are at a level lower and are linked to the indicator in question. Checkboxes 1305, 1306 and 1307 beside the names of the child indicators and "Move To" text box 1308 work together to allow a user to move indicators listed as "Children" to another process by selecting one or more of the checkboxes and clicking the disk icon to save the changes. One additional change on this page from the way it appears when adding a new indicator is the ability to delete the indicator. This functionality is accomplished by clicking on an "X" or delete icon 1309.

Figure 14:
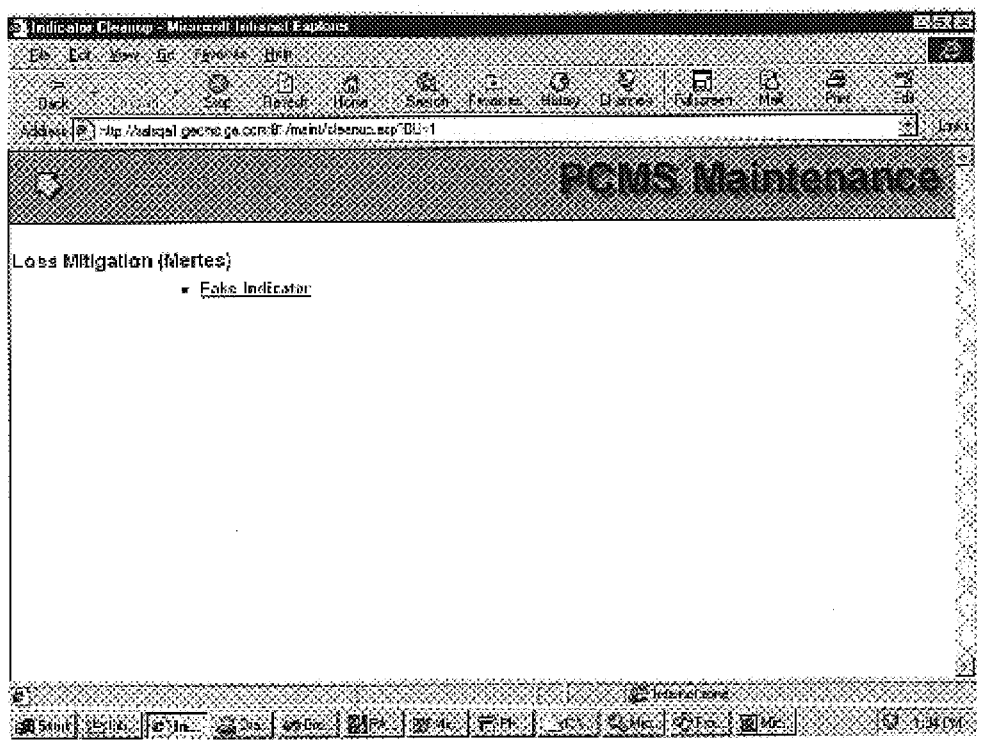
FIG. 14 illustrates an exemplary web page for utilizing a fake indicator.

An exemplary Clean Up page 1400 shown in FIG. 14 allows a user to delete indicators that have not been associated with any process. For example, a fake indicator was created within Loss Mitigation to demonstrate the clean up functionality and is shown in the page 1400. If a user clicks on the hyperlink of the name of the indicator to be deleted, the Indicator Maintenance page for this indicator is displayed as discussed. From this page, the user can click the delete icon to delete the indicator.

Figure 15A:
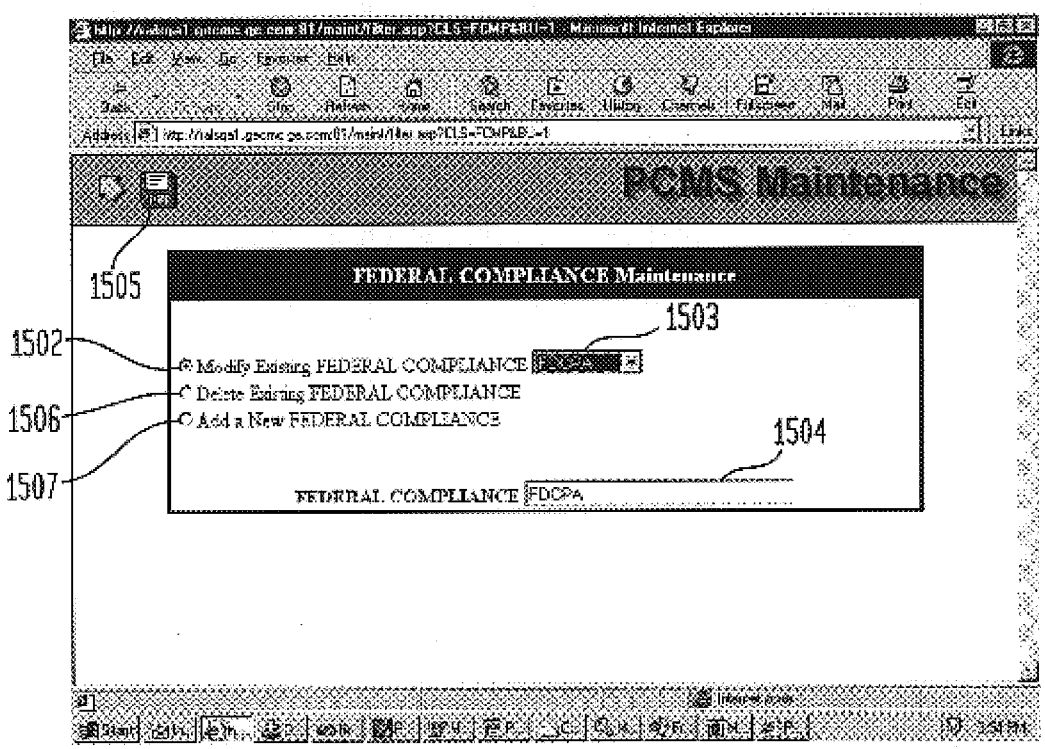
FIGS. 15A and 15B illustrate exemplary federal and state compliance web pages, respectively.

An exemplary Federal-Compliance page 1500 is shown in FIG. 15A. To modify an existing Federal Compliance indicator, a user selects radio button 1502 beside "Modify Existing Federal Compliance." Next, the Federal Compliance to be modified is selected from drop down box 1503. This will copy the name of the Federal Compliance indicator to be modified from the drop down box, in the example shown FDCPA, to a text box 1504 beside "Federal Compliance." Then the user changes the name of the Federal Compliance indicator in the text box 1504. All Federal Compliance indicator names must be unique and cannot exceed 80 characters in length. To save the modifications that- have been made to the existing Federal Compliance indicator, click on disk icon 1505 in the top left of the web page.

To delete an existing Federal Compliance indicator, select radio button 1506 beside "Delete Existing Federal Compliance." Next, the Federal Compliance indicator to be deleted is selected from the drop down box 1503. This selection will copy the name of the Federal Compliance indicator to be deleted from the drop down box to the text box. To delete this Federal Compliance indicator, click on the disk icon 1505.

Finally, to add a new Federal Compliance indicator, select radio button 1507 next to "Add a Federal Compliance" and type the name for the new Federal Compliance indicator in the text box 1504. To save the new Federal Compliance indicator, click on the disk icon 1505.

Figure 15B:
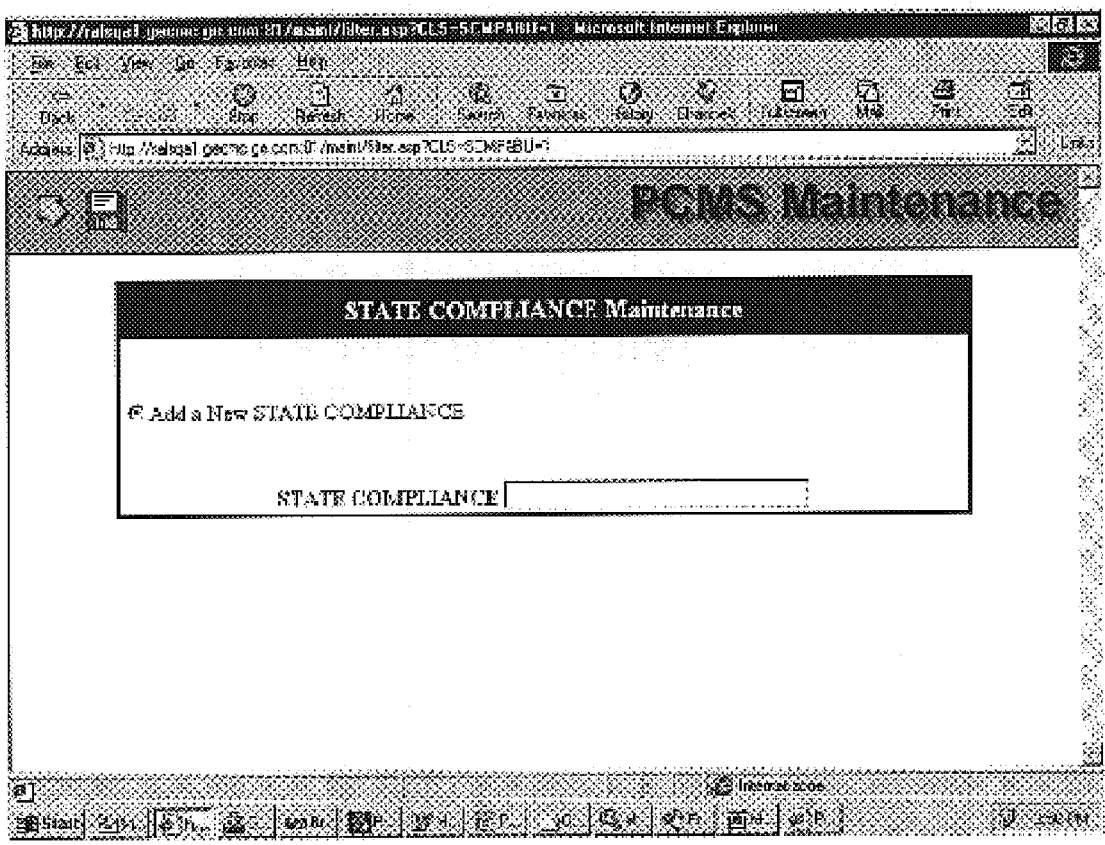

In a similar fashion, an exemplary State Compliance page 1510 shown in FIG. 15B is used to modify, delete or add State Compliance indicators.

Figure 16A:
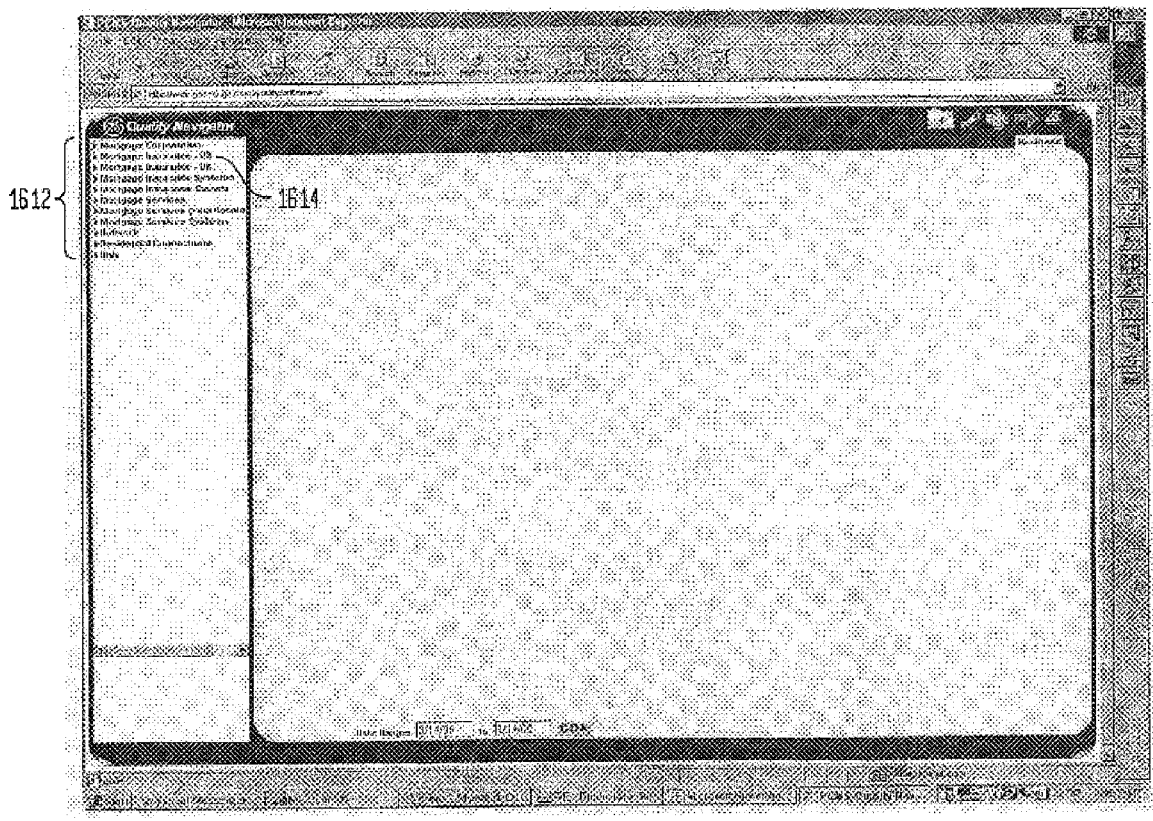
FIGS. 16A–16F illustrate exemplary web pages for accessing and utilizing the QN system of the present invention.
Figure 16B:
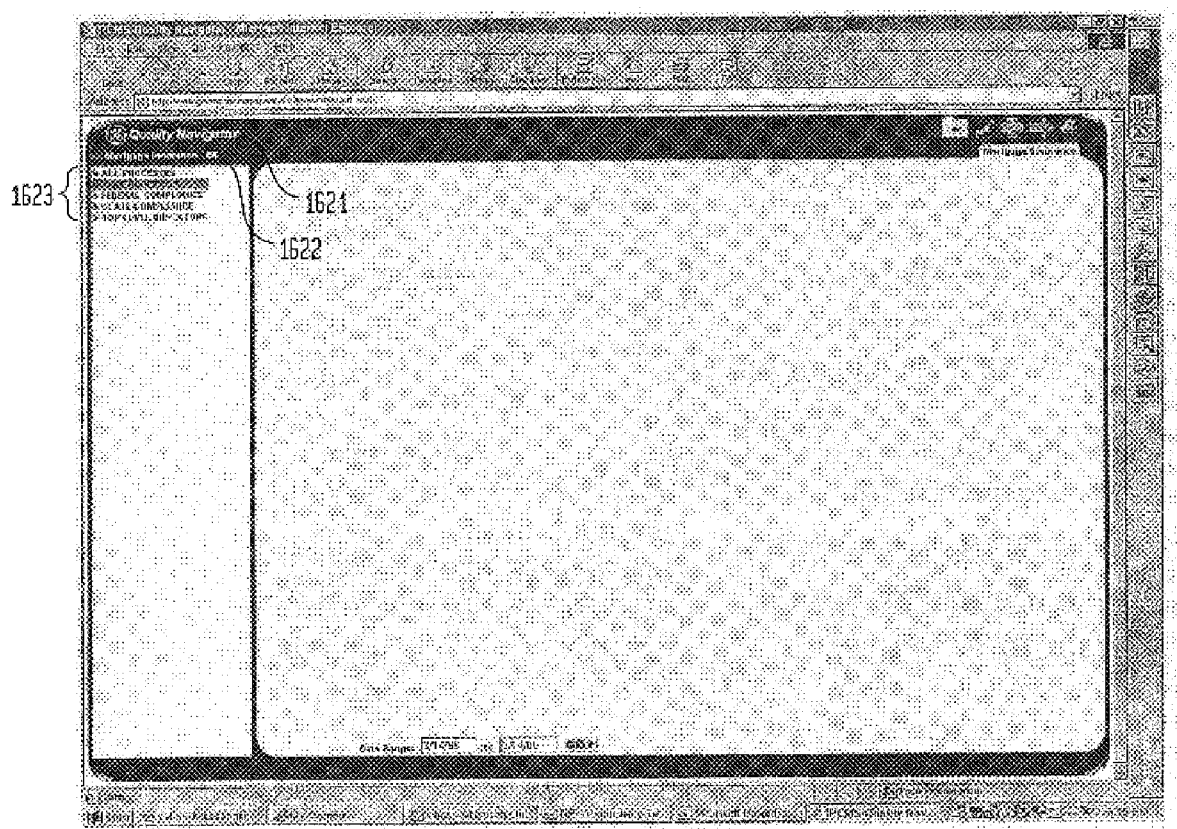

If at page 510 shown in FIG. 5B, the user had clicked on or selected "Quality Navigator" 512, then a first quality navigation page 1610 as shown in FIG. 16A is displayed to the user. The user selects a business unit from a menu 1612. For the example to be discussed, the user-selects "Mortgage Insurance-US" 1614 resulting in quality navigation page 1620 shown in FIG. 16B being displayed.

Figure 16C:
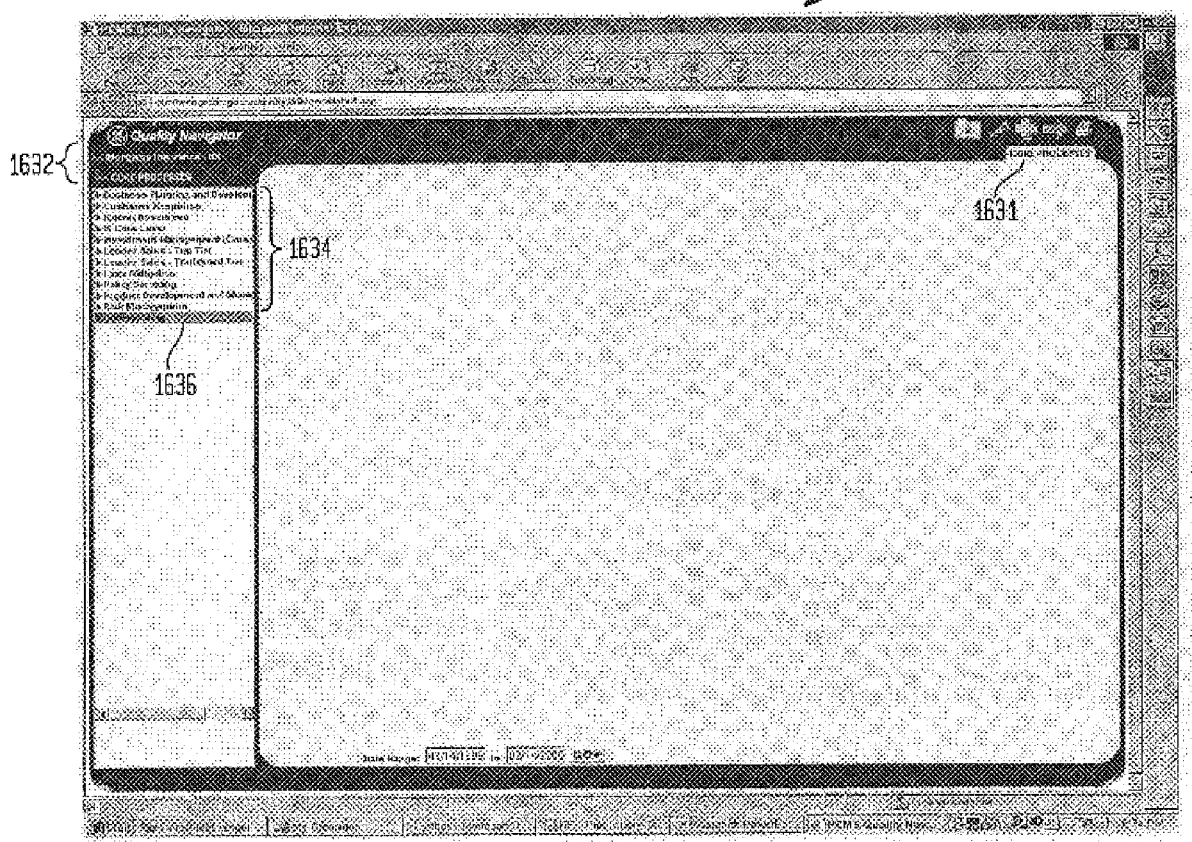

In this display, the user is reminded that he or she is working with the Quality Navigator and that Mortgage Insurance-US 1622 has been selected. The display 1622 is the beginning of a nested list concisely reminding the user of the navigation steps taken. The page 1620 also provides the user with a listing 1623 of processes to select from. The exemplary list of page 1620 shows "All Processes", "Core Processes", "Federal Compliance", "State Compliance" and "Top Level Indicators". On page 1620, Core Processes has been highlighted and upon its selection, page 1630 of FIG. 16C is displayed to the user. Now a tab 1631 indicates that the display is for core processes, an updated nested list 1632 reminds the user that Mortgage Insurance-US and Core Processes have been previously selected, and a menu of core process 1634 is presented for selection. In this listing, "Underwriting" 1636 has been highlighted for selection.

Figure 16D:
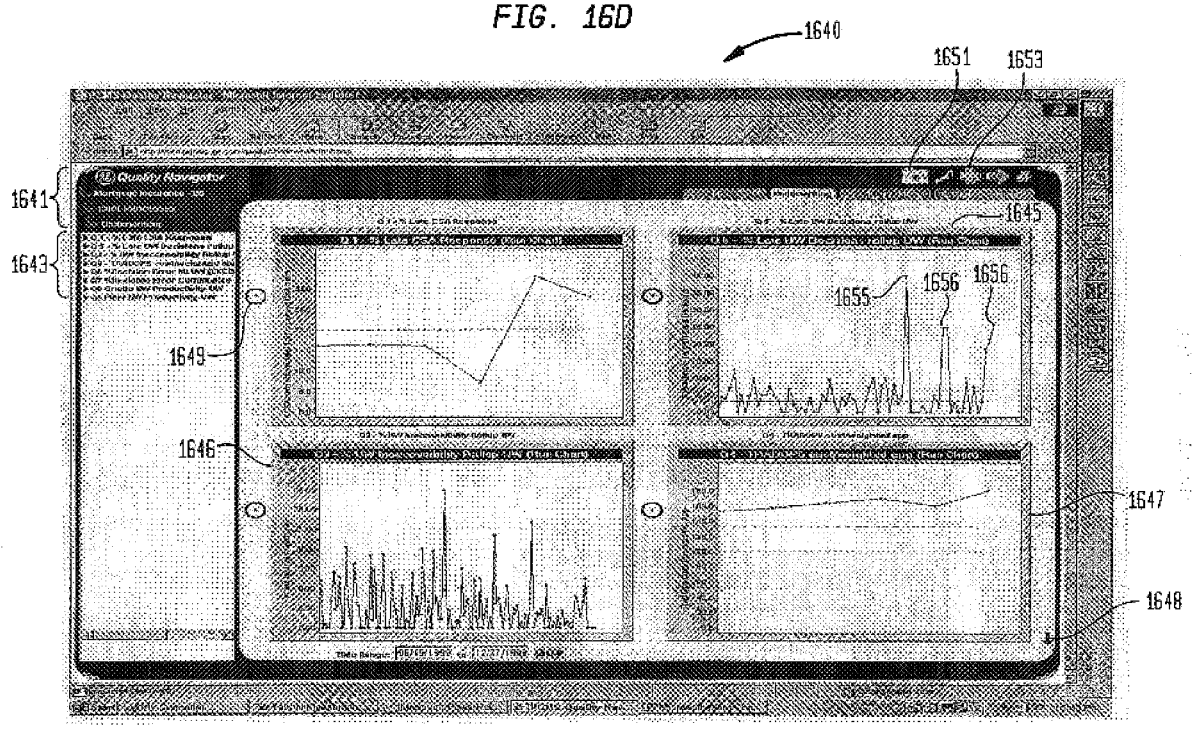

Upon selection of Underwriting, a page 1640 as shown in FIG. 16D is displayed. An updated nested list 1641 reminds the user that Mortgage Insurance-US, Core Processes and Underwriting have been previously selected. A new Underwriting tab 1642 is displayed. Also, a menu or listing of top level indicators (TLIs) 1643 is displayed. The exemplary listing shows Q1-% Late CSA Response; Q-5% Late UW Decisions Rollup; Q-3% UW Inaccessibility Rollup; Q4-TRADOPS cost/weighted; Q-6% Decision Error MIUW; Q-7% Decision Error Compliance; Q8-Onsite UW Productivity-UW; and Q9-Flow UW Productivity-UW. Four outcome indicator charts 1644, 1645, 1646 and 1647 are shown on page 1640 corresponding to Q1, Q5, Q3 and Q4. A downward pointing arrow 1648 indicates that there are additional outcome indicator charts at this level. Clicking on the arrow 1648 results in the charts for Q6, Q7, Q8 and Q9 being displayed. In addition to the q-charts, the linkage level to the underwriting process is also displayed using the same symbols previously discussed above. For example, icon 1649 indicates that there is a high level of linkage between the Q1-% Late CSA Response chart and customer satisfaction with the underwriting process. A favorite icon 1651 sets a page such as page 1640 as a favorite. A plus or add icon 1653 adds a tab.

Figure 16E:
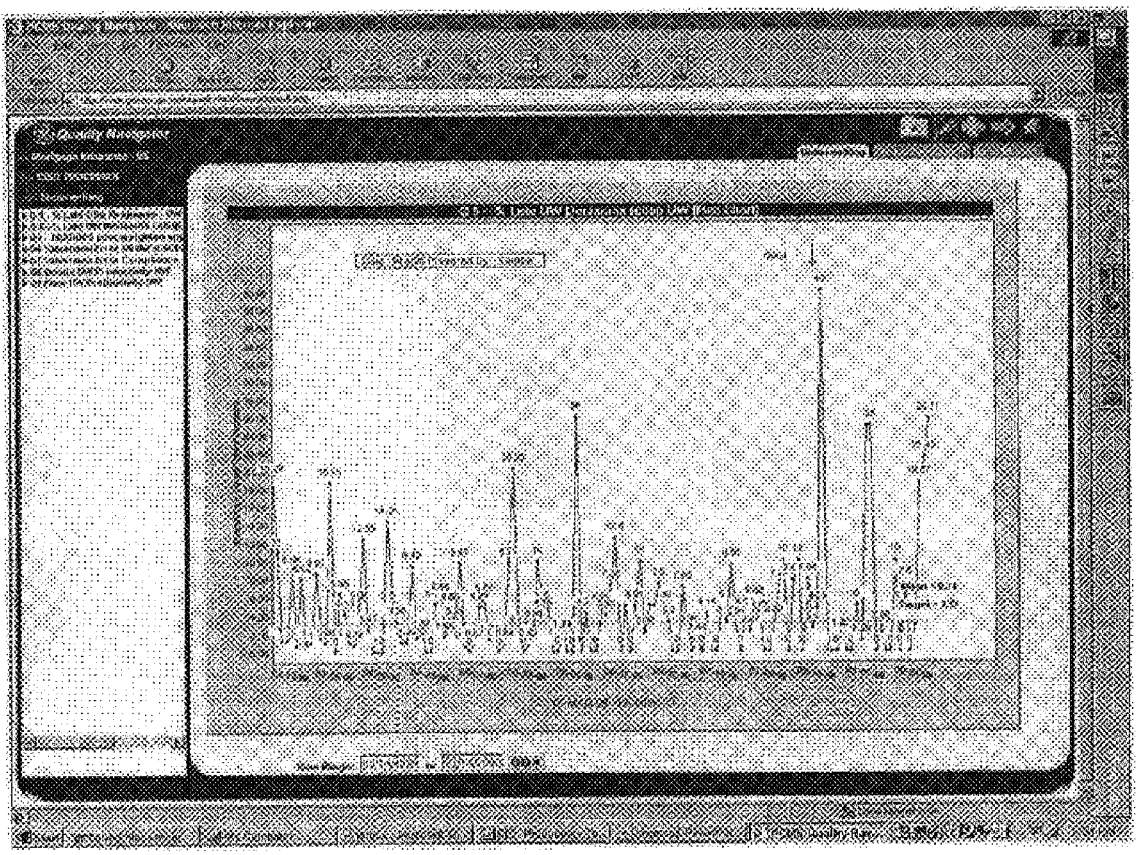
Figure 16F:
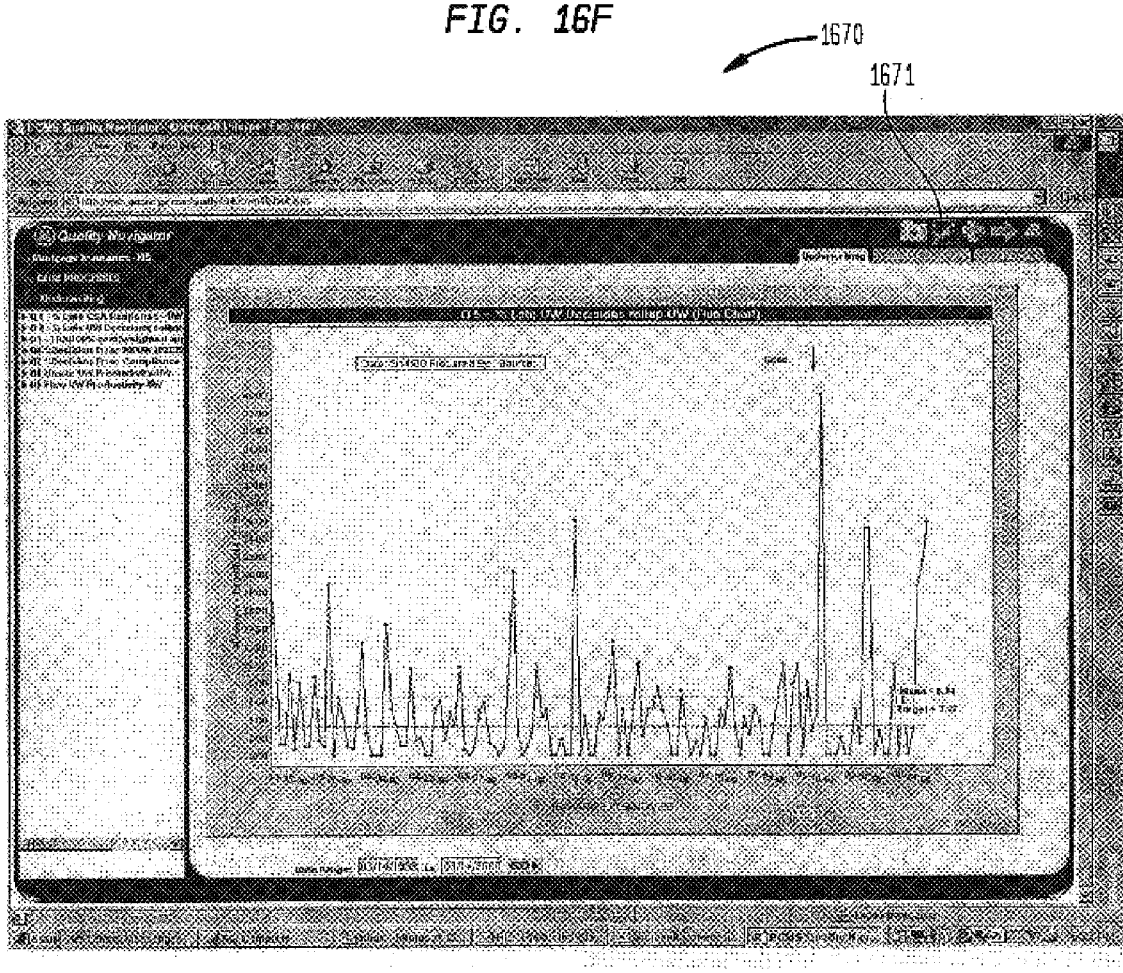

Clicking on a chart, such as chart 1645, results in that chart being blown up and displayed on a page, such as page 1660 of FIG. 16E or page 1670 of FIG. 16F. By clicking on icon 1671 to highlight that icon, datapoints for a displayed chart are labeled as in FIG. 16F. When not highlighted, the datapoints are not individually labeled as seen in FIG. 16E.

Figure 17A:
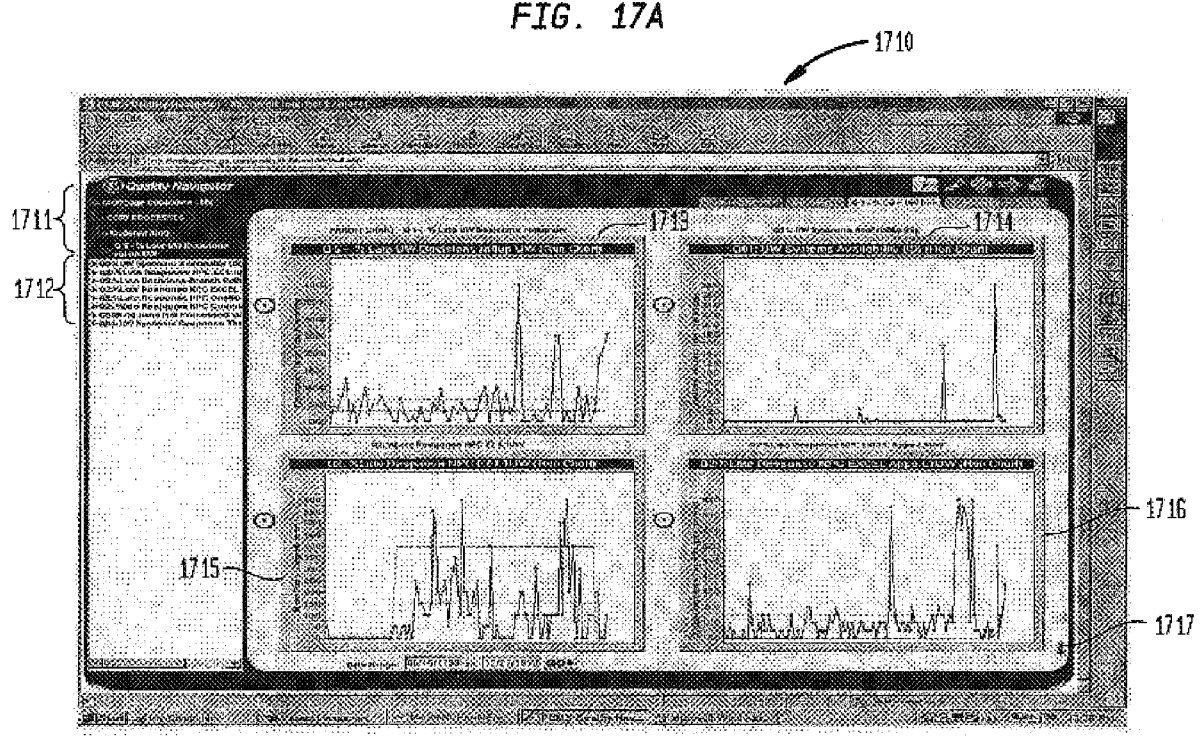
FIGS. 17A and 17B illustrate aspects of drilling down from one level to another in accordance with the present invention.

The quality navigator of the present invention provides a ready tool for users to assess performance in real time by isolating both problems and successes while identifying their root causes. Focussing on the percentage late underwriting decisions rollup (Q5) chart 1645, the user wishes to "drill down" or to look at the underlying causes for the peaks 1655–1657 in the chart 1645. By highlighting Q5 from menu 1643, a display page 1710 as shown in FIG. 17A is generated. In nested list 1711, Q5-% Late UW Decreasing is now seen under Underwriting. Children chart names 1712 for chart Q5 are now shown. The Q5 chart 1645 of FIG. 16D is now displayed as a parent chart 1713 with the children charts 1714, 1715 and 1716. By clicking on arrow 1717, additional children charts can be displayed. By visually comparing peaks of the charts 1713, 1714,1715 and 1716, the user sees that the data for the % Late Response NPC chart appears to directly impact late underwriting decisions.

Figure 17B:
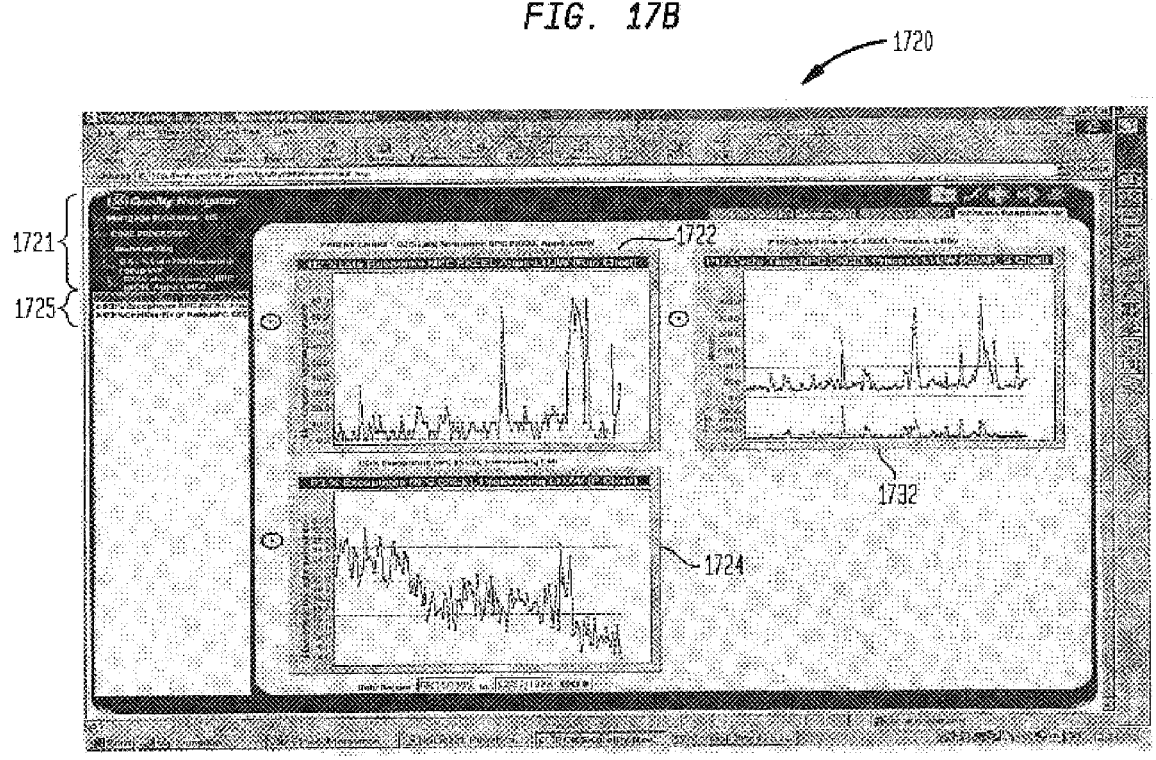

By clicking on Q2-% Late Response NPC from menu 1712, the user can drill down one level further to see what processes drive late NPC applications in a display page 1720 shown in FIG. 17B. In a nested list 1721, Q2-% Late Response NPC is now seen under Q5-% Late UW Decisions. The chart 1716 of FIG. 17A is now a parent chart 1722 in FIG. 17B. Its children charts 1723 and 1724 are also shown on display page 1720 and listed on a menu 1725. Again, the user can see what drives the peaks of the parent chart. In this case, the Late NPC Applications chart results are driven by the P12-Cycle Time NPC EXCEL Process chart data. The user can now investigate and take steps to correct the problem.

Figure 18:
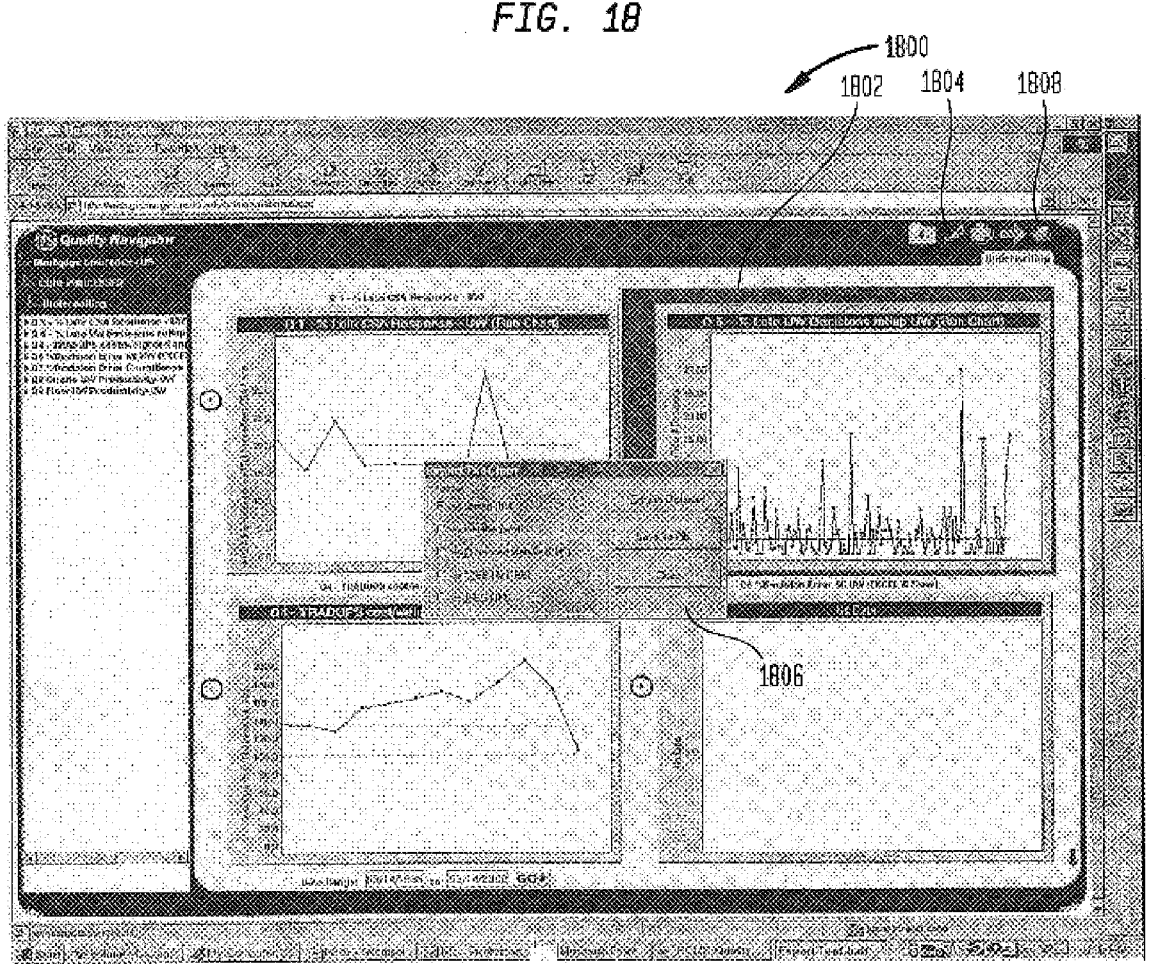
FIG. 18 illustrates various aspects of exporting a chart from the QN system.

A further capability of the quality navigator system is illustrated by display page 1800 of FIG. 18. In page 1800, chart Q5 1802 has been highlighted and export icon 1804 has been selected. An Export Tee Chart 1806 is displayed with various options for the user to export the Q5 chart 1802. A print icon 1808 is used to simply printout a desired chart or charts.

Throughout the quality navigation process, underlying data is only displayed, viewed, exported, printed or the like. It is not modified by the users of the quality navigation system so that if desired all employees may be given access to this aspect of the system. Conversely and by contrast, only authorized personnel can enter data, change data, revise charts and the like as discussed in the maintenance section above.

Figure 19:
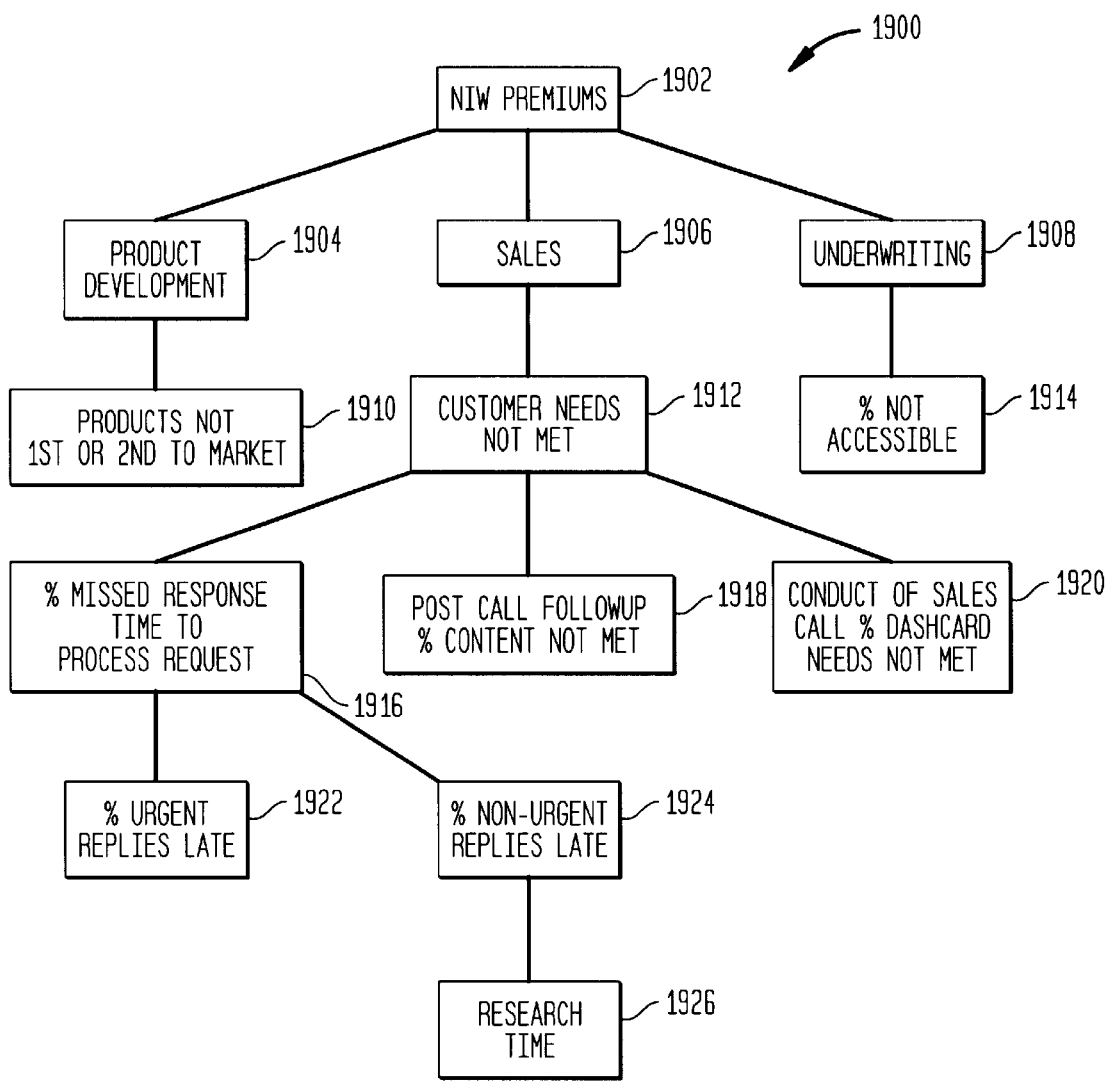
FIG. 19 illustrates the linking of top level indicators (TLIs), core processes, outcome indicators, process outcome indicators, subprocess outcome indicators and process indicators in accordance with the present invention.

FIG. 19 shows a block diagram 1900 which illustrates the linking of top level indicators (TLIs), core processes, outcome indicators, process outcome indicators and process indicators. For ease of representation, chart 1900 includes a single top level indicator new insurance written (NIW) premiums 1902. Typically as addressed above, there are multiple TLIs for any given business. The TLI NIW premiums 1902 is linked to three core processes: product development 1904, sales 1906 and underwriting 1908. Each of the core processes is linked to an outcome indicator. Product development 1904 is linked to products not first or second to market 1916. Sales 1906 is linked to customer needs not met 1928. Underwriting 1908 is linked to percentage not accessible.

The diagram 1900 then focusses on the outcome indicator customer needs not met 1912 showing an exemplary linking for that outcome indicator to a series of three level one process outcome indicators, namely, percentage missed response time to process request 1916, post call followup percentage content not met 1918 and conduct of sales call percentage dashcard needs not met 1920.

At the next level, diagram 1900 focusses on the level one process outcome indicator 1916 and shows its linkage to level two subprocess outcome indicators, namely, percentage urgent replies late 1922 and percentage non-urgent replies late 1924. Finally, a further level down linkage to a process indicator research time 1926 is shown for the level two subprocess outcome indicator 1924. It should be recognized that additional TLIs, core processes, outcome indicators and the like may exist at each level, that linkages may extend across multiple levels, and that indicators may be indicators for multiple processes. By storing appropriate linkage data in a linkage table, such as linkage table 224 of FIG. 2, the present invention can be readily adapted to any type of business and to changes within any particular business.

Figure 20:
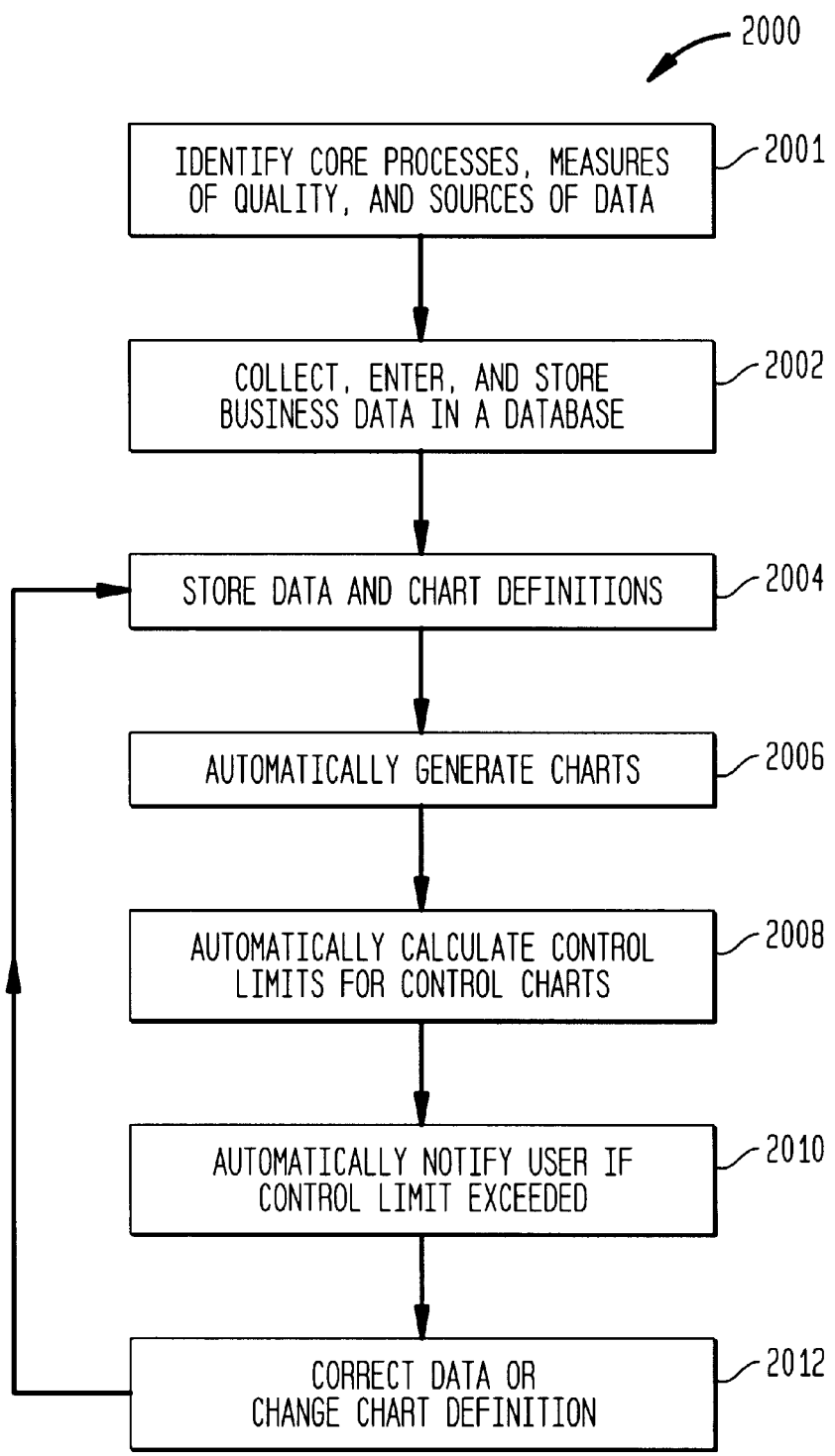
FIG. 20 is a flowchart illustrating a PCMS process in accordance with the present invention.

FIG. 20 is a flowchart illustrating a PCMS process 2000 in accordance with the present invention. In step 2001, core processes, measures of quality and sources of data are identified. In step 2002, underlying business data is collected, entered and stored in a database, such as the database 214 of FIG. 2. The data may be manually collected and keyed, for example, user survey cards such as dashcards may be collected and then data entered by hand. Alternatively, the data may be automatically collected and imported. For example, the duration of customer telephone calls may be automatically timed and recorded, and the data imported to the database. In step 2004, data definitions and chart definitions are stored in a memory, such as table 213 of FIG. 2. These definitions link data to appropriate charts and define charts so that in step 2006, they can be correctly and automatically calculated, for example, by a server, such as server 202 utilizing executable software 212 as illustrated in FIG. 2. Both run and control charts will be generated. In step 2008, control limits are automatically calculated for control charts. In step 2010, a predetermined user, such as a process owner, is automatically notified, for example, by email, if the control limits calculated in step 2008 are determined to have been exceeded in a predetermined fashion, for example, the control limit is exceeded by a set amount or a predetermined number of consecutive data points exceed the control limit.

In step 2012, data is corrected or a chart definition is changed. To this end, an authorized user will be prompted to login to the system and will be required to enter a password indicating a clearance to undertake the change. This requirement is necessary to insure the integrity of the data and the charts. Other automatic chart utilities may also be advantageously provided. For example, if no new data is added to a chart in a predetermined time period, such as forty-five days, a person responsible for a process or chart, or a person responsible for entry of data may be automatically notified so that appropriate followup can be taken. By way of example, a chart can be pruned where no new data is being generated or steps can be taken to enter data more expeditiously where data entry is unreasonably slow.

Turning to FIG. 21, this figure illustrates a quality navigation process 2100 in accordance with the present invention. In step 2102, core processes, measures of quality and sources of data for a business are identified. Data for those core processes are collected, entered and stored in a database in step 2104. In step 2106, hierarchical levels of processes and subprocesses are established measures of quality are identified. In step 2108, linkages between the identified measures of quality and the core processes and their subprocesses are identified and then strengths are evaluated and stored, for example in a memory, such as linkage table 224 of, FIG. 2. In step 2110, the core operating processes and their subprocesses are linked to their roles in achieving the financial objectives of the business. Indicators for the strengths of these relationships are stored. In step 2112, measures of quality and financial objectives are further linked and indicators for the strengths of their relationships are stored.

In step 2114, a hierarchical linkages of indicators to subprocesses is developed and stored. In step number 2116, a user selects a family of charts for display. In step 2118, stored data and chart definitions are fetched. In step 2020, charts are automatically generated. In step 2022, control limits are automatically generated for control charts. In step 2024, strength of relationship data is fetched. In step 2026, the strength of relationship data is displayed along with the selected family of charts. In step 2028, a user drills down one level below the level displayed in step 2114. In step 2120, a new family of charts with strength of relationship data is displayed. While drilling down one level is addressed as exemplary in connection with FIG. 21 drilling down more than one level or going back up are of course readily possible as addressed further above. Further details are provided above. While the present invention has been disclosed in the context of presently preferred methods and apparatus for carrying out the invention, various alternative embodiments, implementations and variations will be readily apparent to those of ordinary skill in the art. By way of example, while the present disclosure focusses on the specific context of mortgage lending processes and customer satisfaction, it will be apparent that the present invention can be advantageously and readily applied to most businesses and most quality issues that those businesses choose to focus upon.

We claim:

1. A system for automatically generating and displaying charts in a web page based format, the system comprising:
    a plurality of user workstations;
    a central server;
    an intranet or Internet communications channel connecting the plurality of user workstations and the central server; wherein the central server further comprises executable software for chart generation and chart maintenance; tables for storing data definitions; and a database for storing business data from a plurality of geographically remote data sources, said central server being operable to automatically create control and run charts and transmit said charts over said communications channel as requested by a user utilizing one of said plurality of user workstations; and
    an auto add mask table utilized by the central server to automatically create a new chart using a chart type specified in the auto add mask table as new data with a new chart name is detected as having been entered.

2. The system of claim 1 further comprising:
    memory for storing an email address for a process owner responsible for a control process;
    means for detecting that the control process is out of control; and
    means for automatically alerting the process owner by email that the control process is out of control.

3. The system of claim 1 further comprising apparatus for manually inserting additional data points and for importing data points-from another source.

4. The system of claim 3 wherein said central server is further operable to automatically determine if each additional data point should be excluded from a calibration calculation for a particular chart to which it relates.

5. The system of claim 1 wherein at least one of the plurality of user workstations further comprises a keyboard which may be utilized by a user to enter a number of data points to be displayed for a chart and the central server is operable to automatically display the chart with said number of data points.

6. The system of claim 1 further comprising memory for storing user log in data and wherein said central server is operable to allow a user to perform one or more of a list of particular functions comprising inserting data-points, deleting data points, excluding data points, maintaining a chart or creating a new chart page only if the user is recognized as having login rights to perform one or more of said list of particular functions.

7. The system of claim 1 wherein the central server stores data defining a predetermined period for which data is considered current and the central server is further operable to automatically keep said control and run charts current based upon said stored data.

8. The system of claim 1 wherein the central server stores data defining a purge date for a chart after which date is to be purged and the central server is further operable to automatically purge data based upon said purge data.

9. A method for automatically generating and displaying charts in a web page based format, the method comprising the steps of:
    utilizing one of a plurality of user workstations connected to a central server by an intranet or Internet communications channel to select a chart for display on said user workstation;
    storing data and client definitions in tables in the central server;
    storing executable software for the central server for chart generation and chart maintenance;
    storing business data from a plurality of geographically remote data sources in a data base in the central server, automatically creating control and run charts from the data and the data and chart definitions;
    transmitting said charts over said communications channel as requested utilizing said one of said plurality of user workstations;
    storing an auto add mask table;
    detecting new data with a new chart name; and
    automatically creating a new chart using a chart type specified in the auto add mask table.

10. The method of claim 9 further comprising the steps of:
    storing an email address for a process owner responsible for a control process;
    detecting that the control process is out of control; and
    automatically alerting the process owner by email that the control process is out of control.

11. The method of claim 9 further comprising the step of manually inserting additional data points.

12. The method of claim 9 further comprising the step of importing data points from another source.

13. The method of claim 11 further comprising the step of automatically determine if each additional data point should be excluded from a calibration calculation for a particular chart to which it relates.

14. The method of claim 9 further comprising the steps of entering a number of data points to be displayed for a chart; and
    automatically displaying the chart with said number of data points.

15. The method of claim 9 further comprising the steps of:

storing user log in data; and allowing a user to perform one or more of a list of particular functions comprising inserting data points, deleting data points, excluding data points, maintaining a chart or creating a new chart page only if the user is recognized as having login rights to perform one or more of said list of particular functions.

16. The method of claim 9 further comprising the steps of:

storing data defining a predetermined period for which data is considered current;

automatically updating said control and run charts to keep them current based upon said stored data.

17. The method of claim 9 further comprising the steps of:

storing data defining a purge date for a chart after which data is to be purged; and automatically purging data based upon said purge date.

18. The method of claim 9 further comprising the steps of:

automatically calculating control limits for control charts; and displaying the automatically calculated control limits with the control charts.

\* \* \* \* \*